US012659782B2

(12) United States Patent
Kung et al.

(10) Patent No.: US 12,659,782 B2
(45) Date of Patent: Jun. 16, 2026

(54) METHOD AND APPARATUS FOR CONFIGURATION OF UE-INITIATED BEAM REPORTING IN A WIRELESS COMMUNICATION SYSTEM

(71) Applicant: ASUS Technology Licensing Inc., Taipei City (TW)

(72) Inventors: Yi-Hsuan Kung, Taipei City (TW); Yu-Hsuan Guo, Taipei City (TW); Chun-Wei Huang, Taipei City (TW)

(73) Assignee: ASUS Technology Licensing Inc., Taipei City (TW)

( * ) Notice: Subject to any disclaimer, the term of this patent is extended or adjusted under 35 U.S.C. 154(b) by 0 days.

(21) Appl. No.: 19/236,924

(22) Filed: Jun. 12, 2025

(65) Prior Publication Data

US 2025/0386232 A1     Dec. 18, 2025

Related U.S. Application Data

(60) Provisional application No. 63/659,254, filed on Jun. 12, 2024, provisional application No. 63/659,260, filed on Jun. 12, 2024.

(51) Int. Cl.
H04W 72/02     (2009.01)
H04B 7/06     (2006.01)
(Continued)

(52) U.S. Cl.
CPC .......... H04W 24/10 (2013.01); H04B 7/0626 (2013.01); H04W 72/21 (2023.01); H04W 72/23 (2023.01)

(58) Field of Classification Search
CPC . H04W 72/02; H04W 72/04; H04W 72/0446; H04W 72/121; H04W 72/23;
(Continued)

(56) References Cited

U.S. PATENT DOCUMENTS

| | | |
|---|---|---|
| 12,047,150 B2 | 7/2024 | Lee et al. |
| 2024/0276270 A1 | 8/2024 | Bai et al. |

(Continued)

FOREIGN PATENT DOCUMENTS

| | | | |
|---|---|---|---|
| WO | 2022191587 A1 | 9/2022 | |
| WO | 2025039582 A1 | 2/2025 | |
| WO | WO-2025152877 A1 * | 7/2025 | ............... H04B 7/06 |

OTHER PUBLICATIONS

Moderator (Nokia), Samsung, Huawei, HiSilicon, Nokia, Nokia Shanghai Bell; Miscellaneous corrections on Rel-17 URLLC/IIoT in 38.213; Change Request 38.213 Draft, Current version 17.4.0; 3GPP TSG-RAN WG1 #112; R1-23XXXXX; Feb. 27-Mar. 3, 2023; 6 pages.
Moderator (ZTE); Moderator Summary #1 on UE-initiated/event-driven beam management; 3GPP TSG RAN WG1#117; R1-240xxxx; May 20-24, 2024; 41 pages.
Moderator (ZTE); Moderator Summary #1 on UE-initiated/event-driven beam management; 3GPP TSG RAN WG1#121; R1-250xxxx; St. Julian's, Malta, May 19-23, 2025; 59 pages.
(Continued)

*Primary Examiner* — Bo Hui A Zhu
*Assistant Examiner* — Alvin Zhu
(74) *Attorney, Agent, or Firm* — Skaar Ulbrich Macari, P.A.

(57)     ABSTRACT

Methods, systems, and apparatuses are provided for configuration of User Equipment (UE)-initiated beam reporting in a wireless communication system, wherein a method for a UE comprises being configured with a plurality of report configurations comprising a first report configuration associated with an event and a second report configuration not associated with any event, and being configured with one or more trigger states associated with one or more report configurations, wherein the UE does not expect that any trigger state of the one or more trigger states is associated with the first report configuration associated with the event and the second report configuration not associated with any event.

20 Claims, 13 Drawing Sheets

(51) Int. Cl.
    *H04W 24/10*      (2009.01)
    *H04W 72/21*      (2023.01)
    *H04W 72/23*      (2023.01)

(58) Field of Classification Search
    CPC ..... H04W 72/50; H04W 72/51; H04W 72/52;
           H04W 72/53; H04W 72/54; H04W
           72/541; H04W 72/542; H04W 72/543;
                             H04W 72/56
    See application file for complete search history.

(56)               References Cited

U.S. PATENT DOCUMENTS

2025/0203434 A1*   6/2025   Agiwal  ................ H04B 17/328

2025/0203620 A1*   6/2025   Zhu  ....................... H04W 24/10

OTHER PUBLICATIONS

Moderator (ZTE); Moderator Summary #2 on UE-initiated/event-driven beam management; 3GPP TSG RAN WG1#120; R1-250xxxx; Athens, Greece; Feb. 17-21, 2025; 40 pages.
Moderator (ZTE); Moderator Summary #1 on UE-initiated/event-driven beam management; 3GPP TSG RAN WG1#121; R1-250xxxx; St. Julian's, Malta, May 19-23, 2025; 48 pages.
Nokia; TEI19: Simultaneous NZP-CSI-RS resource counting with NES; Draft Change Request 38.214 CR, current version 18.6.0; 3GPP TSG-RAN WG1 Meeting #121; R1-25xxxxx; St. Julian's, Malta, May 19-23, 2025; 5 pages.

* cited by examiner

| R | Serving Cell ID | | | | | BWP ID | | Oct 1 |
|---|---|---|---|---|---|---|---|---|
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |

...

| $T_{(N-2)\times8+7}$ | $T_{(N-2)\times8+6}$ | $T_{(N-2)\times8+5}$ | $T_{(N-2)\times8+4}$ | $T_{(N-2)\times8+3}$ | $T_{(N-2)\times8+2}$ | $T_{(N-2)\times8+1}$ | $T_{(N-2)\times8}$ | Oct N |

| | | | | | | | | | |
|---|---|---|---|---|---|---|---|---|---|

| R | Serving Cell ID | | | | | DL BWP ID | | Oct 1 |
|---|---|---|---|---|---|---|---|---|
| R | R | R | R | R | R | UL BWP ID | | Oct 2 |
| $P_1$ | $P_2$ | $P_3$ | $P_4$ | $P_5$ | $P_6$ | $P_7$ | $P_8$ | Oct 3 |
| D/U | TCI state ID 1 | | | | | | | Oct 4 |
| D/U | TCI state ID 2 | | | | | | | Oct 5 |

...

| D/U | TCI state ID N | Oct N+3 |
|---|---|---|

FIG. 6 (PRIOR ART)

| | | | | | | | |
|---|---|---|---|---|---|---|---|
| R | R | R | C | S/U | Target Config ID | | Oct 1 |
| R | R | R | R | Timing Advance Command | | | Oct 2 |
| Timing Advance Command | | | | | | | Oct 3 |
| R | TCI state ID | | | | | | Oct 4 |
| UL TCI state ID | | | | | | | Oct 5 |
| Random Access Preamble index | | | | | SS/PBCH index | | Oct 6 |
| SS/PBCH index | | | | PRACH Mask index | | | Oct 7 |

FIG. 8 (PRIOR ART)

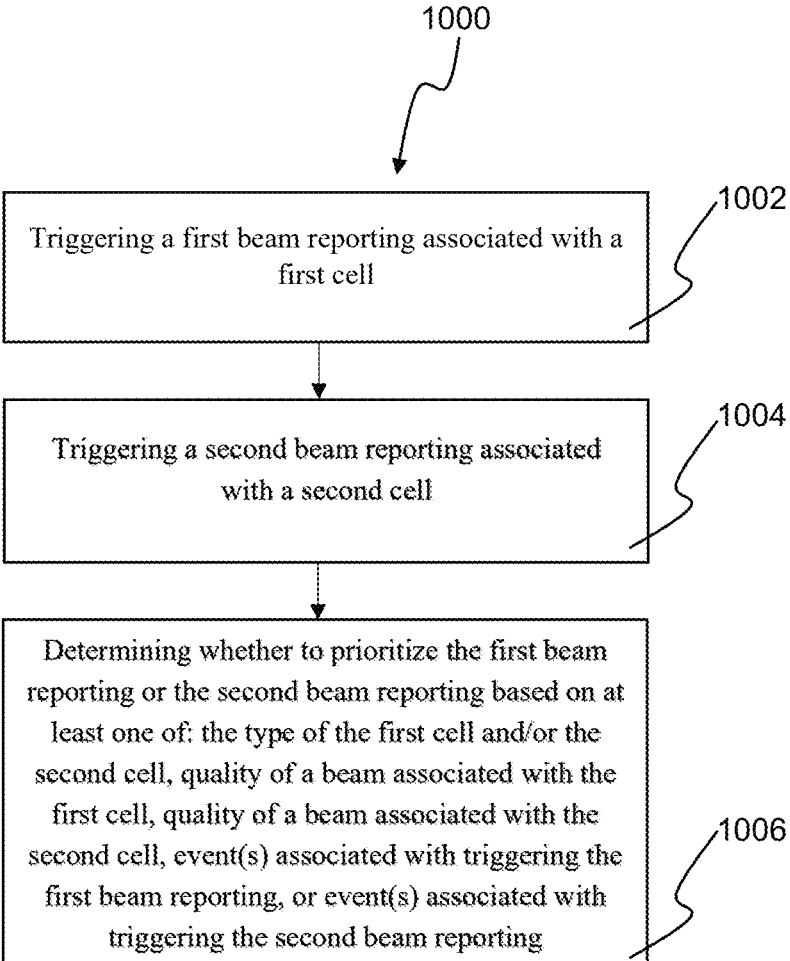

1000

Triggering a first beam reporting associated with a first cell — 1002

Triggering a second beam reporting associated with a second cell — 1004

Determining whether to prioritize the first beam reporting or the second beam reporting based on at least one of: the type of the first cell and/or the second cell, quality of a beam associated with the first cell, quality of a beam associated with the second cell, event(s) associated with triggering the first beam reporting, or event(s) associated with triggering the second beam reporting — 1006

FIG. 9

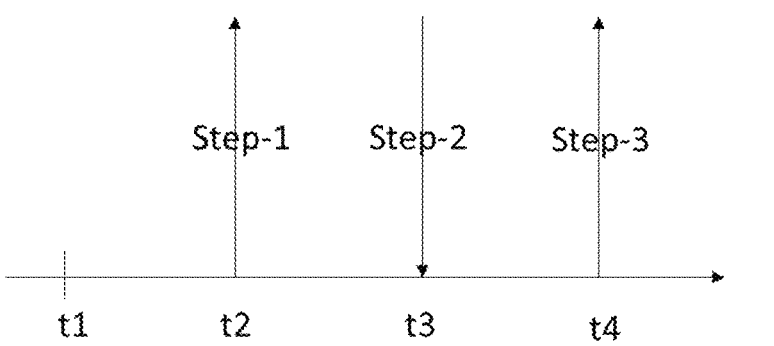
Mode-A
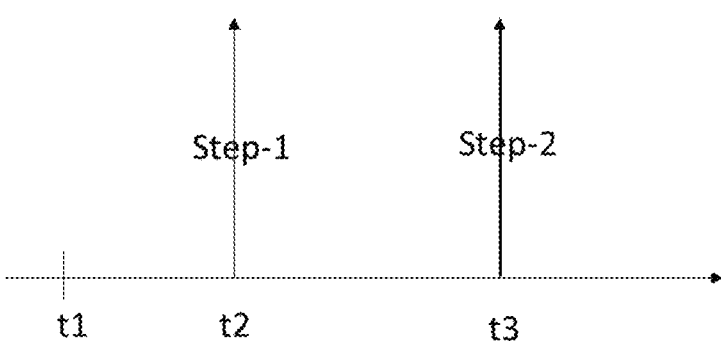
Mode-B
FIG. 10

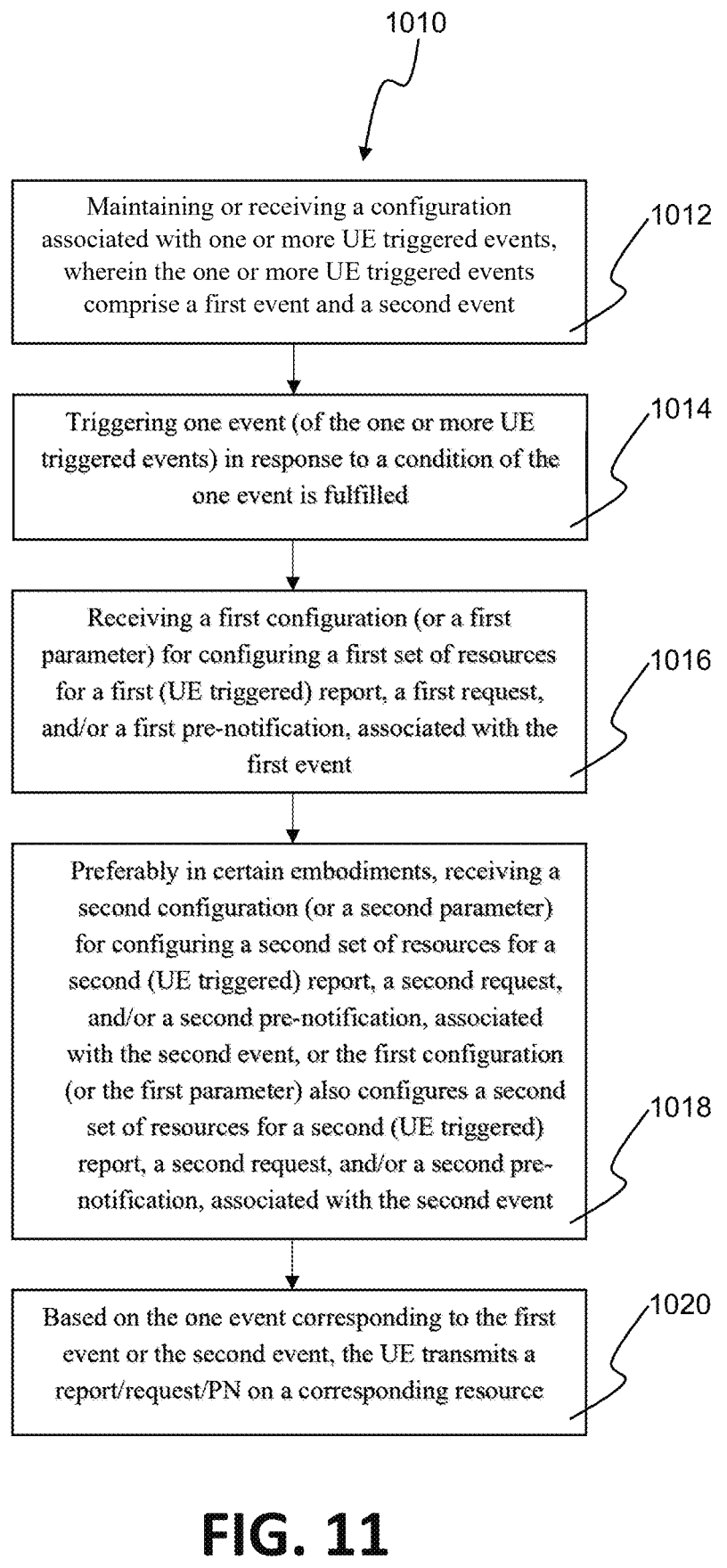

1010

Maintaining or receiving a configuration associated with one or more UE triggered events, wherein the one or more UE triggered events comprise a first event and a second event　　1012

Triggering one event (of the one or more UE triggered events) in response to a condition of the one event is fulfilled　　1014

Receiving a first configuration (or a first parameter) for configuring a first set of resources for a first (UE triggered) report, a first request, and/or a first pre-notification, associated with the first event　　1016

Preferably in certain embodiments, receiving a second configuration (or a second parameter) for configuring a second set of resources for a second (UE triggered) report, a second request, and/or a second pre-notification, associated with the second event, or the first configuration (or the first parameter) also configures a second set of resources for a second (UE triggered) report, a second request, and/or a second pre-notification, associated with the second event　　1018

Based on the one event corresponding to the first event or the second event, the UE transmits a report/request/PN on a corresponding resource　　1020

FIG. 11

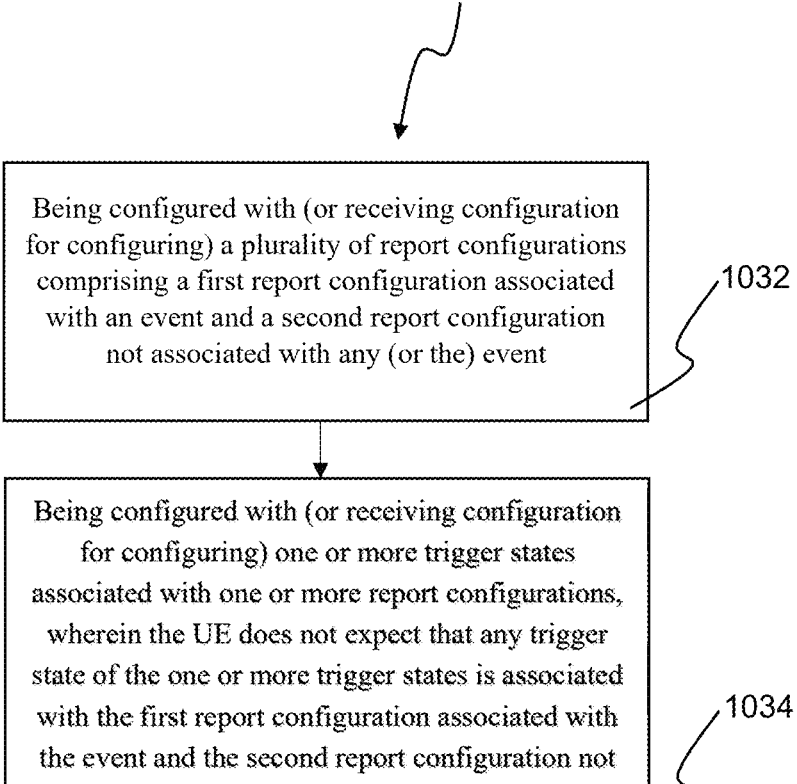

1030

Being configured with (or receiving configuration for configuring) a plurality of report configurations comprising a first report configuration associated with an event and a second report configuration not associated with any (or the) event

1032

Being configured with (or receiving configuration for configuring) one or more trigger states associated with one or more report configurations, wherein the UE does not expect that any trigger state of the one or more trigger states is associated with the first report configuration associated with the event and the second report configuration not associated with any (or the) event

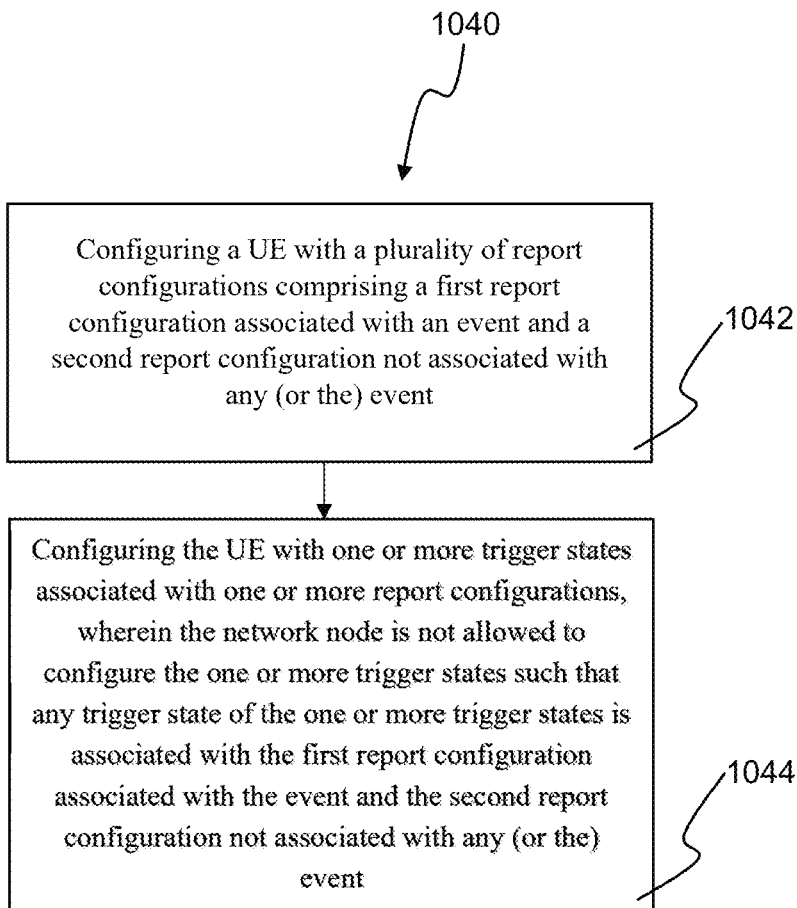

Configuring a UE with a plurality of report configurations comprising a first report configuration associated with an event and a second report configuration not associated with any (or the) event

1042

Configuring the UE with one or more trigger states associated with one or more report configurations, wherein the network node is not allowed to configure the one or more trigger states such that any trigger state of the one or more trigger states is associated with the first report configuration associated with the event and the second report configuration not associated with any (or the) event

METHOD AND APPARATUS FOR CONFIGURATION OF UE-INITIATED BEAM REPORTING IN A WIRELESS COMMUNICATION SYSTEM

CROSS-REFERENCE TO RELATED APPLICATIONS

The present Application claims priority to and the benefit of U.S. Provisional Patent Application Ser. No. 63/659,254, filed Jun. 12, 2024, and U.S. Provisional Patent Application Ser. No. 63/659,260, filed Jun. 12, 2024; with each of the referenced and listed applications and disclosures fully incorporated herein by reference.

FIELD

This disclosure generally relates to wireless communication networks and, more particularly, to a method and apparatus for configuration of User Equipment (UE)-initiated beam reporting in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods, systems, and apparatuses are provided for configuration of User Equipment (UE)-initiated beam reporting in a wireless communication system.

In various embodiments, a method for a UE in a wireless communication system comprises being configured with a plurality of report configurations comprising a first report configuration associated with an event and a second report configuration not associated with any event, and being configured with one or more trigger states associated with one or more report configurations, wherein the UE does not expect that any trigger state of the one or more trigger states is associated with the first report configuration associated with the event and the second report configuration not associated with any event.

In various embodiments, a method for a UE in a wireless communication system comprises triggering a first UE-initiated beam reporting associated with a first report configuration and determining to transmit a first request for the first UE-initiated beam reporting, wherein the first report configuration is configured with a first event, triggering a second UE-initiated beam reporting associated with a second report configuration and determining to transmit a second request for the second UE-initiated beam reporting, wherein the second report configuration is configured with a second event, transmitting the first request if a first Physical Uplink Control Channel (PUCCH) resource for the first request is overlapped with a second PUCCH resource for the second request in time domain, wherein the first request associated with the first UE-initiated beam reporting has a higher priority than the second request associated with the second UE-initiated beam reporting, wherein the first event is based on a comparison between a quality of a current beam of a Serving Cell and a quality of a candidate beam of the Serving Cell, and wherein the second event is based on a comparison between a quality of a current beam of the Serving Cell and a quality of a candidate beam of a candidate Cell, and transmitting a first beam report associated with a first beam reporting.

In various embodiments, a method of a network node in a wireless communication system comprises configuring a UE with a plurality of report configurations comprising a first report configuration associated with an event and a second report configuration not associated with any event, and configuring the UE with one or more trigger states associated with one or more report configurations, wherein the network node is not allowed to configure the one or more trigger states such that any trigger state of the one or more trigger states is associated with the first report configuration associated with the event and the second report configuration not associated with any event.

BRIEF DESCRIPTION OF THE DRAWINGS

FIG. 6 is a reproduction of FIG. 6.1.3.47-1: Unified TCI state activation/deactivation MAC CE, from 3GPP 38.321 v17.4.0.

FIG. 8 is a reproduction of FIG. 6.1.3.75-1: LTM Cell Switch Command MAC CE, from 3GPP 38.321 v18.1.0.

FIG. 9 is a flow diagram of a method of a UE in a wireless communication system comprising triggering a first beam reporting associated with a first cell, triggering a second beam reporting associated with a second cell, determining whether to prioritize the first beam reporting or the second beam reporting based on at least one of: the type of the first cell and/or the second cell, quality of a beam associated with the first cell, quality of a beam associated with the second cell, event(s) associated with triggering the first beam reporting, or event(s) associated with triggering the second beam reporting, in accordance with embodiments of the present invention.

FIG. 10 is an example diagram showing timings and steps for Mode A, corresponding to dynamic scheduling, and Mode B, corresponding to (pre-)configured resources for transmitting the UEI report, in accordance with embodiments of the present invention.

FIG. 11 is a flow diagram of a method of a UE in a wireless communication system comprising maintaining or receiving a configuration associated with one or more UE triggered events, triggering one event (of the one or more UE triggered events) in response to a condition of the one event is fulfilled, receiving a first configuration (or a first parameter) for configuring a first set of resources for a first (UE triggered) report, a first request, and/or a first pre-notification, associated with the first event, preferably in certain embodiments, receiving a second configuration (or a second parameter) for configuring a second set of resources for a second (UE triggered) report, a second request, and/or a second pre-notification, associated with the second event, or the first configuration (or the first parameter) also configures a second set of resources for a second (UE triggered) report, a second request, and/or a second pre-notification, associated with the second event, and based on the one event corresponding to the first event or the second event, the UE transmits a report/request/PN on a corresponding resource, in accordance with embodiments of the present invention.

FIG. 12 is a flow diagram of a method of a UE in a wireless communication system comprising being configured with (or receiving configuration for configuring) a plurality of report configurations comprising a first report configuration associated with an event and a second report configuration not associated with any event, and being configured with (or receiving configuration for configuring) one or more trigger states associated with one or more report configurations, in accordance with embodiments of the present invention.

FIG. 13 is a flow diagram of a method of a Network Node in a wireless communication system comprising configuring a UE with a plurality of report configurations comprising a first report configuration associated with an event and a second report configuration not associated with any event, and configuring the UE with one or more trigger states associated with one or more report configurations, in accordance with embodiments of the present invention.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WIMAX®, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1] RP-234007 New WID: NR MIMO Phase 5; [2] 3GPP 38.214 v17.4.0; [3] 3GPP 38.321 v17.4.0; [4] 3GPP 38.331 v17.4.0; [5] Draft 38.300 v 18.0.0; [6] RP-234036 New WID: NR mobility enhancements Phase 4; [7] 3GPP 38.321 v18.1.0; [8] Chair notes RAN1 #116 eom0; [9] Chair's notes RAN1 #116bis eom0; [10] R2-2405701 Report from session on V2X/SL, R19 NES and MOB; [11] 3GPP RAN2 #126 meeting report; [12] 3GPP 38.331 v18.1.0; and [13] 3GPP 38.212 v18.2.0. The standards and documents listed above are hereby expressly and fully incorporated herein by reference in their entirety.

Figure 1:
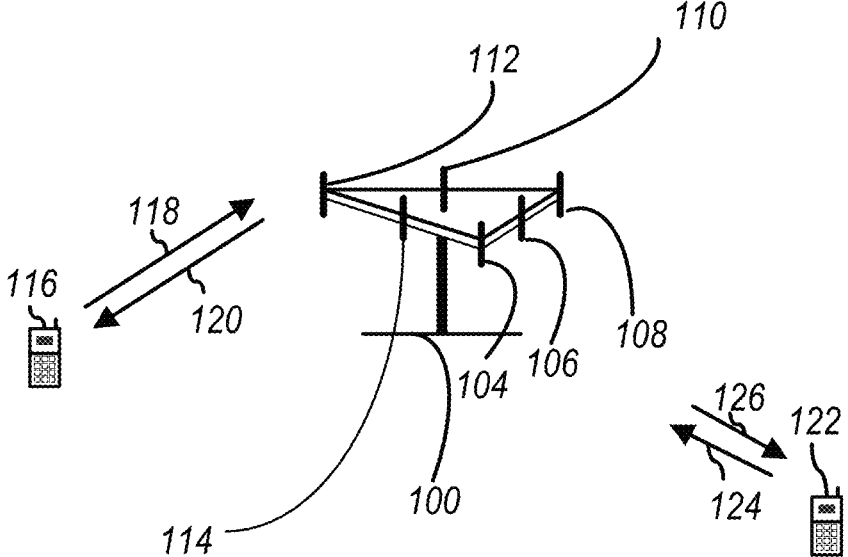
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
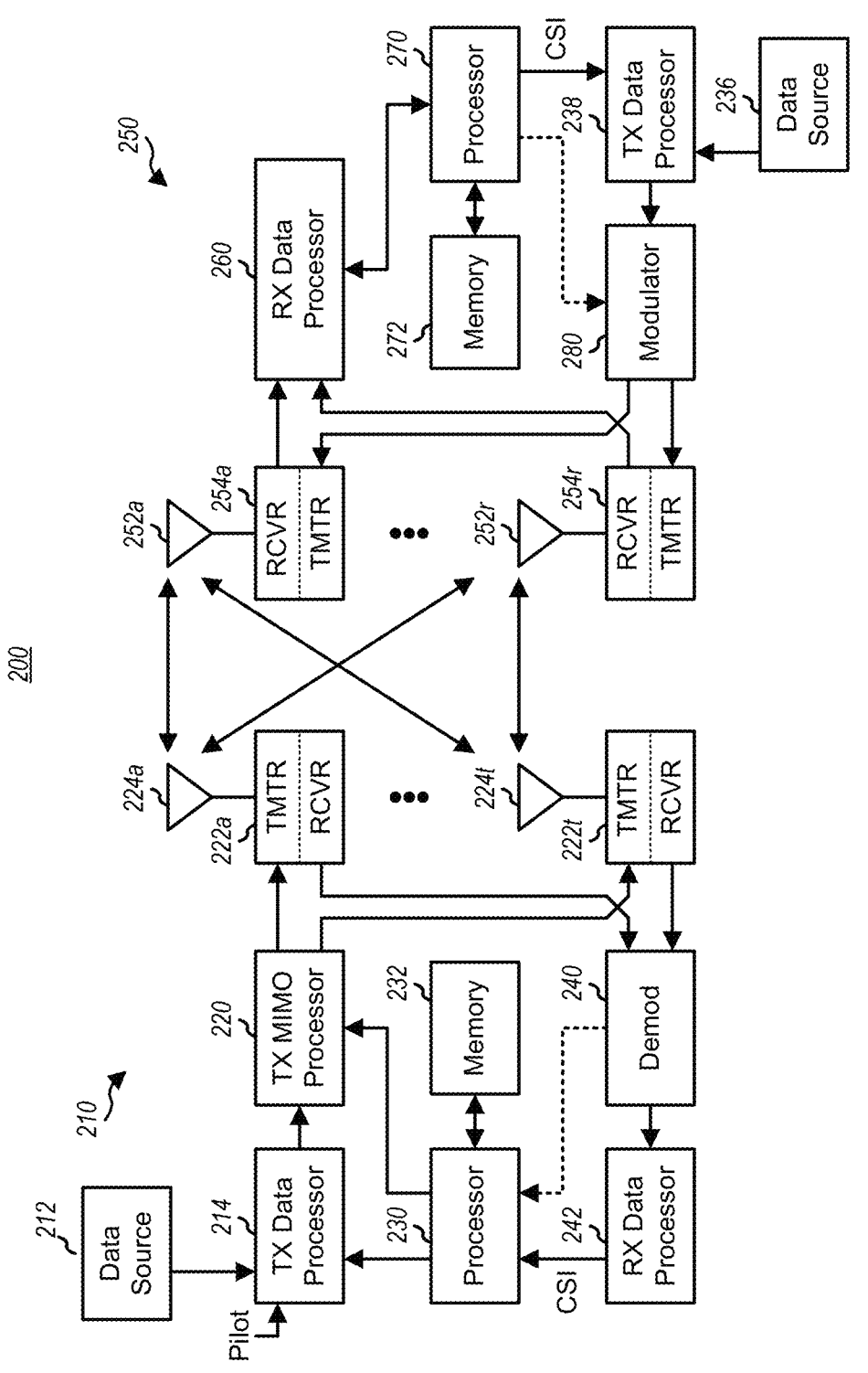
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230. A memory 232 is coupled to processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide NT"detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
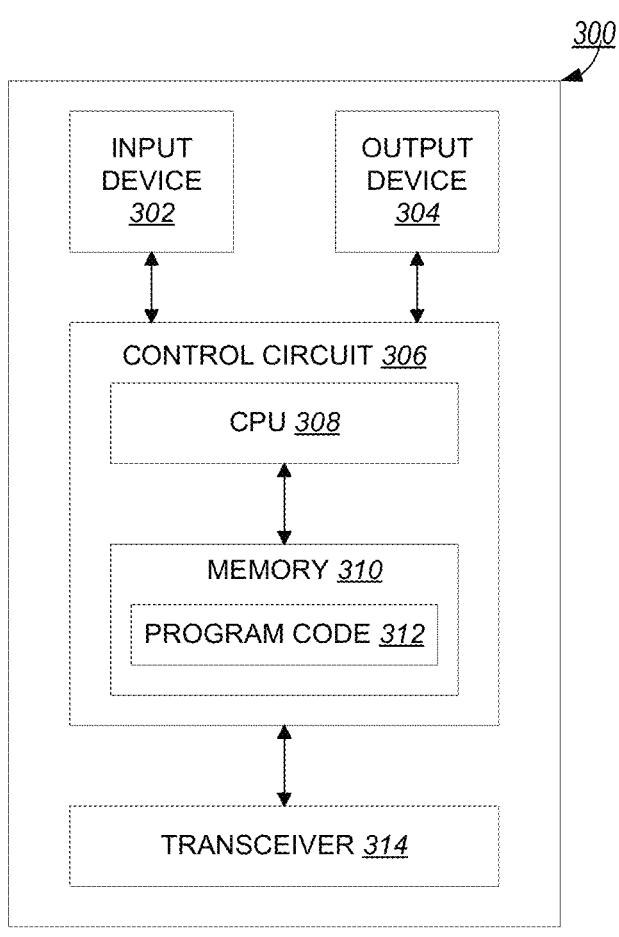
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
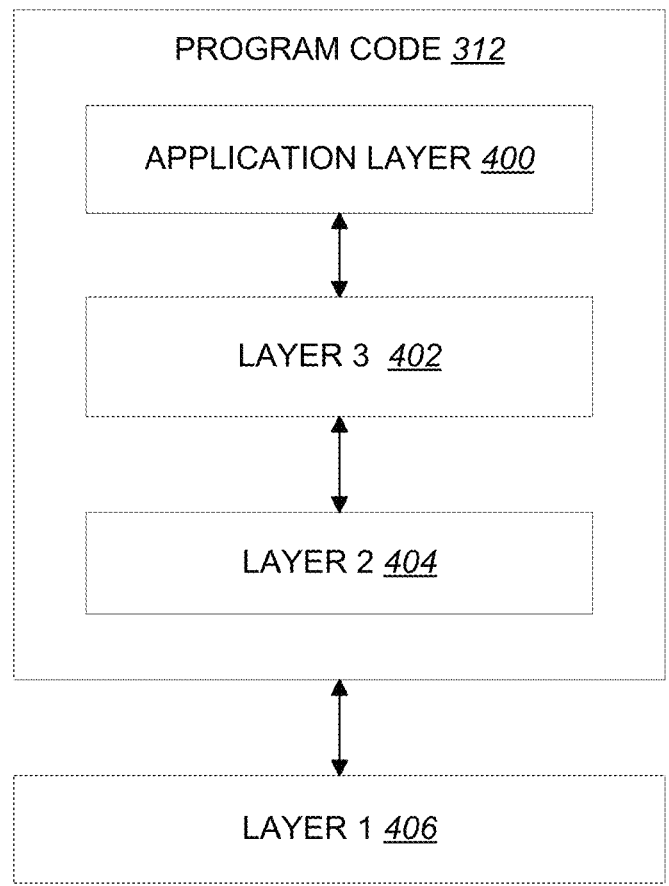
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or NR systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-)bullets, points, actions, or claims described in each invention paragraph or section may be combined logically, reasonably, and properly to form a specific method.

Any sentence, paragraph, (sub-)bullet, point, action, or claim described in each of the following invention paragraphs or sections may be implemented independently and separately to form a specific method or apparatus. Dependency, e.g., "based on", "more specifically", "example", etc., in the following invention disclosure is just one possible embodiment which would not restrict the specific method or apparatus.

In Work item description RP-234007 ([1] RP-234007 New WID: NR MIMO Phase 5), MIMO enhancement for Rel-19 is introduced:

3 Justification

In legacy beam management procedures, the network may configure/activate frequent periodic or semi-persistent beam reporting (e.g., N best beams and corresponding L1-RSRPs) or triggers frequent aperiodic beam reporting to timely acquire the best/preferred beam for data/control transmissions. However, this clearly results in large UL reporting overhead and control signaling overhead. At the same time, if less frequent beam reporting is configured, the network could not always acquire 'best/preferred' beam(s) as the beam reporting by the UE may be outdated, thus leading to performance degradation. Given that UE has better and more-timely knowledge of beam quality changes, UE-initiated beam reporting procedure can lead to more timely beam reports yet with reduced reporting overhead. Under such a procedure, if the UE determines that e.g., current beam(s) quality becomes poor, UE can trigger beam reporting without the network needing to configure or trigger frequent reporting.

4 Objective 4.1 Objective of SI or Core Part WI or Testing Part WI

The detailed objectives are as follows:

1. Specify enhancement to facilitate UE-initiated/event-driven beam management for reducing overhead and/or latency, assuming the unified TCI while leveraging (as much as possible) legacy CSI measurement and reporting configuration frameworks, targeting FR2 and sTRP with intra- and inter-cell beam management a. UL signaling content(s) (and procedure(s) as required) for UE-initiated/event-driven beam reporting facilitating fast beam switching b. UL signaling medium/container considering the UE-initiated/event-driven nature of the UL transmission, designed primarily for the purpose of beam reporting In 38.214 ([2] 3GPP 38.214 v17.4.0), CSI reporting is introduced:

5.2 UE Procedure for Reporting Channel State Information (CSI)

5.2.1 Channel State Information Framework

The procedures on aperiodic CSI reporting described in this clause assume that the CSI reporting is triggered by DCI format 0_1, but they equally apply to CSI reporting triggered by DCI format 0_2, by applying the higher layer parameter reportTriggerSizeDCI-0-2 instead of reportTriggerSize.

The time and frequency resources that can be used by the UE to report CSI are controlled by the gNB. CSI may consist of Channel Quality Indicator (CQI), precoding matrix indicator (PMI), CSI-RS resource indicator (CRI), SS/PBCH Block Resource indicator (SSBRI), layer indicator (LI), rank indicator (RI), L1-RSRP, L1-SINR or CapabilityIndex.

For CQI, PMI, CRI, SSBRI, LI, RI, L1-RSRP, L1-SINR, Capability[Set] Index a UE is configured by higher layers with N≥1 CSI-ReportConfig Reporting Settings, M≥1 CSI-ResourceConfig Resource Settings, and one or two list(s) of trigger states (given by the higher layer parameters CSI-AperiodicTriggerStateList and CSI-SemiPersistentOn-PUSCH-TriggerStateList). Each trigger state in CSI-Ape-riodicTriggerStateList contains a list of associated CSI-ReportConfigs indicating the Resource Set IDs for channel and optionally for interference. Each trigger state in CSI-SemiPersistentOnPUSCH-TriggerStateList contains one associated CSI-ReportConfig.

5.2.1.1 Reporting Settings

Each Reporting Setting CSI-ReportConfig is associated with a single downlink BWP (indicated by higher layer parameter BWP-Id) given in the associated CSI-Re-sourceConfig for channel measurement and contains the parameter(s) for one CSI reporting band: codebook configuration including codebook subset restriction, time-domain behavior, frequency granularity for CQI and PMI, measurement restriction configurations, and the CSI-related quantities to be reported by the UE such as the layer indicator (LI), L1-RSRP, L1-SINR, CRI, and SSBRI (SSB Resource Indicator) and CapabilityIndex.

The time domain behavior of the CSI-ReportConfig is indicated by the higher layer parameter reportConfigType and can be set to 'aperiodic', 'semiPersistentOnPUCCH', 'semiPersistentOnPUSCH', or 'periodic'. For 'periodic' and 'semiPersistentOnPUCCH'/'semiPersistentOnPUSCH' CSI reporting, the configured periodicity and slot offset applies in the numerology of the UL BWP in which the CSI report is configured to be transmitted on. The higher layer parameter reportQuantity indicates the CSI-related, L1-RSRP-related, L1-SINR-related or CapabilityIndex-related quantities to report. The reportFreqConfiguration indicates the reporting granularity in the frequency domain, including the CSI reporting band and if PMI/CQI reporting is wideband or sub-band. The timeRestrictionForChannelMeasurements parameter in CSI-ReportConfig can be configured to enable time domain restriction for channel measurements and tim-eRestrictionForInterferenceMeasurements can be configured to enable time domain restriction for interference measurements. The CSI-ReportConfig can also contain CodebookConfig, which contains configuration parameters for Type-I, Type II, Enhanced Type II CSI, or Further Enhanced Type II Port Selection including codebook subset restriction when applicable, and configurations of group-based reporting. A UE is not expected to be configured with a CSI report setting associated with a dormant DL BWP if the reportConfig Type is set to 'aperiodic'.

5.2.1.2 Resource Settings

Each CSI Resource Setting CSI-ResourceConfig contains a configuration of a list of S≥1 CSI Resource Sets (given by higher layer parameter csi-RS-ResourceSetList), where the list is comprised of references to either or both of NZP CSI-RS resource set(s) and SS/PBCH block set(s) or the list is comprised of references to CSI-IM resource set(s). Each CSI Resource Setting is located in the DL BWP identified by the higher layer parameter BWP-id, and all CSI Resource Settings linked to a CSI Report Setting have the same DL BWP.

The time domain behavior of the CSI-RS resources within a CSI Resource Setting are indicated by the higher layer parameter resourceType and can be set to aperiodic, periodic, or semi-persistent. For periodic and semi-persistent CSI Resource Settings, when the UE is configured with groupBasedBeamReporting-r17, the number of CSI Resource Sets configured is S=2, otherwise the number of CSI-RS Resource Sets configured is limited to S=1. For periodic and semi-persistent CSI Resource Settings, the configured periodicity and slot offset is given in the numerology of its associated DL BWP, as given by BWP-id. When a UE is configured with multiple CSI-ResourceConfigs consisting the same NZP CSI-RS resource ID, the same time domain behavior shall be configured for the CSI-Re-sourceConfigs. When a UE is configured with multiple CSI-ResourceConfigs consisting the same CSI-IM resource ID, the same time-domain behavior shall be configured for the CSI-ResourceConfigs. All CSI Resource Settings linked to a CSI Report Setting shall have the same time domain behavior.

The following are configured via higher layer signaling for one or more CSI Resource Settings for channel and interference measurement:

CSI-IM resource for interference measurement as described in Clause 5.2.2.4.

NZP CSI-RS resource for interference measurement as described in Clause 5.2.2.3.1.

NZP CSI-RS resource for channel measurement as described in Clause 5.2.2.3.1.

The UE may assume that the NZP CSI-RS resource(s) for channel measurement and the CSI-IM resource(s) for interference measurement configured for one CSI reporting are resource-wise QCLed with respect to 'typeD'. When NZP CSI-RS resource(s) is used for interference measurement, the UE may assume that the NZP CSI-RS resource for channel measurement and the CSI-IM resource or NZP CSI-RS resource(s) for interference measurement config-ured for one CSI reporting are QCLed with respect to 'typeD'.

For L1-SINR measurement:

When one Resource Setting is configured, the Resource Setting (given by higher layer parameter resources-ForChannelMeasurement) is for channel and interfer-ence measurement on NZP CSI-RS for L1-SINR com-putation. UE may assume that same 1 port NZP CSI-RS resource(s) with density 3 REs/RB is used for both channel and interference measurements.

When two Resource Settings are configured, the first one Resource Setting (given by higher layer parameter resourcesForChannelMeasurement) is for channel measurement on SSB or NZP CSI-RS and the second one (given by either higher layer parameter csi-IM-ResourcesForInterference or higher layer parameter nzp-CSI-RS-ResourcesForInterference) is for interfer-ence measurement performed on CSI-IM or on 1 port NZP CSI-RS with density 3 REs/RB, where each SSB or NZP CSI-RS resource for channel measurement is associated with one CSI-IM resource or one NZP CSI-RS resource for interference measurement by the ordering of the SSB or NZP CSI-RS resource for set for interference measurement, if any, are config-ured with the higher layer parameter repetition.

5.2.1.4 Reporting Configurations

The UE shall calculate CSI parameters (if reported) assuming the following dependencies between CSI param-eters (if reported)

LI shall be calculated conditioned on the reported CQI, PMI, RI and CR

CQI shall be calculated conditioned on the reported PMI, RI and CRI

PMI shall be calculated conditioned on the reported RI and CRI

RI shall be calculated conditioned on the reported CRI.

The Reporting configuration for CSI can be aperiodic (using PUSCH), periodic (using PUCCH) or semi-persistent (using PUCCH, and DCI activated PUSCH). The CSI-RS Resources can be periodic, semi-persistent, or aperiodic. Table 5.2.1.4-1 shows the supported combinations of CSI Reporting configurations and CSI-RS Resource configura-tions and how the CSI Reporting is triggered for each CSI-RS Resource configuration. Periodic CSI-RS is config-ured by higher layers. Semi-persistent CSI-RS is activated and deactivated as described in Clause 5.2.1.5.2. Aperiodic CSI-RS is configured and triggered/activated as described in Clause 5.2.1.5.1.

TABLE 5.2.1.4-1

Triggering/Activation of CSI Reporting for the possible CSI-RS Configurations.

| CSI-RS Configuration | Periodic CSI Reporting | Semi-Persistent CSI Reporting | Aperiodic CSI Reporting |
|---|---|---|---|
| Periodic CSI-RS | No dynamic triggering/activation | For reporting on PUCCH, the UE receives an activation command, as described in clause 6.1.3.16 of [10, TS 38.321]; for reporting on PUSCH, the UE receives triggering on DCI | Triggered by DCI; additionally, subselection indication as described in clause 6.1.3.13 of [10, TS 38.321] possible as defined in Clause 5.2.1.5.1. |
| Semi-Persistent CSI-RS | Not Supported | For reporting on PUCCH, the UE receives an activation command, as described in clause 6.1.3.16 of [10, TS 38.321]; for reporting on PUSCH, the UE receives triggering on DCI | Triggered by DCI; additionally, subselection indication as described in clause 6.1.3.13 of [10, TS 38.321] possible as defined in Clause 5.2.1.5.1. |
| Aperiodic CSI-RS | Not Supported | Not Supported | Triggered by DCI; additionally, subselection indication as described in clause 6.1.3.13 of [10, TS 38.321] possible as defined in Clause 5.2.1.5.1. | channel measurement and CSI-IM resource or NZP CSI-RS resource for interference measurement in the corresponding resource sets. The number of SSB(s) or CSI-RS resources for channel measurement equals to the number of CSI-IM resources or the number of NZP CSI-RS resource for interference measurement.

UE may apply the SSB, or 'typeD' RS configured with qcl-Type set to 'typeD' to the NZP CSI-RS resource for channel measurement, as the reference RS for determining 'typeD' assumption for the correspond-ing CSI-IM resource or the corresponding NZP CSI-RS resource for interference measurement con-figured for one CSI reporting.

UE may expect that the NZP CSI-RS resource set for channel measurement and the NZP-CSI-RS resource 5.2.1.4.1 Resource Setting Configuration For aperiodic CSI, each trigger state configured using the higher layer parameter CSI-AperiodicTriggerState is asso-ciated with one or multiple CSI-ReportConfig where the CSI-ReportConfig not configured with groupBasedBeam-Reporting-r17 is linked to periodic, or semi-persistent, or aperiodic resource setting(s):

When one Resource Setting is configured, the Resource Setting (given by higher layer parameter resources-ForChannelMeasurement) is for channel measurement for L1-RSRP or for channel and interference measure-ment for L1-SINR computation.

When two Resource Settings are configured, the first one Resource Setting (given by higher layer parameter resourcesForChannelMeasurement) is for channel measurement and the second one (given by either higher layer parameter csi-IM-ResourcesForInterference or higher layer parameter nzp-CSI-RS-ResourcesForInterference) is for interference measurement performed on CSI-IM or on NZP CSI-RS.

When three Resource Settings are configured, the first Resource Setting (higher layer parameter resourcesForChannelMeasurement) is for channel measurement, the second one (given by higher layer parameter csi-IM-ResourcesForInterference) is for CSI-IM based interference measurement and the third one (given by higher layer parameter nzp-CSI-RS-ResourcesForInterference) is for NZP CSI-RS based interference measurement.

. . .

5.2.1.4.2 Report Quantity Configurations

A UE may be configured with a CSI-ReportConfig with the higher layer parameter reportQuantity set to either 'none', 'cri-RI-PMI-CQI', 'cri-RI-i1', 'cri-RI-i1-CQI', 'cri-RI-CQI', 'cri-RSRP', 'cri-SINR', 'ssb-Index-RSRP', 'ssb-Index-SINR', 'cri-RI-LI-PMI-CQI', 'cri-RSRP-Index', 'ssb-Index-RSRP-Index', 'cri-SINR-Index' or 'ssb-Index-SINR-Index'.

If the UE is configured with a CSI-ReportConfig with the higher layer parameter reportQuantity set to 'none', then the UE shall not report any quantity for the CSI-ReportConfig.

. . .

5.2.1.4.3 L1-RSRP REPORTING

For L1-RSRP computation the UE may be configured with CSI-RS resources, SS/PBCH Block resources or both CSI-RS and SS/PBCH block resources, when resource-wise quasi co-located with 'type C' and 'typeD' when applicable.

the UE may be configured with CSI-RS resource setting up to 16 CSI-RS resource sets having up to 64 resources within each set. The total number of different CSI-RS resources over all resource sets is no more than 128.

For L1-RSRP reporting, if the higher layer parameter nrofReportedRS in CSI-ReportConfig is configured to be one, the reported L1-RSRP value is defined by a 7-bit value in the range [−140, −44] dBm with 1 dB step size, if the higher layer parameter nrofReportedRS is configured to be larger than one, or if the higher layer parameter groupBasedBeamReporting is configured as 'enabled', or if the higher layer parameter groupBasedBeamReporting-r17 is configured, the UE shall use differential L1-RSRP based reporting, where the largest measured value of L1-RSRP is quantized to a 7-bit value in the range [−140, −44] dBm with 1 dB step size, and the differential L1-RSRP is quantized to a 4-bit value. The differential L1-RSRP value is computed with 2 dB step size with a reference to the largest measured L1-RSRP value which is part of the same L1-RSRP reporting instance. The mapping between the reported L1-RSRP value and the measured quantity is described in [11, TS 38.133].

When the higher layer parameter groupBasedBeamReporting-r17in CSI-ReportConfig is configured, the UE shall indicate the CSI Resource Set associated with the largest measured value of L1-RSRP, and for each group, CRI or SSBRI of the indicated CSI Resource Set is present first.

If the higher layer parameter timeRestrictionForChannelMeasurements in CSI-ReportConfig is set to "notConfigured", the UE shall derive the channel measurements for computing L1-RSRP value reported in uplink slot n based on only the SS/PBCH or NZP CSI-RS, no later than the CSI reference resource, (defined in TS 38.211[4]) associated with the CSI resource setting.

If the higher layer parameter timeRestrictionForChannelMeasurements in CSI-ReportConfig is set to "Configured", the UE shall derive the channel measurements for computing L1-RSRP reported in uplink slot n based on only the most recent, no later than the CSI reference resource, occasion of SS/PBCH or NZP CSI-RS (defined in [4, TS 38.211]) associated with the CSI resource setting.

When the UE is configured with SSB-MTC-AddtionalPCI, a CSI-SSB-ResourceSet configured for L1-RSRP reporting includes one set of SSB indices and one set of PCI indices, where each SSB index is associated with a PCI index.

When the UE is configured with a CSI-ReportConfig with the higher layer parameter reportQuantity set to 'cri-RSRP-Index' or 'ssb-Index-RSRP-Index' an index of UE capability value set, indicating the maximum supported number of SRS antenna ports, is reported along with the pair of SSBRI/CRI and L1-RSRP.

5.2.1.5 Triggering/Activation of CSI Reports and CSI-RS 5.2.1.5.1 Aperiodic CSI Reporting/Aperiodic CSI-RS when the Triggering PDCCH and the CSI-RS have the Same Numerology For CSI-RS resource sets associated with Resource Settings configured with the higher layer parameter resourceType set to 'aperiodic', 'periodic', or 'semi-persistent', trigger states for Reporting Setting(s) (configured with the higher layer parameter reportConfig Type set to 'aperiodic') and/or Resource Setting for channel and/or interference measurement on one or more component carriers are configured using the higher layer parameter CSI-AperiodicTriggerStateList. For aperiodic CSI report triggering, a single set of CSI triggering states are higher layer configured, wherein the CSI triggering states can be associated with any candidate DL BWP. A UE is not expected to receive more than one DCI with non-zero CSI request field per slot per cell. A UE is not expected to receive DCI with non-zero CSI request field within a cell group in a slot overlapping with any slot receiving DCI with non-zero CSI request field in the same cell group. A UE is not expected to be configured with different TCI-StateId's for the same aperiodic CSI-RS resource ID configured in multiple aperiodic CSI-RS resource sets with the same triggering offset in the same aperiodic trigger state. A UE is not expected to receive more than one aperiodic CSI report request for transmission in a given slot per cell. A UE is not expected to receive an aperiodic CSI report request for transmission in a slot overlapping with any slot having an aperiodic CSI report transmission in the same cell group. If a UE does not indicate its capability of CSItriggerStateContainingNonactiveBWP the UE is not expected to be triggered with a CSI report for a non-active DL BWP. Otherwise, when a UE is triggered with a CSI report for a DL BWP that is non-active when expecting to receive the most recent occasion, no later than the CSI reference resource, of the associated NZP CSI-RS, the UE is not expected to report the CSI for the non-active DL BWP and the CSI report associated with that BWP is omitted. When a UE is triggered with aperiodic NZP CSI-RS in a DL BWP that is non-active when expecting to receive the NZP CSI-RS, the UE is not expected to measure the aperiodic CSI-RS. In the carrier of the serving cell expecting to receive that associated NZP CSI-RS, if the active DL BWP when receiving the NZP CSI-RS is different from the active DL BWP when receiving the triggering DCI, the last symbol of the PDCCH span of the DCI carrying the BWP switching shall be no later than the last symbol of the PDCCH span of the DCI carrying the CSI trigger, irrespective of whether they are in the same carrier of a serving cell or not and irrespective of whether they are in the same SCS or not;

the UE is not expected to have any other BWP switching in that carrier after the last symbol of the PDCCH span covering the DCI carrying the CSI trigger and before the first symbol of the triggered NZP CSI-RS or CSI-IM.

when the PDCCH reception includes two PDCCH candidates from two respective search space sets, as described in clause 10.1 of [6, TS 38.213], the span that involves the PDCCH candidate that ends later in time is used.

A trigger state is initiated using the CSI request field in DCI.

When all the bits of CSI request field in DCI are set to zero, no CSI is requested.

When the number of configured CSI triggering states in CSI-AperiodicTriggerStateList is greater than $2^{N_{TS}}-1$ where $N_{TS}$ is the number of bits in the DCI CSI request field, the UE receives a subselection indication, as described in clause 6.1.3.13 of [10, TS 38.321], used to map up to $2^{N_{TS}}-1$ trigger states to the codepoints of the CSI request field in DCI. $N_{TS}$ is configured by the higher layer parameter reportTriggerSize where $N_{TS}$ ∈{0,1,2,3,4,5,6}. When the UE would transmit a PUCCH with HARQ-ACK information in slot n corresponding to the PDSCH carrying the subselection indication, the corresponding action in [10, TS 38.321] and UE assumption on the mapping of the selected CSI trigger state(s) to the codepoint(s) of DCI CSI request field shall be applied starting from the first slot that is after slot $$n + 3N_{slot}^{subframe,\mu} + \frac{2^{\mu}}{2^{\mu K_{mac}}} \cdot k_{mac}$$

where μ is the SCS configuration for the PUCCH and $\mu_{K_{mac}}$ is the subcarrier spacing configuration for $k_{mac}$ with a value of 0 for frequency range 1, and $k_{mac}$ is provided by K-Mac or $k_{mac}=0$ if K-Mac is not provided.

When the number of CSI triggering states in CSI-AperiodicTriggerStateList is less than or equal to $2^{N_{TS}}-1$, the CSI request field in DCI directly indicates the triggering state.

For each aperiodic CSI-RS resource in a CSI-RS resource set associated with each CSI triggering state, the UE is indicated the quasi co-location configuration of quasi co-location RS source(s) and quasi co-location type(s), as described in clause 5.1.5, through higher layer signaling of qcl-info which contains a list of references to TCI-State's for the aperiodic CSI-RS resources associated with the CSI triggering state. If a State referred to in the list is configured with a reference to an RS configured with qcl-Type set to 'typeD', that RS may be an SS/PBCH block located in the same or different CC/DL BWP or a CSI-RS resource configured as periodic or semi-persistent located in the same or different CC/DL BWP.

. . .

5.2.5 Priority Rules for CSI Reports

For two overlapping PUSCHs, the priority rules in this clause are applied for physical channels with same priority index according to clause 9 in [6, TS 38.213] if a UE is not configured with enableSTx2PofmDCI or a UE is configured by higher layer parameter PDCCH-Config that contains two different values of coresetPoolIndex in ControlResourceSet and the UE is configured with enableSTx2PofmDCI and the two overlapping PUSCHs are associated with same value of coresetPoolIndex.

CSI reports are associated with a priority value $Pri_{iCSI}$ (y, k, c, s)=$2 \cdot N_{cells} \cdot M_s \cdot y + N_{cells} \cdot M_s \cdot k + M_s \cdot c + s$ where y=0 for aperiodic CSI reports to be carried on PUSCH y=1 for semi-persistent CSI reports to be carried on PUSCH, y=2 for semi-persistent CSI reports to be carried on PUCCH and y=3 for periodic CSI reports to be carried on PUCCH;

k=0 for CSI reports carrying L1-RSRP or L1-SINR and k=1 for CSI reports not carrying L1-RSRP or L1-SINR;

c is the serving cell index and $N_{cells}$ is the value of the higher layer parameter maxNrofServingCells;

for a CSI report configured with LTM-CSI-ReportConfig, c is the serving cell index value where the report configuration is configured.

s is the reportConfigID and $M_s$ is the value of the higher layer parameter maxNrofCSI-ReportConfigurations.

for a CSI report configured with LTM-CSI-ReportConfig, s is the LTM-CSI-ReportConfigID and Ms is the value of the higher layer parameter maxNrofLTM-CSI-ReportConfigurations A first CSI report is said to have priority over second CSI report if the associated $Pri_{iCSI}$(y,k,c,s) value is lower for the first report than for the second report.

Two CSI reports are said to collide if the time occupancy of the physical channels scheduled to carry the CSI reports overlap in at least one OFDM symbol and are transmitted on the same carrier. When a UE is configured to transmit two colliding CSI reports, if y values are different between the two CSI reports, the following rules apply except for the case when one of the y value is 2 and the other y value is 3 (for CSI reports transmitted on PUSCH, as described in Clause 5.2.3; for CSI reports transmitted on PUCCH, as described in Clause 5.2.4):

The CSI report with higher $Pri_{iCSI}$(y, k, c, s) value shall not be sent by the UE.

otherwise, the two CSI reports are multiplexed or either is dropped based on the priority values, as described in Clause 9.2.5.2 in [6, TS 38.213].

A CSI report configured with LTM-CSI-ReportConfig has a higher priority over all CSI report(s) configured with CSI-ReportConfig irrespective of $Pri_{iCSI}$(y, k, c, s) value in case of collision with CSI report(s) configured with CSI-ReportConfig.

If a semi-persistent CSI report to be carried on PUSCH overlaps in time with PUSCH data transmission in one or more symbols on the same carrier, and if the earliest symbol of these PUSCH channels starts no earlier than $N_2+d_{2,1}$ symbols after the last symbol of the DCI scheduling PUSCH where $d_{2,1}$ is the maximum of the $d_{2,1}$ associated with the PUSCH carrying semi-persistent CSI report and the PUSCH with data transmission, the CSI report shall not be transmitted by the UE. Otherwise, if the timeline requirement is not satisfied this is an error case.

If a UE would transmit a first PUSCH that includes semi-persistent CSI reports and a second PUSCH that includes an UL-SCH on the same carrier, and the first PUSCH transmission would overlap in time with the second PUSCH transmission, the UE does not transmit the first PUSCH and transmits the second PUSCH. The UE expects that the first and second PUSCH transmissions satisfy the above timing conditions for PUSCH transmissions that overlap in time when at least one of the first or second PUSCH transmissions is in response to a DCI format detection by the UE.

In 38.321 ([3]3GPP 38.321 v17.4.0), Multiplexing and assembly, Scheduling Request, activation of beam for channel(s) and TCI state activation MAC CE(s) are introduced:

5.4.3 Multiplexing and Assembly
5.4.3.1 Logical Channel Prioritization
5.4.3.1.1 General The Logical Channel Prioritization (LCP) procedure is applied whenever a new transmission is performed.

. . .

5.4.3.1.3 Allocation of resources

. . .

Logical channels shall be prioritised in accordance with the following order (highest priority listed first):

MAC CE for C-RNTI, or data from UL-CCCH;

MAC CE for (Enhanced) BFR, or MAC CE for Configured Grant Confirmation, or MAC CE for Multiple Entry Configured Grant Confirmation;

MAC CE for Sidelink Configured Grant Confirmation;

MAC CE for LBT failure;

MAC CE for Timing Advance Report;

MAC CE for SL-BSR prioritized according to clause 5.22.1.6;

MAC CE for (Extended) BSR, with exception of BSR included for padding;

MAC CE for (Enhanced) Single Entry PHR, or MAC CE for (Enhanced) Multiple Entry PHR;

MAC CE for Positioning Measurement Gap Activation/ Deactivation Request;

MAC CE for the number of Desired Guard Symbols;

MAC CE for Case-6 Timing Request;

MAC CE for (Extended) Pre-emptive BSR;

MAC CE for SL-BSR, with exception of SL-BSR prioritized according to clause 5.22.1.6 and SL-BSR included for padding;

MAC CE for IAB-MT Recommended Beam Indication, or MAC CE for Desired IAB-MT PSD range, or MAC CE for Desired DL Tx Power Adjustment;

data from any Logical Channel, except data from UL-CCCH;

MAC CE for Recommended bit rate query;

MAC CE for BSR included for padding;

MAC CE for SL-BSR included for padding.

NOTE 2: Prioritization among MAC CEs of same priority is up to UE implementation.

The MAC entity shall prioritize any MAC CE listed in a higher order than 'data from any Logical Channel, except data from UL-CCCH' over NR sidelink transmission.

5.4.3.2 Multiplexing of MAC Control Elements and MAC SDUs

The MAC entity shall multiplex MAC CEs and MAC SDUs in a MAC PDU according to clauses 5.4.3.1 and 6.1.2.

5.4.4 Scheduling Request

The Scheduling Request (SR) is used for requesting UL-SCH resources for new transmission.

The MAC entity may be configured with zero, one, or more SR configurations. An SR configuration consists of a set of PUCCH resources for SR across different BWPs and cells. For a logical channel or for SCell beam failure recovery (see clause 5.17) and for consistent LBT failure recovery (see clause 5.21), at most one PUCCH resource for SR is configured per BWP. For a logical channel serving a radio bearer configured with SDT, PUCCH resource for SR is not configured for SDT. For beam failure recovery of BFD-RS set(s) of Serving Cell, up to two PUCCH resources for SR is configured per BWP. For positioning measurement gap activation/deactivation request, a dedicated SR configuration is configured.

Each SR configuration corresponds to one or more logical channels and/or to SCell beam failure recovery and/or to consistent LBT failure recovery and/or to beam failure recovery of a BFD-RS set and/or to positioning measurement gap activation/deactivation request. Each logical channel, SCell beam failure recovery, beam failure recovery of a BFD-RS set and consistent LBT failure recovery, may be mapped to zero or one SR configuration, which is configured by RRC. The SR configuration of the logical channel that triggered a BSR (clause 5.4.5) or the SCell beam failure recovery or the beam failure recovery of a BFD-RS set or the consistent LBT failure recovery (clause 5.21) (if such a configuration exists) or positioning measurement gap activation/deactivation request (clause 5.25) is considered as corresponding SR configuration for the triggered SR. Any SR configuration may be used for an SR triggered by Pre-emptive BSR (clause 5.4.7) or Timing Advance reporting (clause 5.4.8).

RRC configures the following parameters for the scheduling request procedure:

sr-ProhibitTimer (per SR configuration);

sr-TransMax (per SR configuration).

The following UE variables are used for the scheduling request procedure:

SR_COUNTER (per SR configuration).

If an SR is triggered and there are no other SRs pending corresponding to the same SR configuration, the MAC entity shall set the SR_COUNTER of the corresponding SR configuration to 0.

When an SR is triggered, it shall be considered as pending until it is cancelled.

. . .

Only PUCCH resources on a BWP which is active at the time of SR transmission occasion are considered valid.

As long as at least one SR is pending, the MAC entity shall for each pending SR:

1> if the MAC entity has no valid PUCCH resource configured for the pending SR:

2> initiate a Random Access procedure (see clause 5.1) on the SpCell and cancel the pending SR.

1> else, for the SR configuration corresponding to the pending SR:

2> when the MAC entity has an SR transmission occasion on the valid PUCCH resource for SR configured; and 2> if sr-ProhibitTimer is not running at the time of the SR transmission occasion; and 2> if the PUCCH resource for the SR transmission occasion does not overlap with a measurement gap:

3> if the PUCCH resource for the SR transmission occasion overlaps with neither a UL-SCH resource whose simultaneous transmission with the SR is not allowed by configuration of simultaneousPUCCH-PUSCH or simultaneousPUCCH-PUSCH-SecondaryPUCCHgroup or simultaneousSR-PUSCH-diffPUCCH-Groups nor an SL-SCH resource; or 3> if the MAC entity is able to perform this SR transmission simultaneously with the transmission of the SL-SCH resource; or 3> if the MAC entity is configured with lch-basedPrioritization, and the PUCCH resource for the SR transmission occasion does not overlap with the PUSCH duration of an uplink grant received in a Random Access Response or with the PUSCH duration of an uplink grant addressed to Temporary C-RNTI or with the PUSCH duration of a MSGA payload, and the PUCCH resource for the SR transmission occasion for the pending SR triggered as specified in clause 5.4.5 overlaps with any other UL-SCH resource(s), and the physical layer can signal the SR on one valid PUCCH resource for SR, and the priority of the logical channel that triggered SR is higher than the priority of the uplink grant(s) for any UL-SCH resource(s) where the uplink grant was not already de-prioritized and its simultaneous transmission with the SR is not allowed by configuration of simultaneousPUCCH-PUSCH or simultaneousPUCCH-PUSCH-SecondaryPUCCHgroup or simultaneousSR-PUSCH-diffPUCCHgroups, and the priority of the uplink grant is determined as specified in clause 5.4.1; or 3> if both sl-PrioritizationThres and ul-PrioritizationThres are configured and the PUCCH resource for the SR transmission occasion for the pending SR triggered as specified in clause 5.22.1.5 overlaps with any UL-SCH resource(s) carrying a MAC PDU, and the value of the priority of the triggered SR determined as specified in clause 5.22.1.5 is lower than sl-PrioritizationThres and the value of the highest priority of the logical channel(s) in the MAC PDU is higher than or equal to ul-PrioritizationThres and any MAC CE prioritized as described in clause 5.4.3.1.3 is not included in the MAC PDU and the MAC PDU is not prioritized by upper layer according to TS 23.287 [19]; or 3> if an SL-SCH resource overlaps with the PUCCH resource for the SR transmission occasion for the pending SR triggered as specified in clause 5.4.5, and the MAC entity is not able to perform this SR transmission simultaneously with the transmission of the SL-SCH resource, and either transmission on the SL-SCH resource is not prioritized as described in clause 5.22.1.3.1a or the priority value of the logical channel that triggered SR is lower than ul-PrioritizationThres, if configured; or 3> if an SL-SCH resource overlaps with the PUCCH resource for the SR transmission occasion for the pending SR triggered as specified in clause 5.22.1.5, and the MAC entity is not able to perform this SR transmission simultaneously with the transmission of the SL-SCH resource, and the priority of the triggered SR determined as specified in clause 5.22.1.5 is higher than the priority of the MAC PDU determined as specified in clause 5.22.1.3.1a for the SL-SCH resource:

4> consider the SR transmission as a prioritized SR transmission.

4> consider the other overlapping uplink grant(s), if any, as a de-prioritized uplink grant(s), except for the overlapping uplink grant(s) whose simultaneous transmission is allowed by configuration of simultaneousPUCCH-PUSCH or simultaneousPUCCH-PUSCH-SecondaryPUCCHgroup or simultaneousSR-PUSCH-diffPUCCH-Groups;

4> if the de-prioritized uplink grant(s) is a configured uplink grant configured with autonomousTx whose PUSCH has already started:

5> stop the configuredGrantTimer for the corresponding HARQ process of the de-prioritized uplink grant(s);

5> stop the cg-RetransmissionTimer for the corresponding HARQ process of the de-prioritized uplink grant(s).

4> if SR_COUNTER<sr-TransMax:

5> instruct the physical layer to signal the SR on one valid PUCCH resource for SR;

5> if LBT failure indication is not received from lower layers:

6> increment SR_COUNTER by 1;

6> start the sr-ProhibitTimer.

5> else if lbt-FailureRecoveryConfig is not configured:

6> increment SR_COUNTER by 1.

4> else:

5> notify RRC to release PUCCH for all Serving Cells;

5> notify RRC to release SRS for all Serving Cells;

5> clear any configured downlink assignments and uplink grants;

5> clear any PUSCH resources for semi-persistent CSI reporting;

5> initiate a Random Access procedure (see clause 5.1) on the SpCell and cancel all pending SRs.

3> else:

4> consider the SR transmission as a de-prioritized SR transmission.

5.18.4 Activation/Deactivation of UE-Specific PDSCH TCI State

The network may activate and deactivate the configured TCI states for PDSCH of a Serving Cell or a set of Serving Cells configured in simultaneousTCI-UpdateList1 or simultaneousTCI-UpdateList2 by sending the TCI States Activation/Deactivation for UE-specific PDSCH MAC CE described in clause 6.1.3.14. The network may activate and deactivate the configured TCI states for a codepoint of the DCI Transmission configuration indication field as specified in TS 38.212 [9] for PDSCH of a Serving Cell by sending the Enhanced TCI States Activation/Deactivation for UE-specific PDSCH MAC CE described in clause 6.1.3.24. The configured TCI states for PDSCH are initially deactivated upon (re-)configuration by upper layers and after reconfiguration with sync.

The MAC entity shall:

1> if the MAC entity receives a TCI States Activation/Deactivation for UE-specific PDSCH MAC CE on a Serving Cell:

2> indicate to lower layers the information regarding the TCI States Activation/Deactivation for UE-specific PDSCH MAC CE.

1> if the MAC entity receives an Enhanced TCI States Activation/Deactivation for UE-specific PDSCH MAC CE on a Serving Cell:

2> indicate to lower layers the information regarding the Enhanced TCI States Activation/Deactivation for UE-specific PDSCH MAC CE.

5.18.5 Indication of TCI State for UE-Specific PDCCH

The network may indicate a TCI state for PDCCH reception for a CORESET of a Serving Cell or a set of Serving Cells configured in simultaneousTCI-UpdateList1 or simultaneousTCI-UpdateList2 by sending the TCI State Indication for UE-specific PDCCH MAC CE described in clause 6.1.3.15. The network may also indicate two TCI states for PDCCH reception for a CORESET of a Serving Cell or a set of Serving Cells configured in simultaneousTCI-UpdateList1 or simultaneousTCI-UpdateList2 by sending the Enhanced TCI States Indication for UE-specific PDCCH MAC CE described in clause 6.1.3.44.

The MAC entity shall:

1> if the MAC entity receives a TCI State Indication for UE-specific PDCCH MAC CE on a Serving Cell:

2> indicate to lower layers the information regarding the TCI State Indication for UE-specific PDCCH MAC CE.

1> if the MAC entity receives an Enhanced TCI States Indication for UE-specific PDCCH MAC CE on a Serving Cell:

2> indicate to lower layers the information regarding the Enhanced TCI States Indication for UE-specific PDCCH MAC CE.

. . .

5.18.23 Unified TCI States Activation/Deactivation MAC CE

The network may activate and deactivate the configured unified TCI states of a Serving Cell or a set of Serving Cells configured in simultaneousU-TCI-UpdateList1, simultaneousU-TCI-UpdateList2, simultaneousU-TCI-UpdateList3 or simultaneousU-TCI-UpdateList4 by sending the Unified TCI States Activation/Deactivation MAC CE described in clause 6.1.3.47. The configured unified TCI states are initially deactivated upon (re-)configuration by upper layers and after reconfiguration with sync.

The MAC entity shall:

1> if the MAC entity receives a Unified TCI States Activation/Deactivation MAC CE on a Serving Cell:

2> indicate to lower layers the information regarding the Unified TCI States Activation/Deactivation MAC CE.

6.1.3.13 Aperiodic CSI Trigger State Subselection MAC CE

Figure 5:
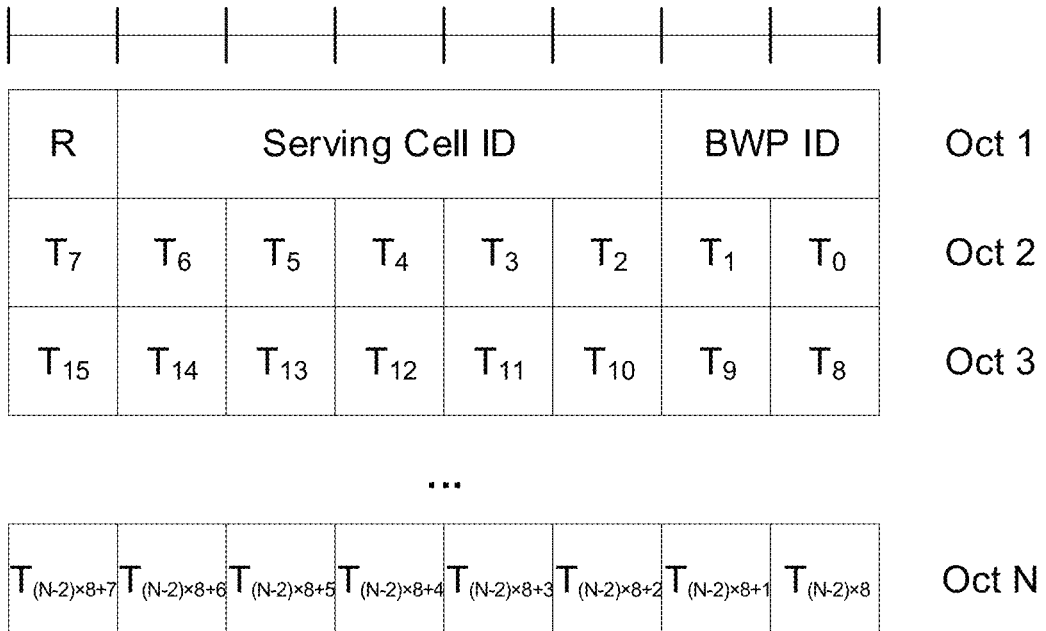
FIG. 5 is a reproduction of FIG. 6.1.3.13-1: Aperiodic CSI Trigger State Subselection MAC CE, from 3GPP 38.321 v17.4.0.

The Aperiodic CSI Trigger State Subselection MAC CE is identified by a MAC subheader with LCID as specified in Table 6.2.1-1. It has a variable size consisting of following fields:

Serving Cell ID: This field indicates the identity of the Serving Cell for which the MAC CE applies. The length of the field is 5 bits;

BWP ID: This field indicates a DL BWP for which the MAC CE applies as the codepoint of the DCI bandwidth part indicator field as specified in TS 38.212 [9]. The length of the BWP ID field is 2 bits;

$T_i$: This field indicates the selection status of the Aperiodic Trigger States configured within aperiodicTriggerStateList, as specified in TS 38.331 [5]. $T_0$ refers to the first trigger state within the list, $T_1$ to the second one and so on. If the list does not contain entry with index i, MAC entity shall ignore the $T_i$ field. The $T_i$ field is set to 1 to indicate that the Aperiodic Trigger State i shall be mapped to the codepoint of the DCI CSI request field, as specified in TS 38.214 [7]. The codepoint to which the Aperiodic Trigger State is mapped is determined by its ordinal position among all the Aperiodic Trigger States with $T_i$ field set to 1, i.e. the first Aperiodic Trigger State with $T_i$ field set to 1 shall be mapped to the codepoint value 1, second Aperiodic Trigger State with $T_i$ field set to 1 shall be mapped to the codepoint value 2 and so on. The maximum number of mapped Aperiodic Trigger States is 63;

FIG. 5 is a reproduction of FIG. 6.1.3.13-1: Aperiodic CSI Trigger State Subselection MAC CE, from 3GPP 38.321 v17.4.0.

6.1.3.47 Unified TCI States Activation/Deactivation MAC CE

The Unified TCI States Activation/Deactivation MAC CE is identified by a MAC subheader with eLCID as specified in Table 6.2.1-1b. It has a variable size consisting of following fields:

Serving Cell ID: This field indicates the identity of the Serving Cell for which the MAC CE applies. The length of the field is 5 bits. If the indicated Serving Cell is configured as part of a simultaneousU-TCI-UpdateList1, simultaneousU-TCI-UpdateList2, simultaneousU-TCI-UpdateList3 or simultaneousU-TCI-UpdateList4 as specified in TS 38.331 [5], this MAC CE applies to all theServing Cells in the set simultaneousU-TCI-UpdateList1, simultaneousU-TCI-UpdateList2, simultaneousU-TCI-UpdateList3 or simultaneousU-TCI-UpdateList4, respectively;

DL BWP ID: This field indicates a DL BWP for which the MAC CE applies as the codepoint of the DCI bandwidth part indicator field as specified in TS 38.212 [9]. The length of the BWP ID field is 2 bits;

UL BWP ID: This field indicates a UL BWP for which the MAC CE applies as the codepoint of the DCI bandwidth part indicator field as specified in TS 38.212 [9]. If value of unifiedTCI-StateType in the Serving Cell indicated by Serving Cell ID is joint, this field is considered as the reserved bits. The length of the BWP ID field is 2 bits;

$P_i$: This field indicates whether each TCI codepoint has multiple TCI states or single TCI state. If $P_i$ field is set to 1, it indicates that $i^{th}$ TCI codepoint includes the DL TCI state and the UL TCI state. If $P_i$ field is set to 0, it indicates that $i^{th}$ TCI codepoint includes only the DL/joint TCI state or the UL TCI state. The codepoint to which a TCI state is mapped is determined by its ordinal position among all the TCI state ID fields;

D/U: This field indicate whether the TCI state ID in the same octet is for joint/downlink or uplink TCI state. If this field is set to 1, the TCI state ID in the same octet is for joint/downlink. If this field is set to 0, the TCI state ID in the same octet is for uplink;

TCI state ID: This field indicates the TCI state identified by TCI-StateId as specified in TS 38.331 [5]. If D/U is set to 1, 7-bits length TCI state ID i.e. TCI-StateId as specified in TS 38.331 [5] is used. If D/U is set to 0, the most significant bit of TCI state ID is considered as the reserved bit and remainder 6 bits indicate the TCI-UL-State-Id as specified in TS 38.331 [5]. The maximum number of activated TCI states is 16;

FIG. 6 is a reproduction of FIG. 6.1.3.47-1: Unified TCI state activation/deactivation MAC CE, from 3GPP 38.321 v17.4.0.

In 38.331 ([4]3GPP 38.331 v17.4.0), measurement events and TCI state configurations for Uplink and downlink are introduced:

5.5.4 Measurement Report Triggering 5.5.4.1 General

If AS security has been activated successfully, the UE shall:

1> for each measId included in the measIdList within VarMeasConfig:

. . .

2> if the reportType is set to eventTriggered and if the entry condition applicable for this event, i.e. the event corresponding with the eventId of the corresponding reportConfig within VarMeasConfig, is fulfilled for one or more applicable cells for all measurements after layer 3 filtering taken during timeToTrigger defined for this event within the VarMeasConfig, while the VarMeasReportList does not include a measurement reporting entry for this measId (a first cell triggers the event):

3> include a measurement reporting entry within the VarMeasReportList for this measId;

3> set the numberOfReportsSent defined within the VarMeasReportList for this measId to 0;

3> include the concerned cell(s) in the cellsTriggeredList defined within the VarMeasReportList for this measId;

. . .

3> initiate the measurement reporting procedure, as specified in 5.5.5;

2> else if the reportType is set to eventTriggered and if the entry condition applicable for this event, i.e. the event corresponding with the eventId of the corresponding reportConfig within VarMeasConfig, is fulfilled for one or more applicable cells not included in the cellsTriggeredList for all measurements after layer 3 filtering taken during timeToTrigger defined for this event within the VarMeasConfig (a subsequent cell triggers the event):

3> set the numberOfReportsSent defined within the VarMeasReportList for this measId to 0;

3> include the concerned cell(s) in the cellsTriggeredList defined within the VarMeasReportList for this measId;

. . .

3> initiate the measurement reporting procedure, as specified in 5.5.5;

2> if the reportType is set to eventTriggered and if the leaving condition applicable for this event is fulfilled for one or more of the cells included in the cellsTriggeredList defined within the VarMeasReportList for this measId for all measurements after layer 3 filtering taken during timeToTrigger defined within the VarMeasConfig for this event:

3> remove the concerned cell(s) in the cellsTriggeredList defined within the VarMeasReportList for this measId;

3> if reportOnLeave is set to true for the corresponding reporting configuration:

4> initiate the measurement reporting procedure, as specified in 5.5.5;

. . .

2> else if the reportType is set to eventTriggered and if the entry condition applicable for this event, i.e. the event corresponding with the eventId of the corresponding reportConfig within VarMeasConfig, is fulfilled for one or more applicable transmission resource pools for all measurements taken during timeToTrigger defined for this event within the VarMeasConfig, while the VarMeasReportList does not include an measurement reporting entry for this measId (a first transmission resource pool triggers the event):

3> include a measurement reporting entry within the VarMeasReportList for this measId;

3> set the numberOfReportsSent defined within the VarMeasReportList for this measId to 0;

3> include the concerned transmission resource pool(s) in the poolsTriggeredList defined within the VarMeasReportList for this measId;

3> initiate the measurement reporting procedure, as specified in 5.5.5;

2> else if the reportType is set to eventTriggered and if the entry condition applicable for this event, i.e. the event corresponding with the eventId of the corresponding reportConfig within VarMeasConfig, is fulfilled for one or more applicable transmission resource pools not included in the poolsTriggeredList for all measurements taken during timeToTrigger defined for this event within the VarMeasConfig (a subsequent transmission resource pool triggers the event):

3> set the numberOfReportsSent defined within the VarMeasReportList for this measId to 0;

3> include the concerned transmission resource pool(s) in the poolsTriggeredList defined within the VarMeasReportList for this measId;

3> initiate the measurement reporting procedure, as specified in 5.5.5;

2> if the reportType is set to eventTriggered and if the leaving condition applicable for this event is fulfilled for one or more applicable transmission resource pools included in the poolsTriggeredList defined within the VarMeasReportList for this measId for all measurements taken during timeToTrigger defined within the VarMeasConfig for this event:

3> remove the concerned transmission resource pool(s) in the poolsTriggeredList defined within the VarMeasReportList for this measId;

3> if the poolsTriggeredList defined within the VarMeasReportList for this measId is empty:

4> remove the measurement reporting entry within the VarMeasReportList for this measId;

4> stop the periodical reporting timer for this measId, if running

2> else if the reportType is set to eventTriggered and if the eventId is set to eventD1 and if the entering condition applicable for this event, i.e. the event corresponding with the eventId of the corresponding reportConfig within VarMeasConfig, is fulfilled during timeToTrigger defined for this event within the VarMeasConfig, while the VarMeasReportList does not include a measurement reporting entry for this measId:

3> include a measurement reporting entry within the VarMeasReportList for this measId;

3> set the numberOfReportsSent defined within the VarMeasReportList for this measId to 0;

3> initiate the measurement reporting procedure, as specified in 5.5.5;

2> else if the reportType is set to eventTriggered and if the eventId is set to eventD1 and if the leaving condition applicable for this event is fulfilled for the associated VarMeasReport within the VarMeasReportList for this measId during timeToTrigger defined within the VarMeasConfig for this event:

3> if reportOnLeave is set to true for the corresponding reporting configuration:

4> initiate the measurement reporting procedure, as specified in 5.5.5;

3> remove the measurement reporting entry within the VarMeasReportList for this measId;

3> stop the periodical reporting timer for this measId, if running;

5.5.4.2 Event A1 (Serving Becomes Better than Threshold)

The UE shall:

1> consider the entering condition for this event to be satisfied when condition A1-1, as specified below, is fulfilled;

1> consider the leaving condition for this event to be satisfied when condition A1-2, as specified below, is fulfilled;

1> for this measurement, consider the NR serving cell corresponding to the associated measObjectNR associated with this event.

Inequality A1-1 (Entering Condition)

$$Ms - Hys > Thresh$$

Inequality A1-2 (Leaving Condition)

$$Ms + Hys < Thresh$$

The variables in the formula are defined as follows:

Ms is the measurement result of the serving cell, not taking into account any offsets.

Hys is the hysteresis parameter for this event (i.e. hysteresis as defined within reportConfigNR for this event).

Thresh is the threshold parameter for this event (i.e. a1-Threshold as defined within reportConfigNR for this event).

Ms is expressed in dBm in case of RSRP, or in dB in case of RSRQ and RS-SINR.

Hys is expressed in dB.

Thresh is expressed in the same unit as Ms.

5.5.4.3 Event A2 (Serving Becomes Worse than Threshold)

The UE shall:

1> consider the entering condition for this event to be satisfied when condition A2-1, as specified below, is fulfilled;

1> consider the leaving condition for this event to be satisfied when condition A2-2, as specified below, is fulfilled;

1> for this measurement, consider the serving cell indicated by the measObjectNR associated to this event.

Inequality A2-1 (Entering Condition)

$$Ms + Hys < Thresh$$

Inequality A2-2 (Leaving Condition)

$$Ms - Hys > Thresh$$

The variables in the formula are defined as follows:

Ms is the measurement result of the serving cell, not taking into account any offsets.

Hys is the hysteresis parameter for this event (i.e. hysteresis as defined within reportConfigNR for this event).

Thresh is the threshold parameter for this event (i.e. a2-Threshold as defined within reportConfigNR for this event).

Ms is expressed in dBm in case of RSRP, or in dB in case of RSRQ and RS-SINR.

Hys is expressed in dB.

Thresh is expressed in the same unit as Ms.

5.5.4.4 Event A3 (Neighbour Becomes Offset Better than SpCell)

The UE shall:

1> consider the entering condition for this event to be satisfied when condition A3-1, as specified below, is fulfilled;

1> consider the leaving condition for this event to be satisfied when condition A3-2, as specified below, is fulfilled;

1> use the SpCell for Mp, Ofp and Ocp.

NOTE 1: The cell(s) that triggers the event has reference signals indicated in the measObjectNR associated to this event which may be different from the NR SpCell measObjectNR.

Inequality A3-1 (Entering Condition)

$$Mn + Ofn + Ocn - Hys > Mp + Ofp + Ocp + Off$$

Inequality A3-2 (Leaving Condition)

$$Mn + Ofn + Ocn + Hys < Mp + Ofp + Ocp + Off$$

The variables in the formula are defined as follows:

Mn is the measurement result of the neighbouring cell, not taking into account any offsets.

Ofn is the measurement object specific offset of the reference signal of the neighbour cell (i.e. offsetMO as defined within measObjectNR corresponding to the neighbour cell).

Ocn is the cell specific offset of the neighbour cell (i.e. cellIndividualOffset as defined within measObjectNR corresponding to the frequency of the neighbour cell), and set to zero if not configured for the neighbour cell.

Mp is the measurement result of the SpCell, not taking into account any offsets.

Ofp is the measurement object specific offset of the SpCell (i.e. offsetMO as defined within measObjectNR corresponding to the SpCell).

Ocp is the cell specific offset of the SpCell (i.e. cellIndividualOffset as defined within measObjectNR corresponding to the SpCell), and is set to zero if not configured for the SpCell.

Hys is the hysteresis parameter for this event (i.e. hysteresis as defined within reportConfigNR for this event).

Off is the offset parameter for this event (i.e. a3-Offset as defined within reportConfigNR for this event).

Mn, Mp are expressed in dBm in case of RSRP, or in dB in case of RSRQ and RS-SINR.

Ofn, Ocn, Ofp, Ocp, Hys, Off are expressed in dB.

NOTE 2: The definition of Event A3 also applies to CondEvent A3.

5.5.4.5 Event A4 (Neighbour Becomes Better than Threshold)

The UE shall:

1> consider the entering condition for this event to be satisfied when condition A4-1, as specified below, is fulfilled;

1> consider the leaving condition for this event to be satisfied when condition A4-2, as specified below, is fulfilled.

Inequality A4-1 (Entering Condition)

$$Mn + Ofn + Ocn - Hys > \text{Thresh}$$

Inequality A4-2 (Leaving Condition)

$$Mn + Ofn + Ocn + Hys < \text{Thresh}$$

The variables in the formula are defined as follows:

Mn is the measurement result of the neighbouring cell, not taking into account any offsets.

Ofn is the measurement object specific offset of the neighbour cell (i.e. offsetMO as defined within measObjectNR corresponding to the neighbour cell).

Ocn is the measurement object specific offset of the neighbour cell (i.e. cellIndividualOffset as defined within measObjectNR corresponding to the neighbour cell), and set to zero if not configured for the neighbour cell.

Hys is the hysteresis parameter for this event (i.e. hysteresis as defined within reportConfigNR for this event).

Thresh is the threshold parameter for this event (i.e. a4-Threshold as defined within reportConfigNR for this event).

Mn is expressed in dBm in case of RSRP, or in dB in case of RSRQ and RS-SINR.

Ofn, Ocn, Hys are expressed in dB.

Thresh is expressed in the same unit as Mn.

NOTE: The definition of Event A4 also applies to CondEvent A4.

5.5.4.6 Event A5 (SpCell Becomes Worse than Threshold1 and Neighbour Becomes Better than Threshold2)

The UE shall:

1> consider the entering condition for this event to be satisfied when both condition A5-1 and condition A5-2, as specified below, are fulfilled;

1> consider the leaving condition for this event to be satisfied when condition A5-3 or condition A5-4, i.e. at least one of the two, as specified below, is fulfilled;

1> use the SpCell for Mp.

NOTE 1: The parameters of the reference signal(s) of the cell(s) that triggers the event are indicated in the measObjectNR associated to the event which may be different from the measObjectNR of the NR SpCell.

Inequality A5-1 (Entering Condition 1)

$$Mp + Hys < \text{Thresh1}$$

Inequality A5-2 (Entering Condition 2)

$$Mn + Ofn + Ocn - Hys > \text{Thresh2}$$

Inequality A5-3 (Leaving Condition 1)

$$Mp - Hys > \text{Thresh1}$$

Inequality A5-4 (Leaving Condition 2)

$$Mn + Ofn + Ocn + Hys < \text{Thresh2}$$

The variables in the formula are defined as follows:

Mp is the measurement result of the NR SpCell, not taking into account any offsets.

Mn is the measurement result of the neighbouring cell, not taking into account any offsets.

Ofn is the measurement object specific offset of the neighbour cell (i.e. offsetMO as defined within measObjectNR corresponding to the neighbour cell).

Ocn is the cell specific offset of the neighbour cell (i.e. cellIndividualOffset as defined within measObjectNR corresponding to the neighbour cell), and set to zero if not configured for the neighbour cell.

Hys is the hysteresis parameter for this event (i.e. hysteresis as defined within reportConfigNR for this event).

Thresh1 is the threshold parameter for this event (i.e. a5-Threshold1 as defined within reportConfigNR for this event).

Thresh2 is the threshold parameter for this event (i.e. a5-Threshold2 as defined within reportConfigNR for this event).

Mn, Mp are expressed in dBm in case of RSRP, or in dB in case of RSRQ and RS-SINR.

Ofn, Ocn, Hys are expressed in dB.

Thresh1 is expressed in the same unit as Mp.

Thresh2 is expressed in the same unit as Mn.

NOTE 2: The definition of Event A5 also applies to CondEvent A5.

. . .

BWP-UplinkDedicated

The IE BWP-UplinkDedicated is used to configure the dedicated (UE specific) parameters of an uplink BWP.

| BWP-UplinkDedicated information element | |
|---|---|
| BWP-UplinkDedicated ::= | SEQUENCE { |
| pucch-Config | SetupRelease { PUCCH-Config } |
| OPTIONAL, -- Need M | |
| pusch-Config | SetupRelease { PUSCH-Config } |
| OPTIONAL, -- Need M | |
| configuredGrantConfig | SetupRelease { ConfiguredGrantConfig } |
| OPTIONAL, -- Need M | |
| srs-Config | SetupRelease { SRS-Config } |
| OPTIONAL, -- Need M | |

-continued

| BWP-UplinkDedicated information element | |
|---|---|
| beamFailureRecoveryConfig<br>OPTIONAL, -- Cond SpCellOnly | SetupRelease { BeamFailureRecoveryConfig } |
| ...,<br>[[<br>sl-PUCCH-Config-r16<br>OPTIONAL, -- Need M | SetupRelease { PUCCH-Config } |
| cp-ExtensionC2-r16<br>OPTIONAL, -- Need R | INTEGER (1..28) |
| cp-ExtensionC3-r16<br>OPTIONAL, -- Need R | INTEGER (1..28) |
| useInterlacePUCCH-PUSCH-r16<br>OPTIONAL, -- Need R | ENUMERATED {enabled} |
| pucch-ConfigurationList-r16<br>OPTIONAL, -- Need M | SetupRelease { PUCCH-ConfigurationList-r16 } |
| lbt-FailureRecoveryConfig-r16<br>OPTIONAL, -- Need M | SetupRelease { LBT-FailureRecoveryConfig-r16 } |
| configuredGrantConfigToAddModList-r16<br>OPTIONAL, -- Need N | ConfiguredGrantConfigToAddModList-r16 |
| configuredGrantConfigToReleaseList-r16<br>OPTIONAL, -- Need N | ConfiguredGrantConfigToReleaseList-r16 |
| configuredGrantConfigType2DeactivationStateList-r16<br>ConfiguredGrantConfigType2DeactivationStateList-r16   OPTIONAL -- Need R | |
| ]],<br>[[<br>ul-TCI-StateList-r17 | CHOICE { |
| explicitlist | SEQUENCE { |
| ul-TCI-ToAddModList-r17<br>r17      OPTIONAL, -- Need N | SEQUENCE (SIZE (1..maxUL-TCI-r17)) OF TCI-UL-State-<br>SEQUENCE (SIZE (1..maxUL-TCI-r17)) OF TCI-UL-StateId- |
| ul-TCI-ToReleaseList-r17<br>r17      OPTIONAL -- Need N | |
| },<br>unifiedTCI-StateRef-r17 | ServingCellAndBWP-Id-r17 |
| }<br>OPTIONAL, -- Need R | | ul-TCI-StateList

Indicates the applicable UL TCI states for PUCCH, PUSCH and SRS.

ul-TCI-ToAddModList

Indicates a list of UL TCI states.

CSI-AperiodicTriggerStateList

The CSI-AperiodicTriggerStateList IE is used to configure the UE with a list of aperiodic trigger states. Each codepoint of the DCI field "CSI request" is associated with one trigger state (see TS 38.321 [3], clause 6.1.3.13). Upon reception of the value associated with a trigger state, the UE will perform measurement of CSI-RS, CSI-IM and/or SSB (reference signals) and aperiodic reporting on L1 according to all entries in the associatedReportConfigInfoList for that trigger state.

| CSI-AperiodicTriggerStateList information element | |
|---|---|
| -- ASN1START<br>-- TAG-CSI-APERIODICTRIGGERSTATELIST-START | |
| CSI-AperiodicTriggerStateList ::=<br>AperiodicTriggerState | SEQUENCE (SIZE (1..maxNrOfCSI-AperiodicTriggers)) OF CSI- |
| CSI-AperiodicTriggerState ::= | SEQUENCE { |
| associatedReportConfigInfoList<br>CSI-AssociatedReportConfigInfo, | SEQUENCE (SIZE(1..maxNrofReportConfigPerAperiodicTrigger)) OF |
| ...,<br>[[<br>ap-CSI-MultiplexingMode-r17<br>OPTIONAL -- Need R | ENUMERATED {enabled} |
| ]],<br>[[<br>ltm-AssociatedReportConfigInfo-r18<br>OPTIONAL -- Need R | LTM-CSI-ReportConfigId-r18 |
| ]]<br>} | |
| CSI-AssociatedReportConfigInfo ::= | SEQUENCE { |
| reportConfigId | CSI-ReportConfigId, |
| resourcesForChannel | CHOICE { |
| nzp-CSI-RS | SEQUENCE { |
| resourceSet | INTEGER (1..maxNrofNZP-CSI-RS-ResourceSetsPerConfig), |
| qcl-info | SEQUENCE (SIZE(1..maxNrofAP-CSI-RS-ResourcesPerSet)) |
| OF TCI-StateId<br>OPTIONAL -- Cond Aperiodic | |

-continued

| CSI-AperiodicTriggerStateList information element |
| --- |

```
    },
      csi-SSB-ResourceSet                INTEGER (1..maxNrofCSI-SSB-ResourceSetsPerConfig)
    },
  ...
}
-- TAG-CSI-APERIODICTRIGGERSTATELIST-STOP
-- ASN1STOP
```

CSI-AperiodicTriggerState Field Descriptions

Itm-AssociatedReportConfigInfo
This field configures the aperiodic CSI reports of LTM candidate cells. If Itm-associatedReportConfigInfo is configured the UE shall ignore the field associatedReportConfigInfoList.

| CSI-AssociatedReportConfigInfo field descriptions |
| --- | reportConfigId
The reportConfigId of one of the CSI-ReportConfigToAddMod configured in CSI-MeasConfig
resourceSet
NZP-CSI-RS-ResourceSet for channel measurements. Entry number in nzp-CSI-RS-ResourceSetList in the CSI-ResourceConfig indicated by resourcesForChannelMeasurement in the CSI-ReportConfig indicated by reportConfigId above (value 1 corresponds to the first entry, value 2 to the second entry, and so on).

TCI-State

The IE TCI-State associates one or two DL reference signals with a corresponding quasi-colocation (QCL) type.

| TCI-State information element |
| --- |

```
TCI-State ::=                    SEQUENCE {
    tci-StateId                     TCI-StateId,
    qcl-Type1                       QCL-Info,
    qcl-Type2                       QCL-Info
OPTIONAL, -- Need R ...,
    [[
    additionalPCI-r17               AdditionalPCIIndex-r17
OPTIONAL, -- Need R
    pathlossReferenceRS-Id-r17      PathlossReferenceRS-Id-r17
OPTIONAL, -- Cond JointTCI1
    ul-powerControl-r17             Uplink-powerControlId-r17
OPTIONAL -- Cond JointTCI
    ]]
}
QCL-Info ::=                     SEQUENCE {
    cell                            ServCellIndex
OPTIONAL, -- Need R
    bwp-Id                          BWP-Id
OPTIONAL, -- Cond CSI-RS-Indicated
    referenceSignal                 CHOICE {
        csi-rs                          NZP-CSI-RS-ResourceId,
        ssb                             SSB-Index
    },
    qcl-Type                        ENUMERATED {typeA, typeB, typeC, typeD},

...
}
```

| QCL-Info field descriptions |
| --- | bwp-Id
The DL BWP which the RS is located in. If the field is absent, the RS is located in the DL BWP in which the TCI-State is applied by the UE.

-continued

| QCL-Info field descriptions |
| --- | cell
The UE's serving cell in which the referenceSignal is configured. If the field is absent, it applies to the serving cell in which the TCI-State is applied by the UE. The RS can be located on a serving cell other than the serving cell for which the TCI-State is applied by the UE only if the qcl-Type is configured as typeC or typeD. If the referenceSignal is set to csi-rs and unifiedTCI-StateType is configured, either both cell and bwp-Id are present or both cell and bwp-Id are absent. See TS 38.214 [19] clause 5.1.5.
referenceSignal
Reference signal with which quasi-collocation information is provided as specified in TS 38.214 [19] clause 5.1.5.
qcl-Type
QCL type as specified in TS 38.214 [19] clause 5.1.5.

| TCI-State field descriptions |
| --- | pathlossReferenceRS-Id
The ID of the reference signal (e.g. a CSI-RS or an SS block) used for PUSCH, PUCCH and SRS path loss estimation. This field refers to an element in the list configured using pathlossReferenceRSToAddModList in the serving cell and UL BWP where the TCI State is applied by the UE.
qcl-Type1, qcl-Type2
QCL information for the TCI state as specified in TS 38.214 [19] clause 5.1.5.
tci-StateId
ID number of the TCI state.

TCI-StateId

The IE TCI-StateId is used to identify one TCI-State configuration.

TCI-UL-State

The IE TCI-UL-State indicates the TCI state information for UL transmission.

| TCI-UL-State information element |
| --- |

```
TCI-UL-State-r17 ::=          SEQUENCE {
    tci-UL-StateId-r17            TCI-UL-StateId-r17,
    servingCellId-r17            ServCellIndex            OPTIONAL,
-- Need R
    bwp-Id-r17                   BWP-Id                   OPTIONAL,
-- Cond CSI-RSorSRS-Indicated
    referenceSignal-r17          CHOICE {
        ssb-Index-r17                SSB-Index,
        csi-RS-Index-r17             NZP-CSI-RS-ResourceId,
        srs-r17                      SRS-ResourceId
    },
    additionalPCI-r17            AdditionalPCIIndex-r17   OPTIONAL,
-- Need R
    ul-powerControl-r17          Uplink-powerControlId-r17 OPTIONAL,
-- Need R
    pathlossReferenceRS-Id-r17   PathlossReferenceRS-Id-r17 OPTIONAL,
-- Cond Mandatory
    ...
}
```

| TCI-UL-State field descriptions |
| --- | bwp-Id
The DL BWP which the CSI-RS is located in or UL BWP where the SRS is located in.
servingCellId
The UE's serving cell in which the referenceSignal is configured. If the field is absent, it applies to the serving cell in which the TCI-UL-State is applied by the UE.
pathlossReferenceRS-Id
The ID of the reference Signal (e.g. a CSI-RS or a SS block) used for PUSCH, PUCCH and SRS path loss estimation. This field refers to an element in the list configured using pathlossReferenceRSToAddModList in the serving cell and UL BWP where the UL TCI State is applied by the UE.

TCI-UL-StateId

The IE TCI-UL-StateId is used to identify one TCI-UL-State configuration.

6.3.2 Radio Resource Control Information Elements

. . .

ReportConfigNR

The IE ReportConfigNR specifies criteria for triggering of an NR measurement reporting event or of a CHO, CPA or CPC event or of an L2 U2N relay measurement reporting event. For events labelled AN with N equal to 1, 2 and so on, measurement reporting events and CHO, CPA or CPC events are based on cell measurement results, which can either be derived based on SS/PBCH block or CSI-RS.

Event A1: Serving becomes better than absolute threshold;

Event A2: Serving becomes worse than absolute threshold; Event A3: Neighbour becomes amount of offset better than PCell/PSCell;

Event A4: Neighbour becomes better than absolute threshold;

Event A5: PCell/PSCell becomes worse than absolute threshold1 AND Neighbour/SCell becomes better than another absolute threshold2;

. . .

CondEvent A3: Conditional reconfiguration candidate becomes amount of offset better than PCell/PSCell;

CondEvent A4: Conditional reconfiguration candidate becomes better than absolute threshold where condEventA4 can also be used for current PSCell (i.e., in case it is configured as candidate PSCell for CondEvent A4 evaluation) for CHO with candidate SCG(s) case;

CondEvent A5: PCell/PSCell becomes worse than absolute threshold1 AND Conditional reconfiguration candidate becomes better than another absolute threshold2;

. . .

| ReportConfigNR information element | | |
|---|---|---|
| ReportConfigNR ::= | SEQUENCE { | |
| reportType | CHOICE { | |
| periodical | PeriodicalReportConfig, | |
| eventTriggered | EventTriggereConfig, | |
| ..., | | |
| reportCGI | ReportCGI, | |
| reportSFTD | ReportSFTD-NR, | |
| condTriggerConfig-r16 | CondTriggerConfig-r16, | |
| cli-Periodical-r16 | CLI-PeriodicalReportConfig-r16, | |
| cli-EventTriggered-r16 | CLI-EventTriggerConfig-r16, | |
| rxTxPeriodical-r17 | RxTxPeriodical-r17, | |
| reportOnScellActivation-r18 | ReportOnScellActivation-r18 | |
| } | | |
| } | | |
| ReportCGI ::= | SEQUENCE { | |
| cellForWhichToReportCGI | PhysCellId, | |
| ..., | | |
| [[ | | |
| useAutonomousGaps-r16 | ENUMERATED {setup} | OPTIONAL -- Need R |
| ]] | | |
| } | | |
| ReportSFTD-NR ::= | SEQUENCE { | |
| report SFTD-Meas | BOOLEAN, | |
| reportRSRP | BOOLEAN, | |
| ..., | | |
| [[ | | |
| report SFTD-NeighMeas | ENUMERATED {true} | OPTIONAL, -- |
| Need R | | |
| drx-SFTD-NeighMeas | ENUMERATED {true} | OPTIONAL, -- |
| Need R | | |
| cellsForWhichToReportSFTD | SEQUENCE (SIZE (1..maxCellSFTD)) OF PhysCellId | OPTIONAL -- |
| Need R | | |
| ]] | | |
| } | | |
| CondTriggerConfig-r16 ::= | SEQUENCE { | |
| condEventId | CHOICE { | |
| condEventA3 | SEQUENCE { | |
| a3-Offset | MeasTriggerQuantityOffset, | |
| hysteresis | Hysteresis, | |
| timeToTrigger | TimeToTrigger | |
| }, | | |
| condEventA5 | SEQUENCE { | |
| a5-Threshold1 | MeasTriggerQuantity, | |
| a5-Threshold2 | MeasTriggerQuantity, | |
| hysteresis | Hysteresis, | |
| timeToTrigger | TimeToTrigger | |
| }, | | |
| ..., | | |
| condEventA4-r17 | SEQUENCE { | |
| a4-Threshold-r17 | MeasTriggerQuantity, | |
| hysteresis-r17 | Hysteresis, | |
| timeToTrigger-r17 | TimeToTrigger | |
| }, | | |
| ... | | |

-continued

| ReportConfigNR information element |
|---|

```
},
rsType-r16                     NR-RS-Type,
...,
[[
nesEvent-r18                   ENUMBERATED {true}                               OPTIONAL --
Need R
]]
}
EventTriggerConfig ::=         SEQUENCE {
  eventId                        CHOICE {
    eventA1                        SEQUENCE {
      a1-Threshold                   MeasTriggerQuantity,
      reportOnLeave                  BOOLEAN,
      hysteresis                     Hysteresis,
      timeToTrigger                  TimeToTrigger
    },
    eventA2                        SEQUENCE {
      a2-Threshold                   MeasTriggerQuantity,
      reportOnLeave                  BOOLEAN,
      hysteresis                     Hysteresis,
      timeToTrigger                  TimeToTrigger
    },
    eventA3                        SEQUENCE {
      a3-Offset                      MeasTriggerQuantityOffset,
      reportOnLeave                  BOOLEAN,
      hysteresis                     Hysteresis,
      timeToTrigger                  TimeToTrigger,
      useAllowedCellList             BOOLEAN
    },
    eventA4                        SEQUENCE {
      a4-Threshold                   MeasTriggerQuantity,
      reportOnLeave                  BOOLEAN,
      hysteresis                     Hysteresis,
      timeToTrigger                  TimeToTrigger,
      useAllowedCellList             BOOLEAN
    },
    eventA5                        SEQUENCE {
      a5-Threshold1                  MeasTriggerQuantity,
      a5-Threshold2                  MeasTriggerQuantity,
      reportOnLeave                  BOOLEAN,
      hysteresis                     Hysteresis,
      timeToTrigger                  TimeToTrigger,
      useAllowedCellList             BOOLEAN
    },
    ...
  ]]
},
rsType                         NR-RS-Type,
reportInterval                 ReportInterval,
reportAmount                   ENUMERATED {r1, r2, r4, r8, r16, r32, r64, infinity},
reportQuantityCell             MeasReportQuantity,
maxReportCells                 INTEGER (1..maxCellReport),
reportQuantityRS-Indexes        MeasReportQuantity
OPTIONAL, -- Need R
maxNrofRS-IndexesToReport      INTEGER (1..maxNrofIndexesToReport)
OPTIONAL, -- Need R
includeBeamMeasurements        BOOLEAN,
reportAddNeighMeas             ENUMERATED {setup}
OPTIONAL, -- Need R
...,
[[
measRSSI-ReportConfig-r16      MeasRSSI-ReportConfig-r16
OPTIONAL, -- Need R
useT312-r16                    BOOLEAN
OPTIONAL, -- Need M
includeCommonLocationInfo-r16  ENUMERATED {true}
OPTIONAL, -- Need R
includeBT-Meas-r16             SetupRelease {BT-NameList-r16}
OPTIONAL, -- Need M
includeWLAN-Meas-r16           SetupRelease {WLAN-NameList-r16}
OPTIONAL, -- Need M
includeSensor-Meas-r16         SetupRelease {Sensor-NameList-r16}
OPTIONAL, -- Need M
]],
[[
```

| ReportConfigNR information element |
|---|

```
    courseLocationRequest-r17            ENUMERATED {true}
OPTIONAL, -- Need R
    reportQuantityRelay-r17              SL-MeasReportQuantity-r16
OPTIONAL -- Need R
    ]],
    [[
    numberOfTriggeringCells-r18          INTEGER (2..maxCellReport)
OPTIONAL, -- Need R
    cellIndividualOffsetList-r18         SEQUENCE (Size (1..maxNrofCellMean)) OF
CellIndividualOffsetList-r18 OPTIONAL, -- Need R
    eventX1-XD-Threshold1-r18            SL-MeasTriggerQuantity-r16
OPTIONAL, -- Need S
    eventx2-SD-Threshold-r18             SL-MeadTriggerQuantity-r16
OPTIONAL -- Need S
    -- Editor's Note: FFD if this is proper place for Event X1 thresolds.
    ]]
}
PeriodicalReportConfig ::=               SEQUENCE {
    rsType                               NR-RS-Type,
    reportInterval                       ReportInterval,
    reportAmount                         ENUMERATED {r1, r2, r4, r8, r16, r32, r64, infinity},
    reportQuantityCell                   MeasReportQuantity,
    maxReportCells                       INTEGER (1..maxCellReport),
    reportQuantityRS-Indexes             MeasReportQuantity
OPTIONAL, -- Need R
    maxNrofRS-IndexesToReport            INTEGER (1..maxNrofIndexesToReport)
OPTIONAL, -- Need R
    includeBeamMeasurements              BOOLEAN,
    useAllowedCellList                   BOOLEAN, ...,
    [[
    measRSSI-ReportConfig-r16            MeasRSSI-ReportConfig-r16
OPTIONAL, -- Need R
    includeCommonLocationInfo-r16        ENUMERATED {true}
OPTIONAL, -- Need R
    includeBT-Meas-r16                   SetupRelease {BT-NameList-r16}
OPTIONAL, -- Need M
    includeWLAN-Meas-r16                 SetupRelease {WLAN-NameList-r16}
OPTIONAL, -- Need M
    includeSensor-Meas-r16               SetupRelease {Sensor-NameList-r16}
OPTIONAL, -- Need M
    ul-DelayValueConfig-r16              SetupRelease { UL-DelayValueConfig-r16 }
OPTIONAL, -- Need M
    reportAddNeighMeas-r16               ENUMERATED {setup}
OPTIONAL, -- Need R
    ]],
    [[
    ul-ExcessDelayConfig-r17             SetupRelease { UL-ExcessDelayConfig-r17 }
OPTIONAL, -- Need M
    coarseLocationRequest-r17            ENUMERATED {true}
OPTIONAL, -- Need R
    reportQuantityRelay-r17              SL-MeasReportQuantity-r16
OPTIONAL, -- Need R
    ]]
}
NR-RS-Type ::=                           ENUMERATED {ssb, csi-rs}
MeasTriggerQuantity ::=                  CHOICE {
    rsrp                                 RSRP-Range,
    rsrq                                 RSRQ-Range,
    sinr                                 SINR-Range
}
MeasTriggerQuantityOffset ::=            CHOICE {
    rsrp                                 INTEGER (-30..30),
    rsrq                                 INTEGER (-30..30),
    sinr                                 INTEGER (-30..30)
}
MeasReportQuantity ::=                   SEQUENCE {
    rsrp                                 BOOLEAN,
    rsrq                                 BOOLEAN,
    sinr                                 BOOLEAN
}
```

---

ReportConfigNR field descriptions

--- reportType
Type of the configured measurement report. In MR-DC, network does not configure report of type reportCGI using
SRB3. The condTriggerConfig is used for CHO, CPA or CPC configuration.

---

---

EventTriggerConfig field descriptions

--- channelOccupancyThreshold
RSSI threshold which is used for channel occupancy evaluation.
coarseLocationRequest
This field is used to request UE to report coarse location information.
distance ThreshFromReference1, distanceThreshFromReference2
Threshold value associated to the distance from a reference location configured with referenceLocation1 or
referenceLocation2. Each step represents 50m.
eventId
Choice of NR event triggered reporting criteria.
reportOnLeave
Indicates whether or not the UE shall initiate the measurement reporting procedure when the leaving condition is met for
a cell in cells TriggeredList, as specified in 5.5.4.1.
Indicates whether or not the UE shall initiate the measurement reporting procedure when the leaving condition is met if
configured in eventD1, eventD2, eventH1, eventH2 as specified in 5.5.4.1.
reportQuantityCell
The cell measurement quantities to be included in the measurement report.
reportQuantityRS-Indexes
Indicates which measurement information per RS index the UE shall include in the measurement report.
simulMultiTriggerSingleMeasReport
Indicates when multiple events with the same eventID satisfy the entering condition(s), whether to consider only the
event with the smallest value between the altitude of the UE and the configured altitude threshold.
timeToTrigger
Time during which specific criteria for the event needs to be met in order to trigger a measurement report.
useAllowedCellList
Indicates whether only the cells included in the allow-list of the associated measObject are applicable as specified in
5.5.4.1.

---

Time To Trigger

The IE TimeToTrigger specifies the value range used for time to trigger parameter, which concerns the time during which specific criteria for the event needs to be met in order to trigger a measurement report. Value ms0 corresponds to 0 ms and behaviour as specified in 7.1.2 applies, value ms40 corresponds to 40 ms, and so on.

In TS 38.300 ([5] Draft 38.300 v 18.0.0), L1/L2 mobility (LTM) is introduced:

9.2.3.5 L1/L2-Triggered Mobility 9.2.3.5.1 General

LTM is a procedure in which a gNB receives L1 measurement report(s) from a UE, and on their basis the gNB changes UE serving cell by a cell switch command signalled via a MAC CE. The cell switch command indicates an LTM candidate configuration that the gNB previously prepared and provided to the UE through RRC signalling. Then the UE switches to the target configuration according to the cell switch command. The LTM procedure can be used to reduce the mobility latency as described in Annex G.

When configured by the network, it is possible to activate TCI states of one or multiple cells that are different from the current serving cell. For instance, the TCI states of the LTM candidate cells can be activated in advance before any of those cells become the serving cell. This allows the UE to be DL synchronized with those cells, thereby facilitating a faster cell switch to one of those cells when cell switch is triggered.

When configured by the network, it is possible to initiate UL TA acquisition (called early TA) procedure of one or multiple cells that are different from the current serving cells. If the cell has the same $N_{TA}$ as the current serving cells or $N_{TA}=0$, early TA acquisition procedure is not required.

The network may request the UE to perform early TA acquisition of a candidate cell before a cell switch. The early TA acquisition procedure is triggered by PDCCH order as specified in clause 9.2.6 or realized through UE-based TA measurement as configured by RRC. In the former case, the gNB to which the candidate cell belongs calculates the TA value and sends it to the gNB to which the serving cell belongs. The serving cell sends the TA value in the LTM cell switch command MAC CE when triggering LTM cell switch. In the latter case, the UE performs TA measurement for the candidate cells after being configured by RRC but the exact time the UE performs TA measurement is up to UE implementation. The UE applies the TA value measured by itself and performs RACH-less LTM upon receiving the cell switch command. The network may also send a TA value in the LTM cell switch command MAC CE without early TA acquisition.

Depending on the availability of a valid TA value, the UE performs either a RACH-less LTM or RACH-based LTM cell switch. If the TA value is provided in the cell switch command, the UE applies the TA value as instructed by the network. In the case where UE-based TA measurement is configured, but no TA value is provided in the cell switch command, the UE applies the TA value by itself if available. Meanwhile, the UE performs RACH-less LTM cell switch upon receiving the cell switch command. If no valid TA value is available, the UE performs RACH-based LTM cell switch.

Regardless of whether the UE is configured for UE-based TA measurement for a certain candidate cell, it will still follow the PDCCH order, which includes requesting a random access procedure towards the candidate cells. This also applies to the candidate cells for which the UE is capable of deriving TA values by itself. Additionally, regardless of whether the UE has already performed a random access procedure towards the candidate cells, it will still follow the UE-based measurement configuration if configured by the network.

For RACH-less LTM, the UE accesses the target cell using either a configured grant or a dynamic grant. The configured grant is provided in the LTM candidate configuration, and the UE selects the configured grant occasion associated with the beam indicated in the cell switch command. Upon initiation of LTM cell switch to the target cell, the UE starts to monitor PDCCH on the target cell for dynamic scheduling. Before RACH-less LTM procedure completion, the UE shall not trigger random access procedure if it does not have a valid PUCCH resource for triggered SRs.

The following principles apply to LTM:

Security key is maintained upon an LTM cell switch;

Subsequent LTM is supported.

LTM supports both intra-gNB-DU and intra-gNB-CU inter-gNB-DU mobility. LTM supports both intra-frequency and inter-frequency mobility, including mobility to inter-frequency cell that is not a current serving cell. LTM is supported only for licensed spectrum. The following scenarios are supported:

PCell change in non-CA scenario and non-DC scenario;

PCell and SCell(s) change in CA scenario;

Dual connectivity scenario, PCell and MCG SCell(s) change and intra-SN PSCell and SCG SCell(s) change without MN involvement. LTM for simultaneous PCell and PSCell change is not supported.

While the UE has stored LTM candidate configurations the UE can also execute any L3 handover command sent by the network.

9.2.3.5.2 C-Plane Handling

Cell switch command is conveyed in a MAC CE, which contains the necessary information to perform the LTM cell switch.

The overall procedure for LTM is shown in FIG. 9.2.3.5.2-1 below. Subsequent LTM is done by repeating the early synchronization, LTM cell switch execution, and LTM cell switch completion steps without releasing other LTM candidate configurations after each LTM cell switch completion. The general procedure over the air interface is applicable to SCG LTM. Further details of SCG LTM can be found in TS 37.340 [21].

Figure 7:
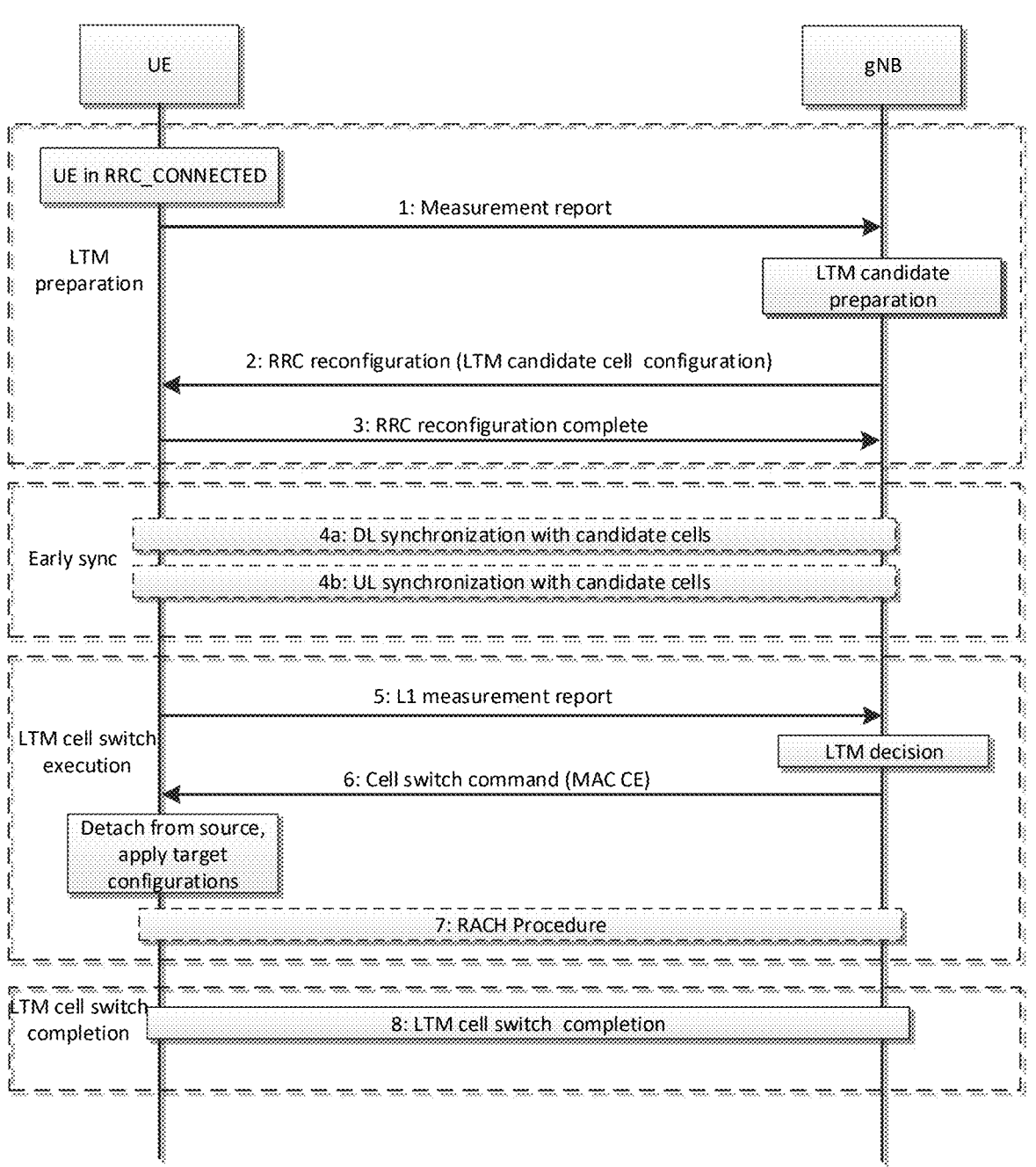
FIG. 7 is a reproduction of FIG. 9.2.3.5.2-1. Signaling procedure for LTM, from Draft 38.300 v 18.0.0.

FIG. 7 is a reproduction of FIG. 9.2.3.5.2-1. Signaling procedure for LTM, from Draft 38.300 v 18.0.0.

The procedure for LTM is as follows:

1. The UE sends a MeasurementReport message to the gNB. The gNB decides to configure LTM and initiates LTM preparation.
2. The gNB transmits an RRCReconfiguration message to the UE including the LTM candidate configurations.
3. The UE stores the LTM candidate configurations and transmits an RRCReconfigurationComplete message to the gNB.
4a. The UE performs DL synchronization with the candidate cell(s) before receiving the cell switch command.
4b. When UE-based TA measurement is configured, UE acquires the TA value(s) of the candidate cell(s) by measurement. UE performs early TA acquisition with the candidate cell(s) as requested by the network before receiving the cell switch command as specified in clause 9.2.6. This is done via CFRA triggered by a PDCCH order from the source cell, following which the UE sends preamble towards the indicated candidate cell. In order to minimize the data interruption of the source cell due to CFRA towards the candidate cell(s), the UE doesn't receive random access response from the network for the purpose of TA value acquisition and the TA value of the candidate cell is indicated in the cell switch command. The UE doesn't maintain the TA timer for the candidate cell and relies on network implementation to guarantee the TA validity.

5. The UE performs L1 measurements on the configured candidate cell(s) and transmits L1 measurement reports to the gNB. L1 measurement should be performed as long as RRC reconfiguration (step 2) is applicable.
6. The gNB decides to execute cell switch to a target cell and transmits a MAC CE triggering cell switch by including the candidate configuration index of the target cell. The UE switches to the target cell and applies the configuration indicated by candidate configuration index.
7. The UE performs the random access procedure towards the target cell, if UE does not have valid TA of the target cell as specified in clause 6.1.3.xy of TS 38.321[6].
8. The UE completes the LTM cell switch procedure by sending RRCReconfigurationComplete message to target cell. If the UE has performed a RA procedure in step 7 the UE considers that LTM cell switch execution is successfully completed when the random access procedure is successfully completed. For RACH-less LTM, the UE considers that LTM cell switch execution is successfully completed when the UE determines that the network has successfully received its first UL data.

The steps 4-8 can be performed multiple times for subsequent LTM using the LTM candidate configuration(s) provided in step 2.

The procedure over the air interface described in Figure x is applicable to both intra-gNB-DU LTM and inter-gNB-DU LTM. The overall LTM procedures over F1-C interface are captured in TS38.401[4].

9.2.3.5.3 U-Plane Handling

After receiving an LTM cell switch command MAC CE, the UE performs MAC reset. Whether the UE performs RLC re-establishment and PDCP data recovery during cell switch is explicitly controlled by the network through RRC signalling.

In WID for mobility enhancement phase 4 ([6] RP-234036 New WID: NR mobility enhancements Phase 4), objectives regarding measurement reporting for LTM is introduced:

3 Justification

Layer 2 mobility (LTM) was introduced in Rel-18 and can offer improvements in handover latency and interruption time compared to Layer 3 based mobility. However, LTM as introduced in Rel-18 also has a number of limitations compared to Layer 3 mobility. This Rel-19 work item aims to remove a number of these limitations.

Layer 3 mobility uses layer 3 measurement reporting which supports UE evaluated events for triggering of measurement reports and reduces signalling overhead compared to periodic measurement reporting. Such event triggering is not supported by the L1 measurements that are used for LTM mobility.

Layer 3 mobility has evolved over several releases. Conditional handover (CHO) and other conditional mobility procedures (CPAC, SCPAC) were developed to achieve high robustness by enabling the procedure to be executed without necessitating a signalling exchange with source cell beforehand. LTM as introduced in Rel-18 offers short interruption time but not with the same level of robustness as the conditional L3 mobility procedures. In Rel-19, enhancements should be specified so that the system can benefit from both the high robustness and short interruption.

4 Objective 4.1 Objective of SI or Core Part WI or Testing Part WI

Measurements related enhancements for purpose of supporting LTM: [RAN2, RAN1]

Measurement related enhancements are applicable to Intra-CU MCG/SCG LTM and Inter-CU MCG/SCG LTM Specify necessary components to support event triggered L1 measurement reporting [RAN2, RAN1]

RAN1 and RAN2 to progress independently on the event triggered measurements objectives of their respective MIMO and Mobility enhancement WIs. Review progress at RAN #105 to see if any modification of objectives is required to avoid/manage any overlap in the work Specify support for CSI-RS measurements for LTM procedures and enable CSI-RS based beam management, and/or other necessary physical layer operations on candidate cells before LTM [RAN1]

Specify support of conditional LTM [RAN2, RAN3, RAN1]

Specify UE evaluated conditions for triggering LTM

Aim to support conditional LTM including subsequent LTM

Prioritise intra-CU LTM

In Rel-18 3GPP specification 38.321 ([7]3GPP 38.321 v18.1.0), TCI state activation/deactivation for LTM candidate cells is introduced:

5.18.36 Candidate Cell TCI States Activation/Deactivation

The network may activate and deactivate the TCI states of LTM candidate cell(s) configured in CandidateTCI-State and CandidateTCI-UL-State by sending the Candidate Cell TCI States Activation/Deactivation MAC CE described in clause 6.1.3.76. The network deactivates the TCI state(s) for one LTM candidate cell by not including the corresponding TCI state ID field(s) in the Candidate Cell TCI States Activation/Deactivation MAC CE.

The MAC entity shall:

1> if the MAC entity receives a Candidate Cell TCI States Activation/Deactivation MAC CE on a Serving Cell:

2> indicate to lower layers the information regarding the Candidate Cell TCI States Activation/Deactivation MAC CE.

6.1.3.75 LTM Cell Switch Command MAC CE

The LTM Cell Switch Command MAC CE is identified by MAC subheader with eLCID as specified in Table 6.2.1-1b. It has a variable size with following fields (FIG. 6.1.3.75-1):

Target Configuration ID: This field indicates the index of candidate target configuration to apply for LTM cell switch, corresponding to ltm-CandidateId minus 1 as specified in TS 38.331 [5]. The length of the field is 3 bits;

Timing Advance Command: This field indicates whether the TA is valid for the LTM target cell (i.e. the SpCell corresponding to the target configuration indicated by Target Configuration ID field). If the value of this field is set to FFF, this field indicates that no valid timing adjustment is available for the PTAG of the LTM target cell; otherwise, this field indicates the index value $T_A$ used to control the amount of timing adjustment that the MAC entity has to apply in TS 38.213 [6], and that the UE can skip the Random Access procedure for this LTM cell switch. The length of the field is 12 bits. If tag-Id-ptr is configured for the TCI state indicated by the TCI state ID field in the LTM target cell and tag-Id-ptr is set to value n1, this field indicates the TA for the TAG indicated by the tag2-Id of the LTM target cell; otherwise, this field indicates the TA for the TAG indicated by the tag-id of the LTM target cell;

TCI state ID: This field indicates and activates the TCI state for the LTM target cell (i.e. the SpCell of the target configuration indicated by the Target Configuration ID field). The TCI state is identified by TCI-StateId in ltm-DL-OrJointTCI-StateToAddModList as specified in TS 38.331 [5]. If the value of unifiedTCI-StateType in the configuration indicated by Target Configuration ID field is joint, this field is for joint TCI state, otherwise, this field is for downlink TCI state. The length of the field is 7 bits;

UL TCI state ID: This field indicates and activates the uplink TCI state for the LTM target cell (i.e. the SpCell of the target configuration indicated by the Target Configuration ID field). The most significant bits of UL TCI state ID are considered as reserved bits and the remainder 6 bits indicate the TCI-UL-StateId in ltm-UL-TCI-StatesToAddModList as specified in TS 38.331 [5]. This field is included if the value of unifiedTCI-StateType in the configuration indicated by Target Configuration ID field is separate. The length of the field is 8 bits;

C: This field indicates the presence of the contention-free Random Access Resources fields. If the value of this field is set to 1, the following fields are present: including Random Access Preamble index field, S/U field, SS/PBCH index field, PRACH Mask index field and Repetition number field. If the value of this field is set to 0, Random Access Preamble index field, SS/PBCH index field, PRACH Mask index field and Repetition number field are absent, and S/U field is considered as Reserved field.

S/U: This field indicates which UL carrier to transmit the PRACH of the contention-free Random Access Resources. If the value of this field is set to 1, SUL is used; otherwise, NUL is used. The length of the field is 1 bit;

Random Access Preamble index: This field indicates the Random Access Preamble index of the contention-free Random Access Resources. This field should not be set to 0b000000. The length of the field is 6 bits;

SS/PBCH index: This field indicates the SS/PBCH that shall be used to determine the RACH occasion for the PRACH transmission of the contention-free Random Access Resources. The length of the field is 6 bits;

PRACH Mask index: This field indicates the RACH occasion(s) associated with the SS/PBCH indicated by 'SS/PBCH index' for the PRACH transmission of the contention-free Random Access Resources. It indicates a subset of RACH occasion(s) from the rach-ConfigDedicated for the UL carrier (indicated by S/U field), (if provided, otherwise it indicates a subset of RACH occasion(s) from the rach-Config Common for the UL carrier (indicated by S/U field) in the UL BWP configuration of firstActiveUplinkBWP-Id as specified in TS 38.331 [5].

The length of the field is 4 bits.

FIG. 8 is a reproduction of FIG. 6.1.3.75-1: LTM Cell Switch Command MAC CE, from 3GPP 38.321 v18.1.0.

In [8] Chair notes RAN1 #116 eom0, the following is provided:

Agreement

On UE-initiated/event-driven beam report, at least of following aspects should be included:

Trigger-event detection for beam reporting by UE

UE monitors RS to assess if a beam-reporting trigger condition has been met

FFS: Trigger condition for declaring beam-reporting event

Beam-report transmission by UE

Signaling contents in the beam report

Down-selection one or more options (strive for one) between the following options as signaling medium/container for beam report transmission

MAC-CE

UCI

Others are not precluded.

On UE-initiated/event-driven beam report, the following aspects may be included:

UE requesting UL resource(s) for the beam report

UE notifying transmission of beam report gNB preconfigured resources

Agreement

On UE-initiated/event-driven beam reporting, regarding trigger-event detection for beam reporting, RAN1 further study at least the following aspects: quality metrics, event-definition and threshold.

Further study trigger events, including the following example as a starting point Event-1: Quality of the current beam is worse than a certain threshold.

Event-2: Quality of at least one new beam, such as L1-RSRP, becomes a threshold value better than the current beam.

Event-3: Quality of a new beam is better than a certain threshold.

Event-4: Quality of the current beam is worse than a threshold 1, and quality of at least one new beam is better than a threshold 2.

Agreement

On UE-initiated/event-driven beam reporting, at least support L1-RSRP as a measurement quantity on SSB for intra-cell and inter-cell, and periodic CSI-RS for beam management Notes: measurement results may be contained in the beam report and/or used as quality metric(s) to initiate/trigger the reporting.

FFS: Semi-persistent CSI-RS and aperiodic CSI-RS.

Agreement

On UE-initiated/event-driven beam reporting, regarding signaling content(s), at least support DL RS resource indicator and L1-RSRP FFS: Study and decide whether additional contents can be supported.

FFS: L1-RSRP format, e.g., absolute and/or differential value.

In [9] Chair's notes RAN1 #116bis eom0, the following is provided:

Agreement

On beam report transmission procedure for UE-initiated/event-driven beam reporting, following modes are supported:

Mode A (dynamically scheduling UCI by gNB):

Step 1: UE transmits a first PUCCH (one-bit/multi-bit) to request a resource for a second UL channel to carry beam report FFS: Request format, e.g., SR or a new UCI type.

Step 2: UE detects the DCI format to indicate a resource for a second UL channel to carry beam report.

Step 3: Beam report is transmitted in second UL channel.

FFS: Details on the second UL channel, e.g., whether the second UL channel is PUCCH, PUSCH or both This mode is basic UE capability (i.e. all UE supporting UE-initiated/event-driven beam reporting should support this feature).

No new DCI format is introduced.

Mode B (UCI in pre-configured resource(s) for second UL channel):

Step 1: UE transmits a first PUCCH (one-bit/multi-bit) notifying a second UL channel to carry beam report FFS: Notification format, e.g., SR or a new UCI type.

Step 2: UE transmits the beam report in the second UL channel.

FFS: Details on the second UL channel, e.g., whether the second UL channel is PUCCH, PUSCH or both The notification in Step1 is in a separate reporting instance from the beam report in Step 2.

FFS: Whether UE receives acknowledge information with response to each step for all modes For above procedures, cross-CC beam reporting is supported for both modes.

Agreement

On UE-initiated/event-driven beam reporting, regarding trigger-event detection for beam reporting, at least support Event-2: Quality of at least one new beam, such as L1-RSRP, becomes a threshold value better than the current beam.

At least L1-RSRP is supported as quality metrics used for Event-2

FFS: How the L1-RSRP is used to determine the triggering event (e.g. timer, counter, filter coefficient)

FFS: Whether the network controls how the L1-RSRP is used to determine the triggering event Regarding RS measurement for the new beam for Event-2, down-select one or more of the following:

Option-3a (explicit manner): The RS(s) for new beam(s) are explicitly configured by RRC (e.g., reusing legacy configuration of RS measurement or in TCI-State) or MAC-CE Option-3b (implicit manner): The RS(s) for new beam(s) are implicitly derived from QCL RS(s) of activated TCI state(s).

Option-3c (implicit manner): The RS(s) for new beam(s) are implicitly derived from QCL RS(s) of configured TCI state(s).

Note-1: 'New/current beam' is for discussion purpose.

Note-2: Other trigger events/quality metrics (e.g., L1-SINR) are not precluded.

Note-3: For above implicit manner(s), if there are two QCL RSs in a TCI state, the measurement RS is derived from RS w.r.t. QCL-TypeD, if applicable.

Agreement

On UE-initiated/event-driven beam reporting, regarding Event-2, the threshold value is RRC configured Agreement On UE-initiated/event-driven beam reporting, regarding Event-2, 'current beam' is a beam corresponding to the indicated TCI state.

Regarding RS measurement for the current beam for Event-2, Option-2a is supported:

Option-2a (implicit manner): The RS for current beam is implicitly derived from a QCL RS of indicated TCI state.

FFS: The RS for current beam can be either the QCL RS in the indicated TCI state or the SSB which is QCLed with the QCL RS in the indicated TCI state.

FFS: Option-2c (explicit manner): The RS for current beam is explicitly configured by RRC or MAC-CE.

Note: SSB or CSI-RS can be configured

Agreement

On UE-initiated/event-driven beam reporting, further study the following trigger events:

Event-1: Quality of the current beam is worse than a certain threshold.

Event-3: Quality of a new beam is better than a certain threshold.

Event-4: Quality of the current beam is worse than a threshold 1, and quality of at least one new beam is better than a threshold 2.

Event-5: Absolute value of the difference between the quality of the current beam and the quality of at least one new beam is lower than a threshold.

Event-6: When the current beam is not in the best K>1 beams (out of configured beams for measurement and reporting).

Event-7a: Quality of at least one new beam, such as L1-RSRP, becomes a threshold value better than the RS derived from the activated TCI state with the worst quality.

Event-7b: Quality of at least one new beam, such as L1-RSRP, becomes a threshold value better than the RS derived from the activated TCI state with the best quality.

Event-8: Quality of M>1 new beams, such as L1-RSRP, become a threshold value better than the current beam.

Event-9: Quality of at least one new beam, such as L1-RSRP, becomes a threshold value better than the configured reference RS (can be SSB or CSI-RS).

Agreement

On UE-initiated/event-driven beam reporting, regarding UL signaling content(s) of L1-RSRP report depending on Event-2, in a report instance, the following options are provided for down-selection (other options are not precluded) in RAN1 #117

Option-1 (variable size): N beam(s) are reported in the report instance, where $N \in \{1, 2, \ldots, N_{max}\}$ The N beam(s) should satisfy the condition of Event-2

$N_{max}$ is configured by gNB

FFS: Whether the indication of payload size should be provided additionally.

Option-1a (variable size): N beam(s) are reported in the report instance, where $N \in \{1, 2, \ldots, N_{max}\}$ At least one of N reported beam(s) should satisfy the condition of Event-2

$N_{max}$ is configured by gNB

FFS: Whether the indication of payload size should be provided additionally.

FFS: Details on how value of N is determined by the UE

Option-1b: N beam(s) are reported in the report instance, where $N \in \{1, 2, \ldots, N_{max}\}$ The N beam(s) should satisfy the condition of Event-2

$N_{max}$ is configured by gNB

Payload size does not vary as a function of N

FFS: Zero-padding can be provided if N is less than $N_{max}$.

Option-2: Only N=1 beam is reported in the report instance

The reported beam should satisfy the condition of Event-2

Option-3: N≥1 beam(s) are reported in the report instance,

At least one of N reported beam(s) should satisfy the condition of Event-2

N is configured by gNB

Other options are not precluded.

FFS: Whether the measurement results for current beam is always reported or can be enabled by RRC.

FFS: When current beam is reported, whether the current beam is counted in the N reported beams.

The selected option shall satisfy Event-2.

In [11]3GPP RAN2 #126 meeting, beam measurement (L1 measurement) for LTM was discussed:

Agreements on measurement enhancements for LTM:
1. Event triggered L1 measurement should be designed for the following LTM purposes:
   - Select the candidate beam/cell to trigger early synchronization.
   - Select the target beam/cell and trigger LTM cell switch procedure.
2. For event triggered L1 measurement, use of beam level measurement result for event evaluation is baseline. FFS for the cell level measurement.
3. Support the following LTM events based on beam specific quality of serving cell and candidate cells as the L1 LTM measurement events.
   - Event LTM2: Beam of serving cell becomes worse than absolute threshold;
   - Event LTM3: Beam of candidate cell becomes amount of offset better than beam of serving cell;
   - Event LTM4: Beam of candidate cell becomes better than absolute threshold;
   - Event LTM5: Beam of serving cell becomes worse than absolute threshold1 AND Beam of candidate cell becomes better than another absolute threshold2.
   FFS on what beam(s) of the serving cell and neighboring cell is used for event evaluation.
   FFS on the need of Event LTM1.
4. Support the beam config of both SSB and CSI-RS in L1 measurement resource configuration in LTM config. Working assumption: Same RS type should be used for both serving and neighbouring cell for event LTM3 and event LTM5.
5. RAN2 assumes filtering of the L1 measure results is needed. It's up to RAN1 whether the specified L1 filtering is needed or ok to leave it to UE implementation.
6. For LTM event evaluation, TTT, hysteresis for entering/leaving, and/or beam specific (FFS for cell specific) offset can be applied. FFS on the need of measurement reporting once leaving condition is met.

In [12] TS 38.331 v18.1.0, LTM configuration is introduced:

LTM-Config

The IE LTM-Config is used to provide LTM candidate configurations.

| LTM-Config information element |
| --- |

```
LTM-Config-r18 ::= SEQUENCE {
    ltm-ReferenceConfiguration-r18              SetupRelease {ReferenceConfiguration-r18}
OPTIONAL, -- Need M
    ltm-CandidateToReleaseList-r18              SEQUENCE (SIZE (1..maxNrofLTM-Configs-r18)) OF LTM-
CandidateId-r18 OPTIONAL, -- Need N
    ltm-CandidateToAddModList-r18               SEQUENCE (SIZE (1..maxNrofLTM-Configs-r18)) OF LTM-
Candidate-r18 OPTIONAL, -- Need N
    ltm-ServingCellNoResetID-r18                INTEGER (1..maxNrofLTM-Configs-plus1-r18)
OPTIONAL, -- Need N
    ltm-CSI-ResourceConfigToAddModList-r18      SEQUENCE (SIZE (1..maxNrofLTM-CSI-ResourceConfigurations-
r18)) OF LTM-CSI-ResourceConfig-r18
OPTIONAL, -- Need N
    ltm-CSI-ResourceConfigToReleaseList-r18     SEQUENCE (SIZE (1..maxNrofLTM-CSI-ResourceConfigurations-
r18)) OF LTM-CSI-ResourceConfigId-r18
OPTIONAL, -- Need N
    attemptLTM-Switch-r18                       ENUMERATED {true}
OPTIONAL, -- Cond LTM-MCG
    ltm-ServingCellUE-MeasuredTA-ID-r18         INTEGER (1..maxNrofLTM-Configs-plus1-r18)
OPTIONAL, -- Need N
    ...
}
```

| LTM-Config field descriptions |
| --- | attemptLTM-Switch
If present, the UE shall execute an LTM cell switch if selected cell is a LTM candidate cell as described in clause 5.3.7.3.
ltm-ReferenceConfiguration
This field includes an RRCReconfiguration message used to configure a reference configuration for LTM.

- LTM-CSI-ReportConfig
The IE LTM-CSI-ReportConfig is used to configure report
on the cell in which the LTM-CSI-ReportConfig is included.

| LTM-CSI-ReportConfig information element |
| --- |

```
LTM-CSI-ReportConfig-r18 ::= SEQUENCE {
    ltm-CSI-ReportConfigId-r18                  LTM-CSI-ReportConfigId-r18,
    ltm-ResourcesForChannelMeasurement-r18      LTM-CSI-ResourceConfigId-r18,
    ltm-ReportConfigType-r18                    CHOICE {
        periodic-r18                                SEQUENCE {
            reportSlotConfig-r18                        CSI-ReportPeriodicityAndOffset,
            pucch-CSI-ResourceList-r18                  SEQUENCE (SIZE (1..maxNrofBWPs)) OF
PUCCH-CSI-Resource
        },
        semiPersistentOnPUCCH-r18                   SEQUENCE {
            reportSlotConfig-r18                        CSI-ReportPeriodicityAndOffset,
            pucch-CSI-ResourceList-r18                  SEQUENCE (SIZE (1..maxNrofBWPs)) OF
PUCCH-CSI-Resource
        },
        semiPersistentOnPUSCH-r18                   SEQUENCE {
            reportSlotConfig-r18                        CSI-ReportPeriodicityAndOffset,
            reportSlotOffsetList-r18                    SEQUENCE (SIZE (1.. maxNrofUL-
Allocations-r16)) OF INTEGER (0..128),
            reportSlotOffsetListDCI-0-2-r18             SEQUENCE (SIZE (1.. maxNrofUL-
Allocations-r16)) OF INTEGER (0..128),
            reportSlotOffsetListDCI-0-1-r18             SEQUENCE (SIZE (1.. maxNrofUL-
Allocations-r16)) OF INTEGER (0..128),
            p0alpha                                     P0-PUSCH-AlphaSet Id
        },
```

-continued

```
                        - LTM-CSI-ReportConfig
               The IE LTM-CSI-ReportConfig is used to configure report
                  on the cell in which the LTM-CSI-ReportConfig is included.
                        LTM-CSI-ReportConfig information element aperiodic-r18                        SEQUENCE {
        reportSlotOffsetList-r18             SEQUENCE (SIZE (1.. maxNrofUL-
Allocations-r16)) OF INTEGER (0..128) ,
        reportSlotOffsetListDCI-0-2-r18      SEQUENCE (SIZE (1.. maxNrofUL-
Allocations-r16)) OF INTEGER (0..128) ,
        reportSlotOffsetListDCI-0-1-r18      SEQUENCE (SIZE (1.. maxNrofUL-
Allocations-r16)) OF INTEGER (0..128)
    },
    ...
    },
    ltm-ReportContent-r18                LTM-ReportContent-r18,
    ...
}
LTM-ReportContent-r18 ::= SEQUENCE {
    nrOfReportedCells-r18                ENUMERATED {n1, n2, n3, n4},
    nrOfReportedRS-PerCell-r18           ENUMERATED {n1, n2, n3, n4},
    spCellInclusion-r18                  ENUMERATED {true}
OPTIONAL -- Need R
}
```

LTM-CSI-ReportConfig field descriptions ltm-ReportContent
This field defines the content of the LTM L1 measurement report.
reportSlotConfig
Periodicity and slot offset (see TS 38.214 [19], clause 5.2.1.4).
reportSlotOffsetList, reportSlotOffsetListDCI-0-1, reportSlotOffsetListDCI-0-2
Timing offset Y for semi persistent reporting using PUSCH and aperiodic reporting.

LTM-CSI-ResourceConfig

The IE LTM-CSI-ResourceConfig defines a group of one or more CSI resources for one or more LTM candidate configurations.

```
                        LTM-CSI-ResourceConfig information element

LTM-CSI-ResourceConfig-r18 ::=       SEQUENCE {
    ltm-CSI-ResourceConfigId-r18         LTM-CSI-ResourceConfigId-r18,
    ltm-CSI-SSB-ResourceSet-r18          LTM-CSI-SSB-ResourceSet-r18,
    ...
}
LTM-CSI-SSB-ResourceSet-r18 ::=      SEQUENCE {
    ltm-CSI-SSB-ResourceList-r18         SEQUENCE (SIZE (1..maxNrofLTM-CSI-SSB-ResourcesPerSet-r18))
OF SSB-Index,
    ltm-CandidateIdList-r18              SEQUENCE (SIZE (1..maxNrofLTM-CSI-SSB-ResourcesPerSet-r18))
OF LTM-CandidateId-r18,
    ...
}
```

LTM-CSI-SSB-ResourceSet field descriptions ltm-CandidateIdList
This field Indicates the LTM candidate cell IDs related to the SSBs in the ltm-CSI-SSB-ResourceList. The list has the
same number of entries as ltm-CSI-SSB-ResourceList. The first entry in this list shall be associated to the first entry in
ltm-CSI-SSB-ResourceList, the second entry of this list shall be associated to the second entry in ltm-CSI-SSB-
ResourceList, and so on.
ltm-CSI-SSB-ResourceList
This field is used to indicate on SS/PBCH block resources from one or more LTM candidate cells.

In [13]3GPP 38.212 v18.2.0, the following is provided:

6.3.2.4 Rate Matching

In case where there are more than one UL-SCH transport blocks for the PUSCH transmission, the UCI information is multiplexed only on the UL-SCH transport block with highest $I_{MCS}$ value for the initial PUSCH, where $I_{MCS}$ is as defined in Clause 6.1.4.1 in [6, TS 38.214]. In case the two transport blocks have the same $I_{MCS}$ value for the initial PUSCH, the UCI information is multiplexed with data only on the first transport block. The PUSCH for UCI multiplexing in this Clause refers to the UL-SCH transport block for UCI multiplexing.

6.3.2.4.1 UCI Encoded by Polar Code

If the higher layer parameter nrof_UTO_UCI is configured, the procedures in this clause and the clauses it refers to apply by replacing CG-UCI with UTO-UCI in all the notations and texts, when applicable.

6.3.2.4.1.1 HARQ-ACK

For HARQ-ACK transmission on PUSCH not using repetition type B with UL-SCH and if numberOfSlotsTBoMS is not present in the resource allocation table, or if numberOfSlotsTBoMS is present in the resource allocation table and the value of numberOfSlotsTBoMS in the row indicated by the Time domain resource assignment field in DCI is equal to 1, the number of coded modulation symbols per layer for HARQ-ACK transmission, denoted as $Q'_{ACK}$, is determined as follows:

$$Q'_{ACK} = \min\left\{ \left\lceil \frac{(O_{ACK} + L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=l_0}^{N_{symb,all}^{PUSCH}-1} M_{sc}^{UCI}(l) \right\rceil \right\}$$

where $O_{ACK}$ is the number of HARQ-ACK bits;

if $O_{ACK} \geq 360$, $L_{ACK}=11$; otherwise $L_{ACK}$ is the number of CRC bits for HARQ-ACK determined according to Clause 6.3.1.2.1;

$$\beta_{offset}^{PUSCH} = \beta_{offset}^{HARQ-ACK};$$

$C_{UL-SCE}$ is the number of code blocks for UL-SCH of the PUSCH transmission;

if the DCI format scheduling the PUSCH transmission includes a CBGTI field indicating that the UE shall not transmit the r-th code block, $K_r=0$; otherwise, $K_r$ is the r-th code block size for UL-SCH of the PUSCH transmission;

$$M_{sc}^{PUSCH}$$

is the scheduled bandwidth of the PUSCH transmission, expressed as a number of subcarriers;

$$M_{sc}^{PT-RS}(l)$$

is the number of subcarriers in OFDM symbol l that carries PTRS, in the PUSCH transmission;

$$M_{sc}^{UCI}(l)$$

is the number of resource elements that can be used for transmission of UCI in OFDM symbol l, for $$l = 0, 1, 2, \ldots, N_{symb,all}^{PUSCH} - 1,$$

in the PUSCH transmission and $$N_{symb,all}^{PUSCH}$$

is the total number of OFDM symbols of the PUSCH, including all OFDM symbols used for DMRS;

for any OFDM symbol that carries DMRS of the PUSCH, $$M_{sc}^{UCI}(l) = 0;$$

for any OFDM symbol that does not carry DMRS of the PUSCH, $$M_{sc}^{UCI}(l) = M_{sc}^{PUSCH} - M_{sc}^{PT-RS}(l);$$

$\alpha$ is configured by higher layer parameter scaling;

$l_0$ is the symbol index of the first OFDM symbol that does not carry DMRS of the PUSCH, after the first DMRS symbol(s), in the PUSCH transmission.

. . .

6.3.2.4.1.2 CSI Part 1

For CSI part 1 transmission on PUSCH not using repetition type B with UL-SCH and if numberOfSlotsTBoMS is not present in the resource allocation table, or if numberOfSlotsTBoMS is present in the resource allocation table and the value of numberOfSlotsTBoMS in the row indicated by the Time domain resource assignment field in DCI is equal to 1, the number of coded modulation symbols per layer for CSI part 1 transmission, denoted as $Q'_{CSI-part1}$, is determined as follows:

$$Q'_{CSI-1} = \min\left\{ \left\lceil \frac{(o_{CSI-1} + L_{CSI-1}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=0}^{N_{symb,all}^{PUSCH}-1} M_{sc}^{UCI}(l) \right\rceil - (Q'_{ACK/CG-UCI}) \right\}$$

where $O_{CSI-1}$ is the number of bits for CSI part 1;

if $O_{CSI-1} \geq 360$, $L_{CSI-1}=11$; otherwise $I_{CSI-1}$ is the number of CRC bits for CSI part 1 determined according to Clause 6.3.1.2.1;

$$\beta_{offset}^{PUSCH} = \beta_{offset}^{CSI-part1};$$

UL-SCE is the number of code blocks for UL-SCH of the PUSCH transmission;

if the DCI format scheduling the PUSCH transmission includes a CBGTI field indicating that the UE shall not transmit the r-th code block, $K_r=0$; otherwise, $K_r$ is the r-th code block size for UL-SCH of the PUSCH transmission;

$$M_{sc}^{PUSCH}$$

is the scheduled bandwidth of the PUSCH transmission, expressed as a number of subcarriers;

$$M_{sc}^{PT-RS}(l)$$

is the number of subcarriers in OFDM symbol l that carries PTRS, in the PUSCH transmission;

$Q'_{ACK/CG-UCI}=Q'_{ACK}$ if HARQ-ACK is present for transmission on the same PUSCH with UL-SCH and without CG-UCI, where $Q'_{ACK}$ is the number of coded modulation symbols per layer for HARQ-ACK transmitted on the PUSCH as defined in clause 6.3.2.4.1.1 if number of HARQ-ACK information bits is more than 2, and $$Q'_{ACK} = \sum_{l=0}^{N_{symb,all}^{PUSCH}-1} \bar{M}_{sc,rvd}^{ACK}(l)$$

if the number of HARQ-ACK information bits is no more than 2 bits, where $$\bar{M}_{sc,rvd}^{ACK}(l)$$

is the number of reserved resource elements for potential HARQ-ACK transmission in OFDM symbol l, for $$l = 0, 1, 2, \ldots, N_{symb,all}^{PUSCH}-1,$$

in the PUSCH transmission, defined in Clause 6.2.7; or $Q'_{ACK/CG-UCI}=Q'_{ACK}$ if both HARQ-ACK and CG-UCI are present on the same PUSCH with UL-SCH, where $Q'_{ACK}$ is the number of coded modulation symbols per layer for HARQ-ACK and CG-UCI transmitted on the PUSCH as defined in clause 6.3.2.4.1.5; or $Q'_{ACK/CG-UCI}=Q'_{CG-UCI}$ if CG-UCI is present on the same PUSCH with UL-SCH and without HARQ-ACK, where $Q'_{CG-UCI}$ is the number of coded modulation symbols per layer for CG-UCI transmitted on the PUSCH as defined in clause 6.3.2.4.1.4;

$$M_{sc}^{UCI}(l)$$

is the number of resource elements that can be used for transmission of UCI in OFDM symbol l, for $$l = 0, 1, 2, \ldots, N_{symb,all}^{PUSCH} - 1,$$

in the PUSCH transmission and $$N_{symb,all}^{PUSCH}$$

is the total number of OFDM symbols of the PUSCH, including all OFDM symbols used for DMRS;

for any OFDM symbol that carries DMRS of the PUSCH, $$M_{sc}^{UCI}(l) = 0;$$

for any OFDM symbol that does not carry DMRS of the PUSCH, $$M_{sc}^{UCI}(l) = M_{sc}^{PUSCH} - M_{sc}^{PT-RS}(l);$$

$\alpha$ is configured by higher layer parameter scaling.

. . .

6.3.2.4.1.3 CSI Part 2

For CSI part 2 transmission on PUSCH not using repetition type B with UL-SCH and if numberOfSlotsTBoMS is not present in the resource allocation table, or if numberOfSlotsTBoMS is present in the resource allocation table and the value of numberOfSlotsTBoMS in the row indicated by the Time domain resource assignment field in DCI is equal to 1, the number of coded modulation symbols per layer for CSI part 2 transmission, denoted as $Q'_{CSI-part2}$, is determined as follows:

$$Q'_{CSI-2} = \min\left\{ \left\lceil \frac{(O_{CSI-2} + L_{CSI-2}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left[ \alpha \cdot \sum_{l=0}^{N_{symb,all}^{PUSCH}-1} M_{sc}^{UCI}(l) \right] - Q'_{ACK/CG-UCI} - Q'_{CSI-1} \right\}$$

where $O_{CSI-2}$ is the number of bits for CSI part 2;

if $O_{CSI-2} \geq 360$, $L_{CSI-2}=11$; otherwise $L_{CSI-2}$ is the number of CRC bits for CSI part 2 determined according to Clause 6.3.1.2.1;

$$\beta_{offset}^{PUSCH} = \beta_{offset}^{CSI-part2};$$

$C_{UL-SCE}$ is the number of code blocks for UL-SCH of the PUSCH transmission;

if the DCI format scheduling the PUSCH transmission includes a CBGTI field indicating that the UE shall not transmit the r-th code block, $K_r=0$; otherwise, $K_r$ is the r-th code block size for UL-SCH of the PUSCH transmission;

$$M_{sc}^{PUSCH}$$

is the scheduled bandwidth of the PUSCH transmission, expressed as a number of subcarriers;

$$M_{sc}^{PT-RS}(l)$$

is the number of subcarriers in OFDM symbol L that carries PTRS, in the PUSCH transmission;

$Q'_{ACK/CG-UCI} = Q'_{ACK}$ if HARQ-ACK is present for transmission on the same PUSCH with UL-SCH and without CG-UCI, where $Q'_{ACK}$ is the number of coded modulation symbols per layer for HARQ-ACK transmitted on the PUSCH as defined in clause 6.3.2.4.1.1 if number of HARQ-ACK information bits is more than 2, and $Q'_{ACK} = 0$ if the number of HARQ-ACK information bits is 1 or 2 bits; or $Q'_{ACK/CG-UCI} = Q'_{ACK}$ if both HARQ-ACK and CG-UCI are present on the same PUSCH with UL-SCH, where $Q'_{ACK}$ is the number of coded modulation symbols per layer for HARQ-ACK and CG-UCI transmitted on the PUSCH as defined in clause 6.3.2.4.1.5; or $Q'_{ACK/CG-UCI} = Q'_{CG-UCI}$ if CG-UCI is present on the same PUSCH with UL-SCH and without HARQ-ACK, where $Q'_{CG-UCI}$ is the number of coded modulation symbols per layer for CG-UCI transmitted on the PUSCH as defined in clause 6.3.2.4.1.4;

$Q'_{CSI-1}$ is the number of coded modulation symbols per layer for CSI part 1 transmitted on the PUSCH;

$$M_{sc}^{UCI}(l)$$

is the number of resource elements that can be used for transmission of UCI in OFDM symbol l, for $$l = 0, 1, 2, \ldots, N_{symb,all}^{PUSCH} - 1,$$

in the PUSCH transmission and $$N_{symb,all}^{PUSCH}$$

is the total number of OFDM symbols of the PUSCH, including all OFDM symbols used for DMRS;

for any OFDM symbol that carries DMRS of the PUSCH, $$M_{sc}^{UCI}(l) = 0;$$

for any OFDM symbol that does not carry DMRS of the PUSCH, $$M_{sc}^{UCI}(l) = M_{sc}^{PUSCH} - M_{sc}^{PT-RS}(l).$$

α is configured by higher layer parameter scaling.

In New Radio (NR), a network could configure a User Equipment (UE) with beam reporting (e.g., periodic or semi-persistent beam reporting) or activate or trigger aperiodic beam reporting (e.g., Channel State Information (CSI) reporting) to acquire or obtain channel state information or channel quality or beam quality for data/control transmissions. However, with frequent reporting, the UE could experience huge transmission/signaling overhead. On the other hand, with sparse reporting, the network may not be able to obtain the latest beam information in time and the quality of communication between a network and a UE could be deteriorated. In Rel-19 Multi-Input Multi-Output (MIMO) phase 5, a UE initiated/event-driven beam management to reduce latency and/or overhead is discussed. The UE could initiate or trigger a beam report in response to some condition being met (e.g., quality of currently (activated) beam being lower than a threshold and/or quality of a new/candidate beam being higher than a threshold and/or quality of a new/candidate beam is a threshold value better than a current beam).

In addition, in mobility enhancement phase 4, UE-initiated beam reporting is also introduced for candidate cells in order to perform faster Layer 1 (L1)/Layer 2 (L2)-Triggered Mobility (LTM). The UE could be configured with one or more events for triggering an L1 measurement associated with a candidate cell and/or a candidate beam associated with a candidate cell. The candidate beam could be a beam with a best quality or an activated beam for the candidate cell. The one or more events could contain at least one of:

(Beam of) a serving cell becomes better than an absolute threshold, (Beam of) a serving cell becomes worse than an absolute threshold, (Beam of) a candidate cell becomes an amount of offset better than a (beam of) serving cell, (Beam of) a candidate cell becomes better than an absolute threshold, and/or (Beam of) a serving cell becomes worse than an absolute threshold1 and a (beam of) candidate cell becomes better than another absolute threshold2, and/or a combination of any of the above events.

The one or more events could be different from event(s) configured for UE-initiated (or UEI) beam reporting for channel quality or beam quality of a Serving Cell. The UE could be configured with a first event for triggering beam reporting of a candidate cell and a second event for triggering beam reporting of a Serving Cell. A UE could have a triggered (and/or pending) beam reporting for a Serving Cell and a triggered (and/or pending) beam reporting for a candidate cell at a same time.

The UE could transmit a beam report in response to a triggered UE-initiated beam reporting for a candidate cell on Physical Uplink Control Channel (PUCCH). Alternatively and/or additionally, the UE could transmit the beam report on Physical Uplink Shared Channel (PUSCH) (e.g., the beam report could be included in a Medium Access Control (MAC) Control Element (CE)). The UE could be configured with a periodic resource for the beam reporting and/or the UE could be indicated or scheduled dynamically with UL resources (e.g., PUCCH or PUSCH) resources for beam report transmission.

The UE could transmit a beam report in response to a triggered UE-initiated beam reporting for a Serving Cell on PUCCH. Alternatively and/or additionally, the UE could transmit the beam report on PUSCH (e.g., the beam report could be included in a MAC CE). The UE could be configured with a periodic resource for the beam reporting and/or the UE could be indicated or scheduled dynamically with UL resources (e.g., PUCCH or PUSCH) resources for beam report transmission.

When the UE has a triggered beam reporting for a candidate cell and a triggered beam reporting for a Serving Cell (at a same time), the UE may not be able to accommodate both (or all) beam reports for the two beam reporting in available UL resources. Additionally and/or alternatively, the UE may not be able to accommodate both or all beam reports for triggered beam reporting of candidate cells.

In this disclosure, methods are discussed for handling prioritization between overlapping/co-existing UE-initiated beam reporting for candidate cells and/or Serving Cells, as detailed below.

Collision between UE-initiated beam reporting for MIMO and UE-initiated beam reporting for LTM.

Whether pre-configured (periodic) resources for UE-initiated beam reporting for MIMO could be shared for UE-initiated beam reporting for LTM, e.g., in collision cases or non-collision cases.

Single set of pre-configured (periodic) resources for both reports.

Same or different resources for one-bit PUCCH indication.

Indication(s) for a receiver to determine the content is for MIMO, for LTM, or both.

A set of pre-configured (periodic) resources for UE-initiated beam reporting for MIMO and another set of pre-configured (periodic) resources for UE-initiated beam reporting for LTM.

A set of pre-configured (periodic) resources for UE-initiated beam reporting for MIMO and no pre-configured (periodic) resources for UE-initiated beam reporting for LTM.

Whether a single report can accommodate both information (assuming the Uplink (UL) grant is sufficient).

Duplicate info, e.g., current beam status, can be avoided.

Indication(s) for the receiver to determine the content.

Configured by a Network (NW).

If two reports are to be transmitted separately and only one can be transmitted (e.g., due to an insufficient UL grant or multiplexing concern), which one has higher priority.

Fixed order.

Dynamic order, e.g., depending on the event triggering the report, quality of a new beam, quality of a current beam, or etc.

Configured by the NW.

Remaining one may be cancelled or may still be pending.

Inter-Centralized Unit (CU)/intra-CU.

One concept of the present invention is that a UE could determine whether a (UE-initiated) beam reporting (or a beam report or a beam report transmission) is prioritized. The UE could determine a priority (for multiplexing or for transmission) of the beam reporting (or the beam report or the beam report transmission).

The beam reporting (or the beam report or the beam report transmission) could be associated with a UE-initiated beam reporting for a candidate cell. The beam report could be associated with a triggered UE-initiated beam reporting associated with the candidate cell.

Additionally and/or alternatively, the beam reporting (or the beam report or the beam report transmission) could be associated with a UE-initiated beam reporting for a Serving cell. The beam report could be associated with a triggered UE-initiated beam reporting associated with the Serving Cell.

Assumption 1: Reports are Transmitted in Different Transmissions

The UE could determine whether the beam reporting or the beam report is prioritized based on at least one or more UL transmissions overlapping (in time domain) with a beam report transmission associated with the beam reporting or the beam report. The UE could determine whether the beam report transmission is prioritized based on at least one or more UL transmissions overlapping (in time domain) with a beam report transmission associated with the beam reporting or the beam report.

When the beam reporting or beam report is prioritized (over other UL data/report/MAC CEs), the UE could multiplex or include the beam report in a Transport Block (TB) or MAC Protocol Data Unit (PDU) or PUCCH transmission. When the beam reporting or beam report is not prioritized or de-prioritized, the UE may not multiplex or include the beam report in a TB or MAC PDU or PUCCH transmission (until prioritized beam reports/data/MAC CEs are included). When the beam reporting or beam report is not prioritized or de-prioritized, the UE could multiplex or include the beam report in a TB or MAC PDU or PUCCH transmission when the TB or MAC PDU or PUCCH transmission can accommodate the beam report and (after) (all or other) prioritized beam reports/data/MAC CEs are (already) included. Additionally and/or alternatively, when the beam reporting or beam report or beam report transmission is prioritized, the UE could perform transmission associated with the beam reporting or beam report or beam report transmission (and does not transmit other UL transmissions that are deprioritized). When the beam reporting or beam report or beam report transmission is not prioritized or deprioritized, the UE may not perform transmission associated with the beam reporting or beam report or beam report transmission (and transmits other UL transmissions that are prioritized).

The one or more UL transmissions could be associated with (other) UE-initiated beam reporting for a Serving Cell.

The one or more UL transmissions could be associated with (other) UE-initiated beam reporting for a candidate cell.

The one or more UL transmissions could be associated with UE-initiated beam reporting for one or more (other) candidate Cells.

The one or more UL transmissions could be associated with PUSCH transmissions associated with data associated with one or more logical channels.

The one or more UL transmissions could be associated with PUSCH transmissions associated with one or more MAC CEs.

The UE may not be able to perform the beam report transmission simultaneously with (any of) the one or more UL transmissions. The UE may not be allowed to transmit the beam report and the one or more UL transmissions simultaneously due to/according to a configuration. Additionally and/or alternatively, the UE could consider the beam report transmission as a prioritized transmission if or when the UE could perform the beam report transmission simultaneously with (all of) the one or more UL transmissions.

Additionally and/or alternatively, the UE may not have UL grant(s) that can accommodate the beam report and (all of) the pending data and/or (all) MAC CE(s) and/or (other) beam report(s) available for transmission. The UE may not be able to include the beam report with logical channel data available for transmission in available UL grant(s).

Assumption 2: Reports are Included in One Single Transmission

Additionally and/or alternatively, the UE could determine whether the beam reporting or the beam report is prioritized based on at least one or more triggered (and not cancelled) beam reporting of the UE. The one or more triggered (and not cancelled) beam reporting could be triggered in response to other beam reporting for Serving Cells and/or candidate cells. The UE could determine whether a first beam reporting is prioritized over a second beam reporting when determining whether to include a corresponding first beam report of the first beam reporting into a MAC PDU.

The UE could determine whether to prioritize a (transmission of a) first beam report associated with a candidate cell based on at least an overlapping second beam report (or a second beam report transmission). Additionally and/or alternatively, the UE could determine whether to prioritize a triggered (and not cancelled) first beam reporting over a triggered second beam reporting based on at least Cell(s) or beam(s) associated with the first beam reporting and/or the second beam reporting.

Fixed Order

In one example, (when performing multiplexing and assembly associated with a MAC PDU,) the UE could determine whether to prioritize a first beam report over a second beam report based on at least type(s) of the first and the second beam report. The priority of beam report for different Cells could be set to a fixed order. Additionally and/or alternatively, the UE determines the prioritization of different types of the beam reports regardless of (beam or Cell) quality or priority of beam(s) or Cell(s) associated with the beam reports.

The type of the first beam report and the second beam report could include a beam report for candidate cell(s).

The type of the first beam report and the second beam report could include a beam report for Serving Cell(s).

The UE could prioritize a beam report for candidate cell(s) over a beam report for Serving Cell(s) (regardless of events or beam qualities associated with the beam reports). Alternatively, the UE could prioritize a beam report for Serving Cell(s) over a beam report for candidate cell(s).

Additionally and/or alternatively, when the UE prioritizes the first beam report over the second beam report, the UE could include the first beam report (e.g., a MAC CE) first in a MAC PDU before including the second beam report (e.g., another MAC CE) in the MAC PDU in a multiplexing and assembly procedure.

For example, when performing logical channel prioritization or multiplexing and assembly, the UE could prioritize beam reports of different types and data in the following order (e.g., the first one has the highest/higher priority than the following):

(Common Control Channel (CCCH) data) (Dedicated Control Channel (DCCH) data),
  Beam report (MAC CE) for candidate cells,
  Beam report (MAC CE) for Serving Cells, and
  (DCCH) (Dedicated Traffic Channel (DTCH) data).

Additionally and/or alternatively, the beam report MAC CEs could have a lower priority than Cell Radio Network Temporary Identifier (C-RNTI) MAC CE.

Additionally and/or alternatively, the beam report MAC CEs could have a higher priority than MAC CE for Listen-Before-Talk (LBT) failure.

Additionally and/or alternatively, the beam report MAC CEs could have a lower priority than MAC CE for (Sidelink) Buffer status report. Additionally and/or alternatively, the beam report MAC CEs could have a higher priority than MAC CE for (Sidelink) Buffer status report.

Additionally and/or alternatively, the beam report MAC CEs could have a higher or lower priority than MAC CE for Power Headroom Report (PHR).

Additionally and/or alternatively, the beam report MAC CEs could have a higher or lower priority than MAC CE for Beam Failure Recovery (BFR), or MAC CE for Configured Grant Confirmation, or MAC CE for Multiple Entry Configured Grant Confirmation.

Additionally and/or alternatively, the beam report MAC CEs could have a lower priority than UL-CCCH data.

Additionally and/or alternatively, the beam report MAC CEs could have a lower priority than DCCH or DTCH data.

Additionally and/or alternatively, beam report MAC CEs for Serving Cells and MAC CEs for candidate cells could have a different priority when comparing to a MAC CE or UL data. For example, beam report MAC CEs for candidate cells could have a higher priority than a MAC CE for BFR, and a beam report MAC CE for Serving Cells could have a lower priority than the MAC CE for BFR.

For example, when the UE cannot accommodate both a first beam report for a Serving Cell and a second beam report for a candidate cell in a same transmission (e.g., MAC PDU, TB, or PUCCH transmission), the UE could include the first beam report (and does not include the second beam report). Alternatively, the UE could include the second beam report (and does not include the first beam report).

For another example, when the UE cannot perform both a first beam report transmission for a Serving Cell and a second beam report transmission for a candidate cell simultaneously (or at a same time), the UE considers the first beam report transmission as a prioritized transmission (and considers the second beam report transmission as a de-prioritized transmission). Alternatively, the UE considers the second beam report transmission as a prioritized transmission (and considers the first beam report transmission as a de-prioritized transmission).

Compared with Other UL Transmissions

Additionally and/or alternatively, the UE could prioritize the first and/or the second beam report transmission over a Scheduling Request (SR) transmission. Alternatively, the UE could prioritize the SR transmission over the first and/or the second beam report transmission.

Additionally and/or alternatively, the UE could prioritize the first and/or the second beam report over DCCH and/or DTCH data. Alternatively, the UE could prioritize DCCH and/or DTCH data over the first and/or the second beam report.

Fixed Order: Intra-CU Over Inter-CU

Additionally and/or alternatively, the UE could determine whether to prioritize a third beam report associated with a third candidate cell over a fourth beam report associated with a fourth candidate cell based on at least whether the third candidate cell is associated with a same CU (or DU) as a Serving Cell of the UE or not. The Serving Cell of the UE could be associated with a Primary Cell (PCell) of a Master Cell Group (MCG) or a Primary Secondary Cell (PSCell) of a Secondary Cell Group (SCG) of the UE.

For example, the UE could prioritize the third beam report over the fourth beam report if or when the third beam report is associated with an intra-DU (or intra-CU) candidate cell (and the fourth candidate cell is an inter-DU (or inter-CU) candidate cell). Alternatively, the UE could prioritize the fourth beam report over the third beam report if or when the third beam report is associated with an intra-DU or intra-CU candidate cell (and the fourth candidate cell is an inter-DU or inter-CU candidate cell).

An intra-DU (or intra-CU) candidate cell could mean that a serving cell of UE (e.g., PCell or PSCell) and the candidate cell are associated with or controlled by the same DU (or the same CU).

An inter-DU (or inter-CU) candidate cell could mean that a serving cell of UE (e.g., PCell or PSCell) and the candidate cell are associated with or controlled by different DUs (or different CUs).

Based on Measured Beam Quality and Based on Current/ Candidate/New Beam Quality

Additionally and/or alternatively, the UE could determine whether to prioritize a fifth beam report over a sixth beam report based on at least quality of a first beam associated with the fifth beam report.

Additionally and/or alternatively, the UE could determine whether to prioritize the fifth beam report over the sixth beam report based on at least quality of a second beam associated with the sixth beam report.

The fifth beam report could be associated with a beam reporting of a (fifth) Serving Cell. The sixth beam report could be associated with a beam reporting of a (sixth) candidate cell.

The first beam could be a beam associated with triggering of the fifth beam report. The first beam could be an activated beam for the Serving Cell. The first beam could be a currently used beam (for Physical Downlink Control Channel (PDCCH) and/or Physical Downlink Shared Channel (PDSCH)) for the Serving Cell. Additionally and/or alternatively, the first beam could be a candidate beam (e.g., for beam failure recovery or for L1 measurement) associated with the Serving Cell. Additionally and/or alternatively, the first beam could be a best beam (e.g., beam with a highest quality) among (all) beam(s) of the Serving Cell. The first beam could be a new beam (in contrast to a current/activated beam).

The second beam could be a beam associated with triggering of the sixth beam report. The second beam could be associated with L1 measurement of the candidate cell. The second beam could be a best beam (e.g., beam with the highest quality) associated with the candidate cell. The second beam could be an activated beam (for L1 measurement/report) associated with the candidate cell. The second beam could be a new beam (in contrast to a current/activated beam).

The UE could prioritize a beam report based on quality of a beam associated with the report. For example, the UE could prioritize the fifth beam report over the sixth beam report if or when the first beam has a quality higher than (or lower than) the second beam (by an offset, e.g., the first beam quality is an offset higher than the second beam quality (e.g., the first beam quality>the second beam quality+offset (positive value))). Additionally and/or alternatively, the UE could prioritize the fifth beam report over the sixth beam report if or when the quality of the first beam is higher than (or lower than) a first threshold. Additionally and/or alternatively, the UE could prioritize the fifth beam report over the sixth beam report if or when the quality of the second beam is lower than (or higher than) a threshold.

Additionally and/or alternatively, the UE could prioritize the sixth beam report over the fifth beam report if or when the quality of the first beam is higher than (or lower than) a first threshold. Additionally and/or alternatively, the UE could prioritize the sixth beam report over the fifth beam report if or when the quality of the second beam is lower than (or higher than) a threshold.

For another example, the UE could prioritize the fifth beam report (over the sixth beam report) if or when a beam quality of the current beam (or best beam) of the Serving Cell is lower than a threshold. For another example, the UE could prioritize the sixth beam report (over the fifth beam report) if or when a beam quality of the current/new beam (or best beam) of the candidate cell is higher than a threshold.

Additionally and/or alternatively, the fifth beam report could be associated with a beam reporting of a fifth candidate cell and the sixth beam report could be associated with a beam reporting of a sixth candidate cell (e.g., both beam reports are for candidate cell beam reporting). The fifth candidate cell and the sixth candidate cell could be different cells. Alternatively, the fifth candidate cell and the sixth candidate cell could be the same cell. Alternatively, a UE could trigger one beam reporting for one candidate cell at a time (e.g., the UE may not trigger more than one beam reporting for a single candidate cell at a time).

When the fifth beam report is for beam reporting of the fifth candidate cell, the first beam (used for the UE to determine prioritization between the fifth and the sixth beam report) could be associated with L1 measurement of the fifth candidate cell. The first beam could be a best beam (e.g., beam with the highest quality) associated with the fifth candidate cell. The first beam could be an activated beam (for L1 measurement/report) associated with the fifth candidate cell. The first beam could be a new beam (in contrast to a current/activated beam).

For example, the UE could prioritize the fifth beam report over the sixth beam report if or when the first beam (of the fifth candidate cell) has a quality higher than (or lower than) the second beam (of the sixth candidate cell) (by an offset, e.g., the first beam quality is an offset higher than the second beam quality (e.g., the first beam quality>the second beam quality+offset (positive value))). Additionally and/or alternatively, the UE could prioritize the fifth beam report over the sixth beam report if or when the quality of the first beam is higher than (or lower than) a first threshold. Additionally and/or alternatively, the UE could prioritize the fifth beam report over the sixth beam report if or when the quality of the second beam is lower than (or higher than) a threshold.

The prioritization between beam reports could be among beam reports of Serving Cells, among beam reports of Serving Cells and candidate cells, and/or among beam reports of candidate cells.

Additionally and/or alternatively, the sixth report could be associated with a beam reporting of a sixth Serving Cell. The second beam could be associated with the sixth Serving Cell.

The fifth Serving Cell and the sixth Serving Cell could be associated with a same Cell group.

Additionally and/or alternatively, the UE could prioritize the fifth beam report over the sixth beam report if or when a quality difference between a current beam associated with the fifth (Serving or candidate) Cell and a candidate (new or best) beam associated with the fifth (Serving or candidate) cell is larger than a quality difference between a current beam associated with the sixth (Serving or candidate) Cell and a candidate beam associated with the sixth (Serving or candidate) Cell.

When prioritizing a first beam report over other beam report(s), the UE includes the first beam report, or content(s) of the beam report in a MAC PDU before including (contents of) the other beam report(s).

When prioritizing a first beam report over other beam report(s), the UE multiplexes the first beam report, or content(s) of the beam report in a UL transmission before multiplexing (contents of) the other beam report(s).

Additionally and/or alternatively, when prioritizing a first beam report transmission over a second beam report transmission, the UE could perform the first beam report transmission on a UL resource and does not perform the second beam report transmission on the UL resource or on an overlapping UL resource.

Additionally and/or alternatively, when the UE prioritizes the first beam report or the first beam report transmission, the UE de-prioritizes the second beam report or the second beam report transmission. Additionally and/or alternatively, the UE may not perform the first and the second beam report transmission simultaneously.

Based on Index

Additionally and/or alternatively, the UE could determine whether to prioritize the first beam report (transmission) over the second beam report (transmission) based on at least a first index or a first identity associated with the first beam report and/or a second index or a second identity the second beam report. The first index or identity could be a reporting index or candidate target configuration id (e.g., LTM candidate id) or Serving Cell index or event id (that triggered the beam report) associated with the first beam report. The second index or identity could be a reporting index or candidate target configuration id (e.g., LTM candidate id) or Serving Cell index (e.g., servcellindex) or event id or index (that triggered the beam report) associated with the second beam report. The UE could prioritize a beam report with the smallest id or index or identity among all (overlapping or colliding) beam reports.

Based on Pcell

Additionally and/or alternatively, the UE could determine whether to prioritize the first beam report (transmission) over the second beam report (transmission) based on at least a type of first Cell associated with the first beam report and a type of second Cell the second beam report. The type of cell could be Special Cell (SpCell) (PCell or PSCell) or SCell. The UE could prioritize a beam report for SpCell over a beam report for SCell.

Based on Events

Additionally and/or alternatively, the UE could determine whether to prioritize a first beam report over a second beam report based on at least a first event associated with (triggering) the first beam report. the UE could determine whether to prioritize a first beam report over a second beam report based on at least a first event associated with (triggering) the first beam report and/or a second event associated with triggering the second beam report.

Additionally and/or alternatively, when the UE prioritizes the first beam report over the second beam report, the UE could include the first beam report (e.g., a MAC CE) first in a MAC PDU before including the second beam report (e.g., another MAC CE) in the MAC PDU in a multiplexing and assembly procedure.

Additionally and/or alternatively, the UE could determine whether to prioritize the first beam report over the second beam report based on at least a priority order associated with reports with different events. For example, the UE could prioritize beam reports in the following order (e.g., the first one has the highest/higher priority than the following):

Beam report for candidate cells, and
    Beam report for Serving Cells.

Another order the UE follows to prioritize beam reports could be (e.g., the first one has the highest/higher priority than the following):

Beam report for candidate cells triggered by event LTM2 (e.g., Beam of serving cell becomes worse than an absolute threshold), Beam report for candidate cells triggered by event LTM3 (e.g., Beam of candidate cell becomes an amount of offset better than beam of serving cell), Beam report for candidate cells triggered by event LTM4 (e.g., Beam of candidate cell becomes better than an absolute threshold), Beam report for candidate cells triggered by event LTM5 (e.g., Beam of serving cell becomes worse than an absolute threshold1 AND Beam of candidate cell becomes better than another absolute threshold2), Beam report for Serving Cells triggered by Event-2 (e.g., quality of a new beam is a threshold value better than a current beam), Beam report for Serving Cells triggered by Event-1 (e.g., Quality of the current beam is worse than a certain threshold), Beam report for Serving Cells triggered by Event-3 (e.g., Quality of a new beam is better than a certain threshold), and Beam report for Serving Cells triggered by Event-4 (e.g., Quality of the current beam is worse than a threshold 1, and quality of at least one new beam is better than a threshold 2).

Another order the UE follows to prioritize beam reports could be (e.g., the first one has the highest/higher priority than the following):

Beam report for candidate cells triggered by event LTM2 (e.g., Beam of serving cell becomes worse than an absolute threshold), Beam report for Serving Cells triggered by Event-2 (e.g., quality of a new beam is a threshold value better than a current beam), Beam report for candidate cells triggered by Event-LTM1 (e.g., Quality of the current beam of the candidate cell(s) is worse than a certain threshold), Beam report for Serving Cells triggered by Event-1 (e.g., Quality of the current beam of the Serving Cell(s) is worse than a certain threshold), Beam report for candidate cells triggered by event LTM3 (e.g., Beam of candidate cell becomes an amount of offset better than beam of serving cell), Beam report for Serving Cells triggered by Event-3 (e.g., Quality of a new beam is better than a certain threshold), Beam report for candidate cells triggered by event LTM4 (e.g., Beam of candidate cell becomes better than an absolute threshold), Beam report for Serving Cells triggered by Event-4 (e.g., Quality of the current beam is worse than a threshold 1, and quality of at least one new beam is better than a threshold 2), and Beam report for candidate cells triggered by event LTM5 (e.g., Beam of serving cell becomes worse than an absolute threshold1 AND Beam of candidate cell becomes better than another absolute threshold2).

Another order the UE follows to prioritize beam reports could be (e.g., the first one has the highest/higher priority than the following):

Beam report for intra-CU candidate cells,
    Beam report for Serving Cells, and
    Beam report for inter-CU candidate cells.

NW-Configured

Additionally and/or alternatively, the UE could determine whether to prioritize a first beam report over a second beam report based on at least a configuration. The configuration could be provided by a network/NW.

The configuration could indicate prioritization of beam reports for candidate cells and/or Serving Cells. The configuration could indicate an order of prioritization between beam reports. The order could be based on beam quality and/or events and/or types of the beam reports. The UE could perform prioritization based on the order provided in the configuration. The configuration could indicate prioritization of beam reports associated with an event LTM. If the UE receives the configuration, the UE applies or determines a first prioritization rule or a first order of prioritization between beam reports. If the UE does not receive the configuration, the UE applies or determines a second prioritization rule or a second order of prioritization between beam reports. In one example, a first prioritization rule or a first order of prioritization corresponds to beam reports associated with an LTM event over beam reports associated with a MIMO event. Preferably in certain embodiments, a second prioritization rule or a second order of prioritization corresponds to a priority value determination.

Additionally and/or alternatively, the configuration could contain rules or parameters for a UE to determine whether to prioritize a beam report.

The parameter could contain a threshold for a beam quality. The UE could prioritize beam reports associated with reported beam(s) with a quality higher than the threshold. Alternatively, the UE could prioritize beam reports associated with Cell(s) of which current beam(s) has a quality lower than the threshold.

The rules or parameters could contain events of beam reports. The configuration could indicate an allowed list and/or block list associated with beam report(s). The UE may not prioritize a beam report associated with an event not configured or indicated in the configuration (or the event is indicated in the block list). Additionally and/or alternatively, the UE could prioritize a beam report triggered by an event indicated in the configuration (or indicated in the allowed list).

Additionally and/or alternatively, the configuration, parameters, or Information Elements (IEs) indicating priority or prioritization between beam reports could be indicated in a configuration of one or more events. The UE could determine or derive a priority of a beam report triggered by an event based on a parameter indicating priority that is included/indicated in the configuration of the event. A priority of the beam report could be determined based on the priority of an event configured for or used to trigger the beam report. An example for a configuration of an event is shown as follows:

```
condEventId          CHOICE {
   (LTM)condEvent1       SEQUENCE {
   a3-Offset             MeasTriggerQuantityOffset,
   hysteresis            Hysteresis,
   timeToTrigger         TimeToTrigger,
   priority               INTEGER (1..16)
   },
```

Remaining One May be Cancelled or Still Pending

Additionally and/or alternatively, when the UE prioritizes the first beam report over the second beam report, the UE could include the first beam report in a UL transmission (e.g., TB or MAC PDU or PUCCH transmission) or multiplex the first beam report as UCI is being multiplexed in the UL transmission and may not include the second beam report nor multiplex the second beam report as UCI is being multiplexed in the UL transmission. Additionally and/or alternatively, when the UE prioritizes the first beam report transmission over the second beam report transmission, the UE could perform the first beam report transmission at a timing and does not perform the second beam report transmission at the timing.

When the UE does not include the second beam report and/or the UE does not perform the second beam report transmission (e.g., when the second beam report is de-prioritized), the UE could cancel the corresponding triggered (UE-initiated) beam reporting of the second beam report.

Alternatively, when the UE does not include the second beam report and/or the UE does not perform the second beam report transmission (e.g., when the second beam report is de-prioritized), the UE may not cancel the corresponding triggered (UE-initiated) beam reporting of the second beam report. For example, the UE could cancel the triggered first beam reporting in response to (successful) transmission of the first beam report and the UE has a pending second beam reporting not cancelled (due to the second beam report being not transmitted). The UE could (determine whether to) transmit the second beam report on a next available UL resource and cancel the second beam reporting in response to the second beam report transmission.

Prioritization

Preferably in certain embodiments, the UE prioritizing a first number of reports comprises any one or more of the following order:

Report associated with event>report associated with LTM without event>report associated with CSI/MIMO without event, Report associated with LTM without event>report associated with event>report associated with CSI/MIMO without event, Report associated with LTM without event>report associated with CSI/MIMO without event>Report associated with event, Preferably in certain embodiments, priority for an intra-event's report is based on any one or more of the following, and preferably in certain embodiments, a lower Identification (ID)/index value may correspond to a higher priority (or derives a lower priority value):

Report configuration ID,

Report configuration type,

Serving cell ID,

Event ID,

Event type (e.g., LTM or MIMO),

Pre-configured or pre-defined order associated with event type (e.g., event LTM3>MIMO event 2>event LTM 2 . . . ), Quality of each event, and/or Triggered timing of an event.

Preferably in certain embodiments, for an intra-event's report's order:

Report associated with LTM event>report associated with MIMO event,

Report associated with MIMO event>report associated with LTM event.

In a first method, the UE does not expect to multiplex or does not multiplex a network node triggered report (without associated with event) and a UEI report on a same UL resource. When the UE receives a Downlink Control Information (DCI) indicating a trigger state associated with a network node triggered report (and/or the DCI does not indicate a second trigger state associated with the UEI report), the UE cannot or prevents from or does not multiplex (pending) the UEI report on the UL resource. The UE multiplex (pending) UEI report on a second UL resource associated with a configured grant for the UEI report or associated with a dynamic grant for the UEI report.

In a second method, the UE always prioritizes a UEI report over an NW triggered report. Alternatively, the UE always prioritizes a UEI report over an NW triggered report. Preferably in certain embodiments, the report may have the following priority order: UE LTM>NW LTM>UE MIMO>NW MIMO. Alternatively, the report may have the following priority order: UE LTM>NW LTM>NW MIMO>UE MIMO. Alternatively, the report may have the following priority order: NW LTM>UE LTM>NW MIMO>UE MIMO. Alternatively, the report may have the following priority order: NW LTM>UE LTM>UE MIMO>NW MIMO.

Preferably in certain embodiments, "UE" means or corresponds to a UEI report or a report associated with an event. Preferably in certain embodiments, "NW" means or corresponds to a NW triggered report or a report NOT associated with an event. Preferably in certain embodiments, "MIMO" means or corresponds to a configuration not associated with an LTM configuration. Preferably in certain embodiments, "LTM" means or corresponds to a configuration associated with an LTM configuration. Preferably in certain embodiments, LTM configuration corresponds to ltm-AssociatedReportConfigInfo, or LTM-config, or LTM-CSI-ReportConfig, LTM-CSI-ResourceConfig.

In a third method, a report associated with LTM (no matter if UEI or NW triggered) has a higher priority than a report associated with non-LTM. Preferably in certain embodiments, for an intra-LTM report (or for an intra-non-LTM report) (or for reports comprising LTM reports and non-LTM-reports), the UE determines a priority value for each report based on ap/sp/p PUSCH, Reference Signal Received Power (RSRP)/non-RSRP, serving cell ID/index, and/or ID/index of reportconfig, and/or an attribute of the event (e.g., event ID/index, event type, LTM event or MIMO event). Preferably in certain embodiments, a lower priority value has a higher priority. Preferably in certain embodiments, a priority value which is indexed from innermost to outmost has an order: firstly the attribute of the event, then ID/index of reportconfig, and then serving cell ID/index, and then RSRP/non-RSRP, and then ap/sp/p PUSCH. Preferably in certain embodiments, the attribute of the event could be in any position in between the order. Preferably in certain embodiments, when two reports have a given same set of outmost attributes, the innermost attribute could result in a different priority value. Preferably in certain embodiments, for a report associated with an ap PUSCH, no matter which is associated with the UEI or is NW triggered, has a higher priority than a report associated with sp/p PUSCH. Preferably in certain embodiments, the network node could configure the event ID/index for MIMO event and/or LTM event. Preferably in certain embodiments, in one example, MIMO event 2 could be configured with event ID/index x and LTM event 2 could be configured with event ID/index y. Preferably in certain embodiments, a report with a lower value between x and y has a higher priority (e.g., lower priority value) than a report with a higher value between x and y. Preferably in certain embodiments, in another example, no matter the event ID/index, a report associated with an LTM event has a higher priority than a report associated with a MIMO event. Preferably in certain embodiments, ID/index space for event ID/index could be localized per serving cell. Preferably in certain embodiments, ID/index space for event ID/index could be localized per candidate cell. Preferably in certain embodiments, ID/index space for event ID/index could be localized per a pair of serving cells and candidate cells. Preferably in certain embodiments, ID/index space for event ID/index could be global among serving cells. Preferably in certain embodiments, ID/index space for event ID/index could be global among a serving cell and a candidate cell. Preferably in certain embodiments, serving cell ID/index for a UEI report associated with an LTM event is based on serving cell ID/index of a serving cell where the report configuration for the UEI report associated with LTM event is configured (e.g., no matter if the LTM event's condition comprises current serving cell's quality or not). Preferably in certain embodiments, serving cell ID/index for UEI report associated with a MIMO event is based on serving cell ID/index of a serving cell where the report configuration for the UEI report associated with the MIMO event is configured. Alternatively, a serving cell ID/index for a UEI report associated with a MIMO event is based on a serving cell ID/index of a serving cell where a measurement RS for MIMO event t is configured.

Preferably in certain embodiments, throughout the present disclosure, for DCI indicating a UL resource for transmitting a UEI report, such UEI report does not correspond to a network node triggered report. Alternatively, when a DCI indicating a UL resource for transmitting a UEI report, such UEI report corresponds to a network node triggered report. Preferably in certain embodiments, a network node triggered report corresponds to a configuration without being associated with an event (no matter LTM event or MIMO event).

Preferably in certain embodiments, if the UE is configured with mode-A, the UE could be configured with a shared PUCCH resource for a request for both an LTM event and MIMO event.

Preferably in certain embodiments, if the UE is configured with mode-B, the UE could be configured with a separate PUCCH resource for Prenotification (PN) for an LTM event and MIMO event, respectively.

Preferably in certain embodiments, if the UE is configured with mode-A, the UE could be configured with separate PUCCH resource for a request for an LTM event and MIMO event, respectively.

Preferably in certain embodiments, if the UE is configured with mode-B, the UE could be configured with a shared PUCCH resource for PN for both an LTM event and MIMO event.

Preferably in certain embodiments, no matter which one event corresponds to a MIMO event or LTM event, the UE transmits a report/request/PN (associated with the one event) on a resource among the first set of resources.

Preferably in certain embodiments, the first set of resources, the second set of resources, and/or the third set of resources for a request could be configured with overlapping in time domain (but non-overlapping in frequency domain).

Preferably in certain embodiments, an LTM event has higher priority over a MIMO event, or vice versa.

Preferably in certain embodiments, when an earlier and a latter event are associated with a same serving cell (no matter whether checking the kind/type or whether there is an additional check of kind/type), the UE does not trigger a latter event, or the UE cancels an earlier event, or the UE prioritizes one event among an earlier event and the latter event, or the UE triggers a latter event, or the UE cancels a latter event.

Preferably in certain embodiments, when the UE has more than one triggered event (and has not transmitted a respective request/PN), the UE transmits the request/PN in a sequential manner.

Preferably in certain embodiments, the UE transmits a first request/PN associated with an earlier event followed by transmitting a second request/PN associated with a latter event.

Preferably in certain embodiments, based on a number of triggered events (preferably with checking of the same serving cell or serving cell group) and/or the number of triggered events corresponding to the same type/kind of events, the UE determines to use resources in one set being as the first set of resources or the third set of resources.

Preferably in certain embodiments, for one triggered event (e.g., either MIMO event or LTM event), the first set of resources are determined Configuration for Beta Offset for Mode-B or Dynamic Mode-A A configuration associated with a Configured Grant (CG) PUSCH for transmitting a UEI report may at least comprise a third parameter and/or a fourth parameter. The third parameter is used to associate a PUCCH resource for indicating PN. The third parameter is used to indicate a PUCCH resource ID. The fourth parameter is used to indicate information of a beta offset. The fourth parameter indicates a beta offset indicator indicating a beta offset. Preferably in certain embodiments, based on the beta offset, the UE could determine a coded symbol for transmitting a special field (or a special UCI). Preferably in certain embodiments, based on the beta offset, the UE could determine a coded symbol for transmitting one or more UEI reports and a special field (or a special UCI). Preferably in certain embodiments, the UE could be provided by a fifth parameter to configure a second beta offset. Preferably in certain embodiments, the beta offset provided by the fourth parameter and the second beta offset provided by the fifth parameter is for the special field (or the special UCI) and one or more reports, respectively. Preferably in certain embodiments, the UE could be configured with a number of beta offsets associated with one or more reports to be transmitted. Preferably in certain embodiments, the UE, based on a payload size of the one or more reports, determines which beta offset is to be used for determining the coded symbol of the one or more reports.

Preferably in certain embodiments, a beta offset for information (or a special field or a special UCI) could be configured per event type or per configuration (e.g., one for a MIMO event and another for an LTM event). Preferably in certain embodiments, a beta offset for a report associated with a different event type could be configured separately (in addition to a beta offset for information).

Preferably in certain embodiments, the UE could be configured with one beta offset (or beta offset indicator indicating one beta offset) for UCI associated with a UEI report. Preferably in certain embodiments, the configuration could be per PUSCH, per UL Bandwidth Part (BWP), per serving cell, and/or per CG PUSCH configuration. Preferably in certain embodiments, based on a mode-A or mode-B configured to a UE, the UE expects the configuration is per which granularity. Preferably in certain embodiments, the one beta offset for UCI associated with a UEI report is shared by a MIMO event and LTM event. Preferably in certain embodiments, the one beta offset for UCI associated with a UEI report is shared by a MIMO event, LTM event and both of a MIMO event and LTM event. Preferably in certain embodiments, when a MIMO event is triggered, the UE uses the one beta offset to determine the coded symbol associated with the UEI report associated with the MIMO event. Preferably in certain embodiments, when an LTM event is triggered, the UE uses the one beta offset to determine the coded symbol associated with the UEI report associated with the LTM event. Preferably in certain embodiments, when both the MIMO event and LTM event is triggered, the UE uses the one beta offset to determine the coded symbol associated with the UEI report associated with both the MIMO event and the LTM event.

Preferably in certain embodiments, when capacity of a UL resource cannot accommodate a number of reports associated with triggered event(s), the UE will prioritize a subset of the number of reports. Preferably in certain embodiments, capacity of a UL resource not accommodating a number of reports corresponds to that a number of coded symbols determined based on the UL resource is smaller than a number of coded symbols for the number of reports. In one example, the number of reports comprises a first report, a second report, a third report associated with a first event, a second event, and a third event. Preferably in certain embodiments, the first event, the second event, and/or the third event corresponds to a MIMO event and/or LTM event. Preferably in certain embodiments, in one example, all the first, second, and third events correspond to a MIMO event. Preferably in certain embodiments, in another example, all the first, second, and third events correspond to a LTM event. Preferably in certain embodiments, payload size of the first report, the second report, the third report corresponds to x, y, z bits. Preferably in certain embodiments, the number of coded symbols for the three reports are determined based on at least a beta offset, and a (reciprocal of) code rate of the UL resource (with/without a scaling factor, e.g., alpha) (which is determined based on a number of coded symbols for a code block/transport block and a resource allocation of the UL resource).

Preferably in certain embodiments, a detailed mathematical formula for determining a number of coded symbols for Hybrid Automatic Repeat Request (HARQ), or a number of coded symbols for information for indicating a number of UEI reports (a special field or a special UCI), or a number of coded symbols for a number of UEI reports is illustrated below.

Preferably in certain embodiments, HARQ and information for indicating a number of UEI reports may be jointly determined or separately determined. Preferably in certain embodiments, the UE could be configured with or enabled jointly encoded for both HARQ and information for indicating a number of UEI reports. Preferably in certain embodiments, if not enabled, the UE could use a separate method to determine a number of coded symbols for HARQ and information for indicating a number of UEI reports, respectively.

Preferably in certain embodiments, a number of coded symbols for HARQ and information could be illustrated below:

$$Q'_{ACK/inform} = \min \left\{ \left( O_{ACK/inform} + L_{ACK/inform} \right) \cdot \beta_{offset}^{PUSCH} \cdot \right.$$

-continued $$\sum_{l=0}^{N_{symb,all}^{PUSCH}-1} M_{sc}^{UCI}(l) / \sum_{R=0}^{C_{UL-SCH}-1} K_r \Bigg], \Bigg[ \alpha \cdot \sum_{l=0}^{N_{symb,all}^{PUSCH}-1} M_{sc}^{UCI}(l) \Bigg] \Bigg\}$$

Preferably in certain embodiments, $O_{ACK/inform}$ is the number of HARQ bits and information bits. Preferably, $L_{ACK}$ is the number of CRC bits. Preferably, $C_{UL-SCH}$ is the number of code blocks for UL-SCH of the PUSCH transmission. Preferably, $K_r$ is the r-th code block size for UL-SCH of the PUSCH transmission. Preferably, $$M_{sc}^{PUSCH}$$

is the scheduled bandwidth of the PUSCH transmission, expressed as a number of subcarriers. Preferably, $$M_{sc}^{UCI}(l)$$

is the number of resource elements that can be used for transmission of UCI in OFDM symbol l, for $$l = 0, 1, 2, \dots, N_{symb,all}^{PUSCH} - 1,$$

in the PUSCH transmission and $$N_{symb,all}^{PUSCH}$$

is the total number of OFDM symbols of the PUSCH, including all OFDM symbols used for DMRS. Preferably, $\alpha$ is configured by higher layer parameter scaling. Preferably, $l_0$ is the symbol index of the first OFDM symbol that does not carry DMRS of the PUSCH, after the first DMRS symbol(s), in the PUSCH transmission.

Preferably in certain embodiments, a number of coded symbols for HARQ and a number of coded symbols for information could be illustrated below:

$$Q'_{ACK} = \min \Bigg\{ \Bigg[ (O_{ACK} + L_{ACK}) \cdot \beta_{offset}^{PUSCH} \cdot$$

$$\sum_{l=0}^{N_{symb,all}^{PUSCH}-1} M_{sc}^{UCI}(l) / \sum_{R=0}^{C_{UL-SCH}-1} K_r \Bigg], \Bigg[ \alpha \cdot \sum_{l=0}^{N_{symb,all}^{PUSCH}-1} M_{sc}^{UCI}(l) \Bigg] \Bigg\}$$

$$Q'_{inform} = \min \Bigg\{ \Bigg[ (O_{inform} + L_{inform}) \cdot \beta_{offset}^{PUSCH} \cdot$$

$$\sum_{l=0}^{N_{symb,all}^{PUSCH}-1} M_{sc}^{UCI}(l) / \sum_{R=0}^{C_{UL-SCH}-1} K_r \Bigg], \Bigg[ \alpha \cdot \sum_{l=0}^{N_{symb,all}^{PUSCH}-1} M_{sc}^{UCI}(l) \Bigg] - Q'_{ACK} \Bigg\}$$

Preferably in certain embodiments, $O_{ACK}$ is the number of HARQ bits and $O_{inform}$ is the number of information bits. Preferably, $L_{ACK}$ is the number of CRC bits and $L_{inform}$ is the number of CRC bits.

Preferably in certain embodiments, beta offset $$\beta_{offset}^{PUSCH}$$

(above) for determining a number of coded symbols could be different or the same. Preferably in certain embodiments, a configuration for a beta offset for HARQ, information, and/or a UEI report could be based on a same configuration/value or based on a separate configuration/value.

Preferably in certain embodiments, when $Q'_{UEI}$ determined based on a number of payload sizes of a UEI report is larger than $$\Bigg[ \alpha \cdot \Big( \sum_{l=0}^{N_{symb,all}^{PUSCH}-1} M_{sc}^{UCI}(l) \Big) \Bigg] - Q'_{ACK} - Q'_{inform},$$

the UE prioritizes the UEI report with higher priority.

Preferably in certain embodiments, the priority could be based on any one or any combination of the following, or any order of combination of the following:

Report associated with an LTM event having higher priority than a report associated with a MIMO event, Lower ID/index of a report configuration having a higher priority than higher ones, Lower ID/index of a measured serving cell having a higher priority than higher ones, Event triggered report having higher priority than a non-event triggered report, and/or Report associated with RSRP/Signal-to-Interference-plus-Noise Ratio (SINR) being larger than a report associated with non-RSRP/non-SINR (e.g., CSI).

Preferably in certain embodiments, the UE transmits a prioritized one or more UEI reports on a UL resource. Preferably in certain embodiments, the UE determines the information (for indicating a number of the one or more UEI reports) based on the prioritized one or more UEI reports. Preferably in certain embodiments, the UE transmits the information along with the one or more UEI reports on the UL resource. Preferably in certain embodiments, if a third UEI report is deprioritized (due to capacity of the UL resource), the UE drops, withdraws, and/or ignores the third UEI report, and/or the UE cancels the event associated with the third UEI report, and/or the UE considers/keeps the event, associated with the third UEI report, being pending (and not cancelled). Preferably in certain embodiments, the UE determines whether to cancel the triggered event based on a timer/counter associated with the triggered event.

Various concepts, examples, and embodiments of the present invention are described below. For the methods, alternatives, concepts, examples, and embodiments detailed above and herein, the following aspects and embodiments are possible.

A UE-initiated beam reporting could be a CSI reporting. A UE-initiated beam reporting could be an event-driven beam reporting.

A UE-initiated beam reporting (procedure) of a Cell could contain measuring (Reference Signal (RS) on) the Cell. The UE-initiated beam reporting (procedure) of the Cell could contain determining a beam quality of the Cell fulfilled one or more events associated with (measurement objects of) the Cell (for a period of time). The UE-initiated beam reporting could contain triggering of a UE-initiated beam reporting when one or more events have been fulfilled for a period of time (alternatively, the UE could trigger a UE-initiated beam reporting (at once) when (condition of) one or more events have been fulfilled).

A measurement object associated with a UE-initiated beam reporting could be associated with a Cell and/or a Transmission Configuration Indicator (TCI) state or a beam associated with the Cell. The measurement object could be configured with or be associated with an event.

The UE-initiated beam reporting could be triggered or initiated in response to one or more condition(s) being met.

The one or more condition(s) could contain condition(s) associated with beam quality. For example, a condition could be quality of a (currently) activated beam being lower than or equal to a threshold. Additionally and/or alternatively, a condition could be quality of a candidate beam being higher than or equal to a threshold. The one or more conditions could be associated with or based on a measurement report triggering event.

Additionally and/or alternatively, the condition could contain a candidate beam quality being higher than or equal to a (currently) activated beam quality (for a period of time, e.g., timeToTrigger).

The UE-initiated beam reporting could contain determining whether to trigger the reporting based on at least a measured beam quality.

The condition could be associated with a (configured) event.

An event could be quality of a new (measured) beam of a Cell is a threshold value better than a current beam.

An event could be quality of a current beam is lower than a threshold.

An event could be quality of a new (measured) beam of a Cell is better than a threshold (+ an offest).

An event could be associated with an eventId in Event-TriggerConfig.

Preferably in certain embodiments, a current beam corresponds to an RS in an indicated TCI state which corresponds to QCL type-D.

Preferably in certain embodiments, current beam corresponds to SSB associated with RS in an indicated TCI state which corresponds to Quasi Co-location (QCL) type-D.

Preferably in certain embodiments, a current beam corresponds to an RS in an activated TCI state which corresponds to QCL type-D (with worst beam quality or best beam quality among more than one activated TCI states).

Preferably in certain embodiments, the more than one activated TCI state is activated by a TCI state (de)activation MAC CE.

Preferably in certain embodiments, an indicated TCI state or activated TCI corresponds to a Downlink (DL) or joint TCI state. The beam quality could include RSRP, Reference Signal Received Quality (RSRQ), Received Signal Strength Indicator (RSSI), and/or SINR associated with a beam.

A UE-initiated beam reporting could contain a trigger (of the reporting).

The UE-initiated beam reporting could contain triggering and/or transmitting an SR.

The UE-initiated beam reporting could contain initiating a random access procedure.

UE-initiated beam reporting could contain assembly of a beam report (e.g., the beam report could be MAC CE and/or Radio Resource Control (RRC) message and/or PUCCH signal).

The UE-initiated beam reporting could contain transmitting a beam report to a network.

The UE-initiated beam reporting could be initiated and/or configured for a Serving Cell. Additionally and/or alternatively, the UE-initiated beam reporting could be initiated and/or configured for a candidate cell or a non-Serving Cell.

The UE-initiated beam reporting could be an event-triggered L1 measurement reporting associated with LTM.

The UE-initiated beam reporting could contain cancelling a trigger of the beam reporting.

The UE-initiated beam reporting of a Cell could contain performing measurements for (BWP of) the Cell. The UE-initiated beam reporting could contain a trigger of the UE-initiated beam reporting. The UE-initiated beam reporting could contain generating and/or transmitting a UE-initiated beam report (associated with at least the Cell).

The UE could cancel the UE-initiated beam reporting in response to an initiation of the one or more procedures.

The UE could cancel the UE-initiated beam reporting in response to an acknowledgement of the beam report from the network. The acknowledgement could be a UL grant for new transmission associated with a HARQ process used to transmit the beam report. The acknowledgement could be a beam activation/deactivation MAC CE. Additionally and/or alternatively, the UE could cancel the UE-initiated beam reporting (associated with a Cell) in response to transmitting the corresponding UE-initiated beam report (reporting information associated with the Cell).

When cancelling or stopping a UE-initiated beam reporting, the UE could stop corresponding procedure(s) contained in the UE-initiated beam reporting (mentioned above).

When cancelling or stopping a UE-initiated beam reporting, the UE could stop or restart a timer for calculating or determining whether to trigger a UE-initiated beam reporting (e.g., a timeToTrigger-like timer).

The cancellation or stopping of the UE-initiated beam reporting could contain stopping the random access procedure. Additionally and/or alternatively, the cancellation or stopping of the UE-initiated beam reporting could contain stopping one or more timers associated with the UE-initiated beam reporting (e.g., timetotrigger for the beam reporting or timers associated with the random access procedures and/or associated with the SR).

The cancellation or stopping of the UE-initiated beam reporting of a Cell could contain not including or reporting (beam) information associated with the Cell in a UE-initiated beam report.

The cancellation or stopping of the UE-initiated beam reporting of a Cell could contain (re)starting or resetting or stopping a timer or a counter associated with UE-initiated beam reporting of the Cell.

The timer or the counter could be used or configured to trigger or prohibit the UE-initiated beam reporting of the Cell.

The UE could be configured with measurement object(s) associated with the UE-initiated beam reporting.

A measurement object could contain a Serving Cell and/or a non-serving cell.

A measurement object could be associated with a Synchronization Signal Block (SSB) and/or CSI-RS associated with the Serving Cell and/or the non-Serving Cell.

To prioritize a UE-initiated beam reporting over one or more procedures, the UE stops the procedure and continues the reporting.

To prioritize a first one or more procedures over a UE-initiated beam reporting, the UE stops/cancels the reporting and continues the one or more procedures.

The reporting and the first one or more procedures could be overlapped in time domain.

The reporting and the procedure could be associated with a same serving cell and/or a same MAC entity and/or a same Cell group (e.g., MCG or SCG).

The beams could be replaced by or referred to as SSB, CSI-RS, and/or (DL or UL) TCI states.

The Cell could be a Serving Cell, candidate cell, and/or a neighboring cell.

A candidate cell could be an LTM candidate Cell. A neighboring cell could be a cell associated with a measurement object. The candidate cell and the neighboring cell are not Serving Cells.

A UE-initiated beam report (generated in response to a UE-initiated beam reporting) could be a PUCCH signaling and/or a MAC CE and/or UCI on PUSCH. The UE-initiated beam report could indicate at least one of a measurement object associated with the UE-initiated beam reporting or the associated Cell.

For a prioritized transmission, the UE could perform the prioritized transmission via a valid resource. The valid resource could be a PUCCH resource or a PUSCH resource. The valid resource could be for UE-initiated beam reporting (for candidate cell and/or for Serving Cell).

The beam report transmission could be a UL transmission including transmission of the beam report. The beam report could be a report generated in response to a triggered beam reporting.

The first beam report could be associated with a first candidate cell or a first Serving Cell.

The second beam report could be associated with a second candidate cell or a second Serving Cell.

A beam report associated with a candidate cell could be associated with an MCG (e.g., associated with (quality of) a Serving Cell in MCG) or an SCG (e.g., associated with (quality of) a Serving Cell in SCG).

The first beam report could be associated with a first measurement object and/or a first triggering event associated with the first candidate cell or the first Serving Cell.

The first beam report could be associated with a second measurement object and/or a second triggering event associated with the second candidate cell or the second Serving Cell.

A beam could be associated with a CSI-RS resource and/or an SSB.

The beam quality could be RSRP, RSRQ, or RSSI.

Beam reporting/beam report for a candidate cell could be for (fast) LTM and/or for Cell switch.

Any combination of the above or herein concepts or teachings can be jointly combined, in whole or in part, or formed to a new embodiment, concept, or example.

Various examples and embodiments of the present invention are described below. For the methods, alternatives, concepts, examples, and embodiments detailed above and herein, the following aspects and embodiments are possible.

Referring to FIG. 9, with this and other concepts, systems, and methods of the present invention, a method 1000 for a UE in a wireless communication system comprises triggering a first beam reporting associated with a first cell (step 1002), triggering a second beam reporting associated with a second cell (step 1004), determining whether to prioritize the first beam reporting or the second beam reporting based on at least one of: the type of the first cell and/or the second cell, quality of a beam associated with the first cell, quality of a beam associated with the second cell, event(s) associated with triggering the first beam reporting, or event(s) associated with triggering the second beam reporting (step 1006).

In various embodiments, the type of the first cell is a Serving Cell.

In various embodiments, the type of the first cell is a candidate cell.

In various embodiments, the type of the second cell is a candidate cell.

In various embodiments, the UE prioritizes the first beam reporting over the second beam reporting based on the first cell being a Serving Cell.

In various embodiments, the UE prioritizes the first beam reporting over the second beam reporting based on the second cell being a candidate cell.

In various embodiments, the UE prioritizes the second beam reporting over the first beam reporting based on the first cell being a Serving Cell.

In various embodiments, the UE prioritizes the second beam reporting over the first beam reporting based on the second cell being a candidate cell.

In various embodiments, the UE prioritizes the first beam report if or when a first beam associated with the first cell has a quality higher than a threshold.

In various embodiments, the UE prioritizes the first beam report if or when a second beam associated with the second cell has a quality lower than a threshold.

In various embodiments, the UE prioritizes the first beam report if or when a first beam associated with the first cell has a quality lower than a threshold.

In various embodiments, the UE prioritizes the first beam report if or when a second beam associated with the second cell has a quality higher than a threshold.

In various embodiments, the quality is L1-RSRP.

In various embodiments, the first beam is a current beam or a currently activated beam of the first cell. The second beam is a current beam or a currently activated beam of the second cell.

In various embodiments, the first beam is a new beam of the first cell. The second beam is a new beam of the second cell.

In various embodiments, the new beam is a candidate beam of the cell(s) for L1 measurements.

In various embodiments, the UE prioritizes the first beam report over the second beam report if or when the first beam report is triggered in response to one of: quality of a new beam of the first cell or of a Serving Cell is a threshold value better than a current beam of the first cell, quality of the current beam is worse than a certain threshold, quality of a new beam is better than a certain threshold, quality of the current beam is worse than a first threshold, and quality of at least one new beam is better than a second threshold.

In various embodiments, the UE transmits a first beam report on a UL resource if or when the first beam reporting is a prioritized beam reporting.

In various embodiments, the UE does not transmit a second beam report of the second beam reporting if or when the second beam reporting is de-prioritized.

In various embodiments, the UL resource is a PUCCH resource or a PUSCH resource.

Referring back to FIGS. 3 and 4, in one or more embodiments from the perspective of a UE in a wireless communication system, the device 300 includes a program code 312 stored in memory 310 of the transmitter. The CPU 308 could execute program code 312 to: (i) trigger a first beam reporting associated with a first cell; (ii) trigger a second beam reporting associated with a second cell; and (iii) determine whether to prioritize the first beam reporting or the second beam reporting based on at least one of: the type of the first cell and/or the second cell, quality of a beam associated with the first cell, quality of a beam associated with the second cell, event(s) associated with triggering the first beam reporting, or event(s) associated with triggering the second beam reporting. Moreover, the CPU 308 can execute the program code 312 to perform all of the described actions, steps, and methods described above, below, or otherwise herein.

In NR Rel-19, phase 5 MIMO enhancement aims on UE-initiated (UEI) report for beam management. According to the current RAN1 progress, at least event-1, event-2, event-3, and event-4 could be considered. A network node could configure a UE with one or more events. One serving cell or neighboring cell could be configured with one or more events. That is in response to condition of the event-1 is satisfied, the UE will trigger to transmit a UE-initiated report and/or the UE will transmit a UE-initiated report. Based on a UE-initiated report received by a network node, the network node will indicate the UE to change the indicated/activated/configured beam (e.g., TCI state). Typically, content of the UE-initiated report comprises a resource indicator associated with a resource (for indicating a beam or TCI state), and/or a matrix/quality associated with the indicated resource, and/or the current beam's quality is worse than a threshold. Depending on a different event-1, same or different content will be designed.

Regarding the container carrying the UE-initiated report, basically MAC CE or UCI could be considered. MAC CE may have latency due to the need of a UL grant for transmitting the MAC CE. On the other hand, UCI may require a network node to configure a plurality of periodic UL resources for transmission, however, only part of them will be used by a UE for transmitting a UE-initiated report (i.e., when a condition of event is met). In order to solve this issue, a PN could be used to indicate at least usage of future one or more periodic UL resources associated with the UE-initiated report. Depending on whether to transmit the UE-initiated report on a periodic UL resource or whether to trigger the UE-initiated report or whether there is a pending UE-initiated report, the UE determines whether to transmit the PN and/or sets of PNs to indicate usage of a periodic UL resource. In one example, when a UE-initiated report is not triggered or the UE will not transmit the UE-initiated report using a periodic UL resource or there is not a pending UE-initiated report, the UE could skip transmitting the PN and/or the UE does not use the periodic UL resource. Typically, one PN could be a sequence-based signal to indicate usage of future one or more periodic UL resources. In one example the sequence-based signal could be a Sounding Reference Signal (SRS) or SR or PUCCH format 0 with different cyclic shift mapping to "used" or "not used" in an example. If there is need to carry more information in addition to used/not used, PUCCH format 0 with more cyclic shift or other PUCCH format (e.g., PUCCH format 1, 2, 3, or 4) could be considered. Although PN could be transmitted along with a UL resource for a UE-initiated report similar to CG-UCI on PUSCH, which the CG-UCI indicates usage of a future CG PUSCH resource, it may not be useful due to the triggering is more dynamic than a periodic manner. PN could be considered to be transmitted along with a same Transmission Time Interval (TTI) as a UL resource. PN could be transmitted in different Orthogonal Frequency-Division Multiplexing (OFDM) symbols as a UL resource. A set of contiguous OFDM symbols in a TTI could be used as a PN area for carrying the PN (e.g., 1-st and/or 2-nd symbol in a TTI (e.g., symbol 0 and symbol 1 in a slot)). The PN area may be shared to a plurality of UEs. Alternatively, the PN area could be dedicated to a UE.

Alternatively, one or more PNs are dedicated to the UE. Alternatively, a second one or more PNs is common to the UE. Typically, in order to have better resource efficiency in a network node, a time gap or limitation between PN and the corresponding UL resource needs to be adopted. The time gap or limitation is used to guarantee that a network node has enough time for switching and/or for other usage.

With introduction of a UEI report, there are two modes for resource allocation for the UEI report. Mode A (or mode-A) corresponds to dynamic scheduling while mode B (or mode-B) corresponds to (pre-)configured resources for transmitting the UEI report.

For mode A (or mode-A), the UE will transmit a scheduling request to a network node. After the transmission of the scheduling request, the UE monitors DCI with scheduling information (and/or with request for a pending UEI report). The UE transmits the UEI report on the resource scheduled by the DCI. In one example, as shown in FIG. 10, t1 corresponds to a timing that the UE determines that condition of an event is satisfied or reached. t2 corresponds to a timing that the UE transmits a request to a network node for requesting a UL resource. Typically, a UL channel for the request corresponds to or is PUCCH. Preferably in certain embodiments, the UL channel (in timing t2) may correspond to PUCCH format 0 or PUCCH format 1 or an SR. t3 corresponds to a timing that the UE receives a DCI scheduling a UL resource (or a plurality of UL resources). The UL resource corresponds to at least timing t4. The UL resource could be PUCCH or PUSCH. A UEI report could be considered as UCI associated with a CSI report. Preferably in certain embodiments, the DCI received in t3 may request a UE to transmit one or a plurality of CSI reports to be transmitted in timing t4. Thus, a UEI report may have a UL resource and the UE could transmit the UEI report.

For mode B (or mode-B), one PN would be used to notify usage of (pre-)configured resources which could enhance resource efficiency when deploying more (pre-)configured resources for latency reduction. Typically, a PN resource and a (pre-)configured resource are configured in different instances/timings/TTIs. Alternatively, a PN resource and a (pre-)configured resource are configured in the same instance/timing/TTI. Once condition of an event is fulfilled, the UE triggers the event and/or the UE triggers to transmit a UEI report. In one example, as shown in FIG. 10, t1 corresponds to a timing that the UE determines that condition of an event is satisfied or reached. t2 corresponds to a timing that the UE transmits a notification to a network node for notifying usage of a UL resource (i.e., UL resource in t3). Typically, a UL channel for the request corresponds to or is PUCCH. Preferably in certain embodiments, a UL channel (in timing t2) may correspond to PUCCH format 0 or PUCCH format 1 or an SR. The UL resource in timing t3 is (pre-)configured. The UE uses the UL resource if the UE has a pending UEI report or triggered (and not cancelled) event.

Before the UE transmits the UEI report, the UEI report is pending. Before the UE cancels the triggering of the event, the UEI report is pending. Before the UE receives a response from network node, the UEI report is pending. Before the end of a latency bound of the event, the UEI report is pending.

For a pending UEI report, for mode A, the UE will determine or select a valid resource. The UE will transmit a scheduling request for the pending UEI report on the determined/selected resource. The UE will monitor DCI with scheduling information (and/or with request for the pending UEI report). The DCI could indicate the request is used for requesting a UEI report or a network node triggered report.

One code-point in a bit field could be used to indicate whether the request is used for requesting a UEI report or a network node triggered report. The bit field could be a CSI request. Based on the code-point of the bit field, the UE could determine whether the DCI requests for a network node triggered report or a UEI report. If the UE has pending more than one UEI report, once the UE receives the DCI, the UE determines one UEI report among the more than one UEI report. Alternatively, the UE could multiplex the more than one UEI report (if resource scheduled by the DCI with an accommodate code rate could accommodate the more than one UEI report).

For a pending UEI report, for mode B, the UE will determine or select a valid PN resource and/or valid (pre-) configured resource for transmitting the UEI report. The UE will transmit the PN on the determined/selected PN resource and transmit the pending UEI report on the determined/selected (pre-)configured resource.

As lower layer event triggered reports are introduced by Rel-19 MIMO and mobility (e.g., LTM) item. Insofar, Rel-19 MIMO has agreed to support one event (i.e., event-2) and Rel-19 mobility has agreed to support more than one event (i.e., Event LTM2, Event LTM3, Event LTM4, and Event LTM5). It may face an issue of how/whether a UE is to handle more than one triggered event. In one example, how a UE determines a mode for event(s) introduced by MIMO and mode for event(s) introduced by LTM. In another example, it isa also not clear whether/how a UE can simultaneously trigger more than one event, whether/how a UE can maintain more than one event, whether/how a UE multiplexes more than one report in a UL resource, whether/how a different event can share the same UL resource for the carrying report. Preferably in certain embodiments, how a network node differentiates a number of UEI reports is associated with MIMO or LTM. Preferably in certain embodiments, how a network node identifies and/or determines a UE requesting a UL resource for one or more UEI report. Given with these aspects, it is necessary to design a detailed framework properly for implementation.

Concept 0

Collision between UE-initiated beam reporting for MIMO and UE-initiated beam reporting for LTM.

Whether pre-configured (periodic) resources for UE-initiated beam reporting for MIMO could be shared for UE-initiated beam reporting for LTM, e.g. in a collision case or non-collision case.

Single set of pre-configured (periodic) resources for both reports.

Same or different resources for one-bit PUCCH indication.

Indication(s) for a receiver to determine whether the content is for MIMO, for LTM, or both.

A set of pre-configured (periodic) resources for UE-initiated beam reporting for MIMO and another set of pre-configured (periodic) resources for UE-initiated beam reporting for LTM.

A set of pre-configured (periodic) resources for UE-initiated beam reporting for MIMO and no pre-configured (periodic) resources for UE-initiated beam reporting for LTM. A UE could maintain or be configured with (receives configuration for configuring) a plurality of events. When condition of one event or each event is reached or satisfied, the one event is triggered (and remains pending until being cancelled).

When an event is triggered (and not cancelled), the UE (attempts to) transmit a UEI report associated with the event.

Preferably in certain embodiments, the plurality of events comprises any one or any combination of:

One or more LTM events,

One or more MIMO events,

One MIMO event and one LTM event,

One MIMO event and more than one LTM event,

One LTM event and more than one MIMO event,

Only one LTM event,

Only one MIMO event, and/or

Either LTM event(s) or MIMO event(s) among the plurality of events.

Preferably in certain embodiments, the LTM event(s) and the MIMO event(s) are associated with the same cell group, e.g., MCG or SCG.

Preferably in certain embodiments, the LTM event(s) and the MIMO event(s) are associated with the same PUCCH cell group (e.g., UEI report(s) associated with the LTM event(s) and MIMO event(s) are transmitted on the same serving cell which preferably comprises PUCCH configuration). Preferably in certain embodiments, the LTM event(s) and the MIMO event(s) are associated with the same serving cell(s), e.g., PCell or PSCell.

A UEI report triggered by the LTM event(s) is carried by an L2 signal (e.g., MAC CE) and a UEI report triggered by the MIMO event(s) is carried by an L2 signal (e.g., MAC CE).

Preferably in certain embodiments, signal(s) of different layers are used to carry a UEI report triggered by the LTM event(s) and a UEI report triggered by the MIMO event(s). Preferably in certain embodiments, a UEI report triggered by the LTM event(s) is carried by an L1 signal (e.g., UCI) and a UEI report triggered by the MIMO event(s) is carried by an L2 signal (e.g., MAC CE). Alternatively, a UEI report triggered by the LTM event(s) is carried by an L2 signal (e.g., MAC CE) and a UEI report triggered by the MIMO event(s) is carried by an L1 signal (e.g., UCI).

Preferably in certain embodiments, the UE could be configured with the same serving cell (e.g., SpCell or PUCCH SCell) for transmitting a request or pre-notification in step 1 for an LTM event and for a MIMO event. Alternatively, the UE could be configured with different serving cell(s) for transmitting the request or pre-notification in step 1 for the LTM event and for the MIMO event. For example, the UE transmits a first request or pre-notification in step 1 for a first UEI report triggered by an LTM event(s) in a first serving cell of the UE and the UE transmits a second request or pre-notification in step 1 for a second UEI report triggered by a MIMO event(s) in a second serving cell of the UE.

Preferably in certain embodiments, for resource (to be used) in step-1 in mode-A or mode-B, any one or any combination of the following can occur:

LTM event and MIMO event are associated with a same set of PUCCH resources,

LTM event and MIMO event are associated with a different set of PUCCH resources, Preferably in certain embodiments, at least a first PUCCH resource in a first set of PUCCH resources (for MIMO event) could be Time Division Multiplexed (TDMed) in a different symbol or slot than at least a second PUCCH resource in a second set of PUCCH resources (for LTM event), Preferably in certain embodiments, the first PUCCH resource and the second PUCCH resource are non-overlapped in time domain.

Preferably in certain embodiments, at least a first PUCCH resource in a first set of PUCCH resource (for MIMO event) could be Frequency Domain Multiplexed (FDMed) in different Physical Resource Blocks (PRBs) (or frequency units) than at least a second PUCCH resource in a second set of PUCCH resources (for LTM event).

Preferably in certain embodiments, the first PUCCH resource and the second PUCCH resource are non-overlapped in frequency domain (even if both the first set of PUCCH resources and the second set of PUCCH resources are configured in a same serving cell). The first PUCCH resource and the second PUCCH resource may be or may not be overlapped in time domain.

A plurality of MIMO events is associated with a same set of PUCCH resources (e.g., a first set of PUCCH resources), A plurality of LTM events is associated with a same set of PUCCH resources (e.g., a second set of PUCCH resources), A third set of PUCCH resources is associated with both an LTM event and MIMO event (only being used when the UE has a pending or triggered of both an LTM event and MIMO event), and/or A fourth set of PUCCH resources is associated with both an LTM event and MIMO event (being used when at least one event among the plurality of events is triggered). Preferably in certain embodiments, the fourth set of PUCCH resources is used to indicate information described below.

Preferably in certain embodiments, a first PUCCH resource or a second PUCCH resource or a third PUCCH resource is the latest or most recent candidate PUCCH resource (for transmitting a request or pre-notification in step-1 in mode-A or mode-B, respectively) since/after the MIMO event is triggered and/or the LTM event is triggered.

Preferably in certain embodiments, a configuration for resources in step-1 in mode-A or mode-B could be any one or any combination of the following:

(Separated) LTM event(s) and MIMO event(s) are associated with a respective second configuration (e.g., a second SR configuration) and a first configuration (e.g., a first SR configuration), and the first configuration provides a first set of PUCCH resources (e.g., periodic PUCCH resource) and the second configuration provides a second set of PUCCH resources (e.g., periodic PUCCH resource), (Separated) LTM event(s) and MIMO event(s) are associated with a respective second sub-configuration and a first sub-configuration and preferably both the first sub-configuration and the second sub-configuration are associated with one configuration (e.g., one SR configuration). Preferably in certain embodiments, the first sub-configuration provides a first set of PUCCH resources (e.g., periodic PUCCH resource) and the second sub-configuration provides a second set of PUCCH resources (e.g., periodic PUCCH resource). Preferably in certain embodiments, implicit mapping between a PUCCH resource to either the first sub-configuration or the second sub-configuration could be based on cyclic or sequent mapping of a PUCCH occasion (e.g., first, first, second, second, and so on . . . , or first, second, first, second and so on . . . ), and/or (Separated) both LTM event(s) and MIMO event(s) are associated with one configuration (e.g., one SR configuration), and the one configuration provides different sets of PUCCH resources (e.g., periodic PUCCH resource) for LTM event(s) and MIMO event(s), respectively. Preferably in certain embodiments, explicit mapping could be a first parameter of two parameters indicating a first set of PUCCH resources to be associated with MIMO event(s) and a second parameter of two parameters indicating a second set of PUCCH resources to be associated with LTM event(s). Preferably and/or alternatively, implicit mapping between a PUCCH resource to either the MIMO event(s) or the LTM event(s) could be based on cyclic or sequent mapping of a PUCCH occasion (e.g., MIMO, MIMO, LTM, LTM, and so on . . . , or MIMO, LTM, MIMO, LTM and so on . . . ).

Preferably in certain embodiments, the one configuration may comprise at least the two parameters. Preferably in certain embodiments, the two parameters correspond to a PUCCH resource ID. Preferably in certain embodiments, the two parameters indicate two sets of PUCCH resources. Preferably in certain embodiments, each set of PUCCH resources is associated with one same PUCCH resource ID.

Preferably in certain embodiments, the first set of PUCCH resources and the second set of PUCCH resources are configured with a same periodicity. Preferably in certain embodiments, the first set of PUCCH resources and the second set of PUCCH resources are configured with different periodicity. Preferably in certain embodiments, the first set of PUCCH resources and the second set of PUCCH resources are configured with different subframe/slot/TTI offset.

Preferably in certain embodiments, based on a pending event corresponding to an LTM event(s) and/or MIMO event(s), the UE could determine one of the following for transmitting a request or pre-notification in step-1 in mode-A or mode-B:

If only a MIMO event(s) (and/or no LTM event) is triggered (and not cancelled), a PUCCH resource is determined from the same set of PUCCH resources (associated with both the LTM event and MIMO event), If only an LTM event(s) (and/or no MIMO event) is triggered (and not cancelled), a PUCCH resource is determined from the same set of PUCCH resources (associated with both the LTM event and MIMO event), If both LTM event(s) and MIMO event(s) are triggered (and not cancelled), a PUCCH resource is determined from the same set of PUCCH resources (associated with both the LTM event and MIMO event), If only a MIMO event(s) (and/or no LTM event) is triggered (and not cancelled), a first PUCCH resource is determined from the first set of PUCCH resources, If only an LTM event(s) (and/or no MIMO event) is triggered (and not cancelled), a second PUCCH resource is determined from the second set of PUCCH resources, and/or If both LTM event(s) and MIMO event(s) are triggered (and not cancelled), a PUCCH resource is determined from the third set of PUCCH resources (associated with both the LTM event and MIMO event).

Preferably in certain embodiments, if a first LTM event and a second LTM event are triggered (and not cancelled), the UE determines a PUCCH resource associated with the LTM event. Preferably in certain embodiments, if a first LTM event and a second MIMO event are triggered (and not cancelled), the UE determines a PUCCH resource among the same set of PUCCH resources or among the third set of PUCCH resources or among the fourth set of PUCCH resources. Alternatively, if a first LTM event and a second MIMO event are triggered (and not cancelled), the UE determines a first PUCCH resource and a second PUCCH resource.

Preferably in certain embodiments, based on the above design, the UE transmits one or more PUCCH resources for a request or pre-notification in step-1 in mode-A or mode-B.

Preferably in certain embodiments, in step-2 in mode-A, the UE receives one or more DCIs from a network node indicating PUSCH (or PUCCH) for transmitting one or more UEI reports.

Preferably in certain embodiments, one MIMO event among MIMO event(s) corresponds to one serving cell (e.g., could be only a primary cell or could be any of a serving cell including a secondary cell and a primary cell), and one event type (e.g., event-1, event-2, event-3, event-4, event-5, event-6, event-7a, event-7b, event-8, event-9). Preferably in certain embodiments, a different serving cell or different event type may correspond to a different MIMO event.

Preferably in certain embodiments, one LTM event among LTM event(s) corresponds to one primary cell (in a cell group), and one event type (e.g., event LTM1, event LTM2, event LTM3, event LTM4, event LTM5). Preferably in certain embodiments, a different primary cell or a different event type may correspond to a different LTM event.

Preferably in certain embodiments, one event among the plurality of events corresponds to one serving cell, and one event type (e.g., event-1, event-2, event-3, event-4, event-5, event-6, event-7a, event-7b, event-8, event-9, event LTM1, event LTM2, event LTM3, event LTM4, event LTM5).

Preferably in certain embodiments, for intra-MIMO event(s), one code-point of the specific field or one trigger state corresponds to all MIMO event(s).

Preferably in certain embodiments, a configuration for resources in step-2 in mode-B could be any one or any combination of the following:

(Separated) LTM event(s) and MIMO event(s) are associated with a respective second configuration and a first configuration, and the first configuration provides a first set of resources (e.g., periodic resource) and the second configuration provides a second set of resources (e.g., periodic resource). The first set of resources and the second set of resources are for the same channel, e.g., PUCCH or PUSCH. The first set of resources and the second set of resources cannot be for different channels. Alternatively, the first set of resources and the second set of resources can be for different channels, e.g., one for PUCCH and another one for PUSCH, (Separated) LTM event(s) and MIMO event(s) are associated with a respective second sub-configuration and a first sub-configuration and preferably both the first sub-configuration and the second sub-configuration are associated with one configuration. Preferably in certain embodiments, the first sub-configuration provides a first set of resources (e.g., periodic resource) and the second sub-configuration provides a second set of resources (e.g., periodic resource). Preferably in certain embodiments, implicit mapping between a resource to either the first sub-configuration or the second sub-configuration could be based on cyclic or sequent mapping of a resource occasion (e.g., first, first, second, second, and so on . . . , or first, second, first, second and so on . . . ). The first set of resources and the second set of resources are for the same channel, e.g., PUCCH or PUSCH. The first set of resources and the second set of resources cannot be for different channels, and/or (Separated) both LTM event(s) and MIMO event(s) are associated with one configuration, and the one configuration provides different sets of resources (e.g., periodic resource) for LTM event(s) and MIMO event(s), respectively. Preferably in certain embodiments, explicit mapping could be a first parameter of two parameters indicating a first set of resources to be associated with MIMO event(s) and a second parameter of two parameters indicating a second set of resources to be associated with LTM event(s). Preferably or alternatively, implicit mapping between a resource to either the MIMO event(s) or the LTM event(s) could be based on cyclic or sequent mapping of a resource occasion (e.g., MIMO, MIMO, LTM, LTM, and so on . . . , or MIMO, LTM, MIMO, LTM and so on . . . ). The first set of resources and the second set of resources are for the same channel, e.g., PUCCH or PUSCH. The first set of resources and the second set of resources cannot be for different channels.

Preferably in certain embodiments, the one configuration may comprise at least the two parameters. Preferably in certain embodiments, the two parameters correspond to a resource ID. Preferably in certain embodiments, the two parameters indicate two sets of resources. Preferably in certain embodiments, each set of resources is associated with one same resource ID.

Preferably in certain embodiments, for mode-A, the UE expects to be scheduled with different UL resources (e.g., PUSCH or PUCCH) for a transmitted report associated with a MIMO event and a report associated with an LTM event. Preferably in certain embodiments, the UE does not expect to multiplex a report associated with at least one MIMO event and a report associated with at least one LTM event on a UL resource. Preferably in certain embodiments, the UE does not expect to be configured with each/one trigger state or each/one code-point of the specific field being associated with a mixed report configuration associated with an event and without an event. Preferably in certain embodiments, the UE expects to be configured with each/one trigger state or each/one code-point of the specific field being associated with a report configuration associated with an event or a report configuration without an event. Preferably in certain embodiments, at least one code-point of the specific field indicates no request for a report (configuration) associated with an event. Preferably in certain embodiments, the specific field is the same or a different bit field than a CSI request field.

Preferably in certain embodiments, the UE could be configured with or be scheduled with a same serving cell (e.g., SPCell or PUCCH SCell) for transmitting UEI report associated with LTM event and UEI report associated with MIMO event. Alternatively, the UE could be configured with or be scheduled with different serving cell for transmitting UEI report associated with LTM event and UEI report associated with MIMO event.

Preferably in certain embodiments, for mode-B, the UE expects a same attribute of a UL resource for step-1 and step-2. Preferably in certain embodiments, a PUCCH resource for transmitting a pre-notification and a UL resource for transmitting a UEI report are associated with a same attribute. In one example, if a PUCCH resource in step-1 is per event or per MIMO event or per LTM event, the UL resource in step-2 is per event or per MIMO event or per LTM event, respectively. Preferably in certain embodiments, the rationale is to have one-to-one mapping between the PUCCH resource and the UL resource or to have one-to-many mapping between the PUCCH resource and the UL resource in a given attribute (e.g., for MIMO event or for an event or for LTM event). Preferably in certain embodiments, when a MIMO event is triggered, the UE transmits a pre-notification on PUCCH associated with the MIMO event (e.g., the one PUCCH reveals the MIMO event) and transmitting the UEI report on the UL resource associated with the MIMO event. Preferably in certain embodiments, when an LTM event is triggered, the UE transmits a pre-notification on PUCCH associated with the LTM event (e.g., the one PUCCH reveals the LTM event) and transmitting the UEI report on the UL resource associated with the LTM event. Alternatively, for mode-B, a PUCCH resource for a PN and a UL resource for a UEI report will have different attributes. A PUCCH resource for PN is shared by an LTM event and MIMO event. One PUCCH resource for the PN indicates usage of one UL resource for the UEI report. Alternatively, one PUCCH resource for the PN indicates usage of more than one UL resource for the UEI report. Preferably in certain embodiments, based on a configuration, the UE will determine or identify that one PUCCH resource for the PN indicating usage of one or more than one UL resource for the UEI report.

No matter if an LTM event or MIMO event is triggered, the UE transmits a PUCCH resource for the PN (e.g., the PUCCH resource does not reveal to the LTM event or MIMO event). Differentiation between the LTM event and MIMO event will be indicated by the UE in the UL resource for transmitting the UEI report.

Preferably in certain embodiments, based on a PUCCH resource for the PN (and/or UL resource for the UEI report) in mode-B is associated with the LTM or MIMO, the UE could transmit the information associated with the LTM or MIMO.

Throughout the present disclosure, a MIMO or MIMO event or report configuration associated with a MIMO (event) could be replaced by a first event type. Preferably in certain embodiments, the first event type may associate with one or more event(s) with a same/different trigger condition. Preferably in certain embodiments, the first event type may associate with one or more event(s) with a same/different serving cell.

Throughout the present disclosure, an LTM or LTM event or report configuration associated with an LTM (event) could be replaced by a second event type. Preferably in certain embodiments, the second event type may associate with one or more event(s) with a same/different trigger condition. Preferably in certain embodiments, the second event type may associate with one or more event(s) with a same/different serving cell and/or a same/different candidate cell.

Throughout the present disclosure, payload size of a report associated with a different event could be the same or different.

Throughout the present disclosure, payload size of a report could be configured, and payload size of a report associated with a different event is the same (with truncation or padding zeros).

Preferably in certain embodiments, an event ID (space) for a MIMO event and for an LTM event is unique. Alternatively, event ID (space) for a MIMO event and for an LTM event could be reused.

Preferably in certain embodiments, payload size of the special field (or the special UCI) is based on a number of a plurality of events. Preferably in certain embodiments, payload size of the special field (or the special UCI) is based on a configuration from a network node.

Preferably in certain embodiments, one UEI report associated with one event (no matter the LTM event or MIMO event) may comprise any one or any combination of the following information:
ID/index of RS associated with a current beam,
L1-RSRP associated with a current beam (e.g., x bits with quantized level or y bits with differential quantized level, value of x is larger than value of y),
ID/index of one or more RS(s) associated with a candidate beam(s) (which is satisfying a condition of an event), and/or
L1-RSRP associated with one or more candidate beams (e.g., x bits with quantized level or y bits with differential quantized level, value of x is larger than value of y).

Preferably in certain embodiments, the one or more candidate beams are associated with an event. Preferably in certain embodiments, the UE could be configured with one or more candidate beams per event. Preferably in certain embodiments, the UE could be configured with one or more candidate beams per serving cell/BWP per event.

Preferably in certain embodiments, based on a same serving cell with one or more triggered (and not cancelled) event(s), if the UE can accommodate one or more reports associated with the one or more triggered event(s), the UE could perform signaling overhead enhancement to avoid reporting duplicated information. Preferably in certain embodiments, when a first UEI report (associated with a first event) and a second UEI report (associated with a second event) are associated with a same serving cell or when both a first UEI report (associated with a first event) and a second UEI report (associated with a second event) comprise a same current beam's information (e.g., ID/index of RS associated with current beam and/or L1-RSRP associated with current beam, and/or both the current beam associated with two events corresponds to the same RS associated with an indicated TCI state and/or both a current beam associated with two events corresponds to a same RS associated with an activated TCI state), the UE reports information of the current beam once (rather than reporting both UEI reports which each comprise information of the current beam). Preferably in certain embodiments, when a third event and a fourth event are associated with a different cell, or a current beam associated with a third event is different than a current beam associated with a fourth event, the UE reports information of the current beam for a third UEI report and a fourth UEI report, respectively. Preferably in certain embodiments, when an indicated TCI state has a best or worst quality among an activated TCI state, the current beam may be the same for more than one event. Preferably in certain embodiments, an LTM event's current beam may be the same as a MIMO event's current beam. Preferably in certain embodiments, when the UE is configured with more than one LTM event associated with one serving cell (e.g., event LTM2, event LTM3, event LTM5), if the UE (attempts to) transmits more than one UEI report associated with the more than one LTM event, the UE may report information of the current beam once (rather than report information of the current beam per report).

Preferably in certain embodiments, the UE may be configured by a network node whether to perform signaling overhead enhancement to avoid reporting duplicated information. Preferably in certain embodiments, when the UE is configured to report information of a current beam once (for avoiding duplication), the UE transmits information of the current beam once (in one reporting instance). Preferably in certain embodiments, when the UE is not configured to report information of the current beam once (for avoiding duplication), the UE transmits information of the current beam per report.

Preferably in certain embodiments, information of the current beam could be replaced by the same information which is shared/indicated by more than one event.

Preferably in certain embodiments, when the UE transmits more than one report associated with more than one (triggered) event (at least comprising a first event and a second event associated with the same information or same serving cell) or when the UE transmits information of a current beam once, the UE transmits one or more indications to the network node. Preferably in certain embodiments, the one or more indications could be per serving cell. Preferably in certain embodiments, once the UE is configured to perform signaling overhead enhancement to avoid reporting duplicated information, the UE (needs to) transmit one or more indications to the network node. Preferably in certain embodiments, even if/when there is only one report associated with one triggered event, if configured with this mechanism, the UE (needs to) transmit one or more indications to the network node. Preferably in certain embodiments, the configuration (for signaling overhead enhancement to avoid reporting duplicated information) is based on a parameter.

Preferably in certain embodiments, throughout the present disclosure, for DCI indicating UL resource for transmitting a UEI report, such a UEI report does not correspond to a network node triggered report. Alternatively, when a DCI indicating a UL resource for transmitting the UEI report, such a UEI report corresponds to the network node triggered report. Preferably in certain embodiments, the network node triggered report corresponds to a configuration without associated with an event (no matter if LTM event or MIMO event).

Preferably in certain embodiments, the UE transmits prioritized one or more UEI reports on a UL resource. Preferably in certain embodiments, the UE determines the information (for indicating a number of the one or more UEI reports) based on the prioritized one or more UEI reports. Preferably in certain embodiments, the UE transmits the information along with the one or more UEI reports on the UL resource. Preferably in certain embodiments, if a third UEI report is deprioritized (due to capacity of the UL resource), the UE drops, withdraws, and/or ignores the third UEI report, and/or the UE cancels the event associated with the third UEI report, and/or the UE considers/keeps the event, associated with the third UEI report, being pending (and not cancelled). Preferably in certain embodiments, the UE determines whether to cancel the triggered event based on a timer/counter associated with the triggered event.

Preferably in certain embodiments, if the UE is configured with mode-A, the UE could be configured with a shared PUCCH resource for requesting both the LTM event and MIMO event.

Preferably in certain embodiments, if the UE is configured with mode-B, the UE could be configured with a separate PUCCH resource for the PN for the LTM event and MIMO event, respectively.

Preferably in certain embodiments, if the UE is configured with mode-A, the UE could be configured with a separate PUCCH resource for request of the LTM event and MIMO event, respectively.

Preferably in certain embodiments, if the UE is configured with mode-B, the UE could be configured with a shared PUCCH resource for the PN for both the LTM event and MIMO event.

Referring to FIG. 11, with this and other concepts, systems, and methods of the present invention, a method 1010 for a UE in a wireless communication system comprises maintaining or receiving a configuration associated with one or more UE triggered events, wherein the one or more UE triggered events comprise a first event and a second event (step 1012), triggering one event (of the one or more UE triggered events) in response to a condition of the one event is fulfilled (step 1014), receiving a first configuration (or a first parameter) for configuring a first set of resources for a first (UE triggered) report, a first request, and/or a first pre-notification, associated with the first event (step 1016), preferably in certain embodiments, receiving a second configuration (or a second parameter) for configuring a second set of resources for a second (UE triggered) report, a second request, and/or a second pre-notification, associated with the second event, or the first configuration (or the first parameter) also configures a second set of resources for a second (UE triggered) report, a second request, and/or a second pre-notification, associated with the second event (1018), and based on the one event corresponding to the first event or the second event, the UE transmits a report/request/PN on a corresponding resource (step 1020).

Preferably in certain embodiments, the one or more UE triggered events comprise a first kind/type of an event comprising the first event, and/or the first kind/type of the event is configured with the first set of resources, and/or when one of the first kind/type of events is triggered (and/or the UE would transmit the report/request/PN associated with the event among the first kind/type of events), the UE transmits on a resource among the first set of resources, and/or the first set of resources are per kind/type of event.

Preferably in certain embodiments, the one or more UE triggered events comprise a second kind/type of event comprising the second event, and/or the second kind/type of event is configured with the second set of resources, and/or when one of the second kind/type of events is triggered (and/or the UE would transmit a report/request/PN associated with an event among the second kind/type of events), the UE transmits on a resource among the second set of resources, and/or the second set of resources is per kind/type of event.

Preferably in certain embodiments, the first set of resources is configured per UE.

Preferably in certain embodiments, the first set of resources and the second set of resources are configured in a same or different serving cell.

Preferably in certain embodiments, the first set of resources and the second set of resources are configured in a same or different BWP.

Preferably in certain embodiments, the first event (or the first type/kind of event) is associated with a MIMO event.

Preferably in certain embodiments, the second event (or the second type/kind of event) is associated with an LTM event.

Preferably in certain embodiments, the MIMO event corresponds to a quality comparison between the same serving cell's beam quality.

Preferably in certain embodiments, the LTM event corresponds to a quality comparison between the serving cell and candidate cell's beam quality.

Preferably in certain embodiments, the beam quality corresponds to an L1-RSRP measurement.

Preferably in certain embodiments, one shot L1-RSRP measurement or multi-shots L1-RSRP measurement are used for determining whether a condition of the one event is satisfied.

Preferably in certain embodiments, if the one event corresponds to a MIMO event, the UE transmits the report/request/PN (associated with the one event) on a resource among the first set of resources.

Preferably in certain embodiments, if the one event corresponds to an LTM event, the UE transmits the report/request/PN (associated with the one event) on a resource among the second set of resource.

Preferably in certain embodiments, no matter whether the one event corresponds to a MIMO event or LTM event, the UE transmits the report/request/PN (associated with the one event) on a resource among the first set of resources.

Preferably in certain embodiments, the UE does not simultaneously trigger one event from a first kind/type of events and another event from a second kind/type of events, and/or when the UE triggers one event from the first kind/type of events, the UE does not trigger another event from the second kind/type of events, and/or when the UE triggers one event from the first kind/type of events, the UE does not trigger a second event from the first kind/type of events (the UE could trigger a third event from the second kind/type of events).

Preferably in certain embodiments, the first set of resources are separated from the second set of resources.

Preferably in certain embodiments, (each of resource in) the first set of resources are configured with a different slot offset to be in a different slot.

Preferably in certain embodiments, (each of resource in) the first set of resources are configured with a different starting symbol to be in a different symbol (without time domain overlapping).

Preferably in certain embodiments, the first set of resources and the second set of resources are configured in a same serving cell.

Preferably in certain embodiments, each BWP in the same serving could be configured with a distinct first set of resources and/or second set of resources.

Preferably in certain embodiments, the first set of resources, the second set of resources, and/or the third set of resources for the request could be configured with overlapping in time domain (but non-overlapping in frequency domain).

Preferably in certain embodiments, when more than one event is triggered, the UE transmits the request on the third set of resources.

Preferably in certain embodiments, when the UE has a first triggered event and a second triggered event (associated with the same serving cell), if the UE cannot transmit both reports associated with both the triggered events on UL resource, the UE transmits a request for a non-transmitted report, and/or the UE transmits a first request and receives a grant for scheduling the UL resource, and/or when the UE prioritizes to transmit a first report associated with the first triggered event, the UE transmits a second request for the second triggered event, and/or the UE transmits a second request on a second resource which is not overlapping the UL resource, and/or if the scheduled UL resource is overlapping with the second resource in time domain, the UE avoids to transmit the second resource, and/or the prioritized transmitted report is with a higher priority than a deprioritized report, and/or priority of the report could be determined based on a configuration (e.g., network node configures priority value for each report/event), and/or priority of the report could be determined based on a predefined rule (e.g., earlier triggered event has a higher priority or vice versa, and/or an LTM event has a higher priority than a MIMO event or vice versa) priority of the report could be determined based on the serving cell ID (of measurement RS), and/or report configuration ID of the report (e.g., lower ID corresponds to higher priority).

Preferably in certain embodiments, based on whether a same serving cell or serving cell group's event triggering, the UE determines whether to trigger a latter event when an earlier event is triggered and not cancelled (and/or a report/request/PN associated with an earlier event has not been transmitted), and/or the earlier event and the latter event correspond to a different kind/type of events, and/or the earlier event and the latter event corresponds to a same kind/type of events, and/or when the earlier and latter event are associated with the same serving cell (no matter checking kind/type or there is an additional check of kind/type), the UE does not trigger a latter event, or the UE cancels an earlier event, or the UE prioritizes one event among an earlier event and the latter event or the UE triggers a latter event, or the UE cancels a latter event, and/or when the earlier and latter events are associated with a different serving cell (no matter checking kind/type or there is an additional check of kind/type), the UE does not trigger a latter event, or the UE cancels an earlier event, or the UE prioritizes one event among an earlier event and the latter event or the UE triggers a latter event, or the UE cancels the latter event, no matter if the earlier and latter events are associated with the same serving cell (no matter checking kind/type or there is an additional check of kind/type), the UE triggers both events, and/or no matter if the earlier and latter events are associated with a different serving cell (no matter checking kind/type or there is an additional check of kind/type), the UE triggers both events.

Preferably in certain embodiments, when the UE has more than one triggered event (and have not transmitted a respective request/PN), the UE transmits the request/PN in a sequential manner, and/or the UE transmits a first request/PN associated with an earlier event followed by transmitting a second request/PN associated with a latter event, and/or the UE transmits a first request/PN associated with an earlier event and if the UE cannot accommodate a report associated with a latter event, the UE transmits a second request/PN associated with a latter event.

Preferably in certain embodiments, the UE could be configured with a third set of resources associated with a report/request/PN, and/or the third set of resources are used for indicating more than one event is triggered, or more than one kind/type of event is triggered, and/or when the UE has more than one triggered event (and have not transmitted a respective request/PN), the UE transmits the request/PN on a resource in the third set of resources.

Preferably in certain embodiments, based on a number of triggered events (preferably with checking of a same serving cell or serving cell group) and/or the number of triggered events corresponding to a same type/kind of events, the UE determines to use a resource in one set being as the first set of resources, the second set of resources or the third set of resources, and/or for one triggered MIMO event, the first set of resources is determined, and/or for one triggered LTM event, the second set of resources is determined, and/or for more than one triggered MIMO event, the first set of resources is determined, and/or for more than one triggered LTM event, the second set of resources is determined, and/or for more than one triggered event (e.g., at least one triggered MIMO event and one LTM event), the third set of resources is determined.

Preferably in certain embodiments, based on a number of triggered events (preferably with checking of a same serving cell or serving cell group) and/or the number of triggered events corresponding to a same type/kind of events, the UE determines to use a resource in one set being as the first set of resources or the third set of resources, and/or for one triggered event (e.g., either MIMO event or LTM event), the first set of resources is determined, and/or for more than one triggered event (e.g., more than one triggered MIMO event or more than one LTM event or at least one triggered MIMO event and one LTM event), the third set of resources is determined.

Preferably in certain embodiments, based on a number of triggered events (preferably with checking of a same serving cell or serving cell group) and/or the number of triggered events corresponding to a same type/kind of events, the UE determines to use a resource in one set being as the first set of resources or the second set of resources, and/or for a triggered MIMO event, the first set of resources is determined, and/or for a triggered LTM event, the second set of resources is determined.

Preferably in certain embodiments, when a report configuration is associated with one serving cell's RS and one or more candidate cells' RS, priority of the report configuration is based on a lowest index/ID of a candidate cell, an index/ID of the one serving cell.

Preferably in certain embodiments, when the UE has more than one triggered event (and have not transmitted a respective report), the UE transmits the report in a sequential manner, and/or the UE transmits a first report associated with an earlier event followed by transmitting a second report associated with a latter event, and/or the UE transmits a first report associated with an earlier event and if the UE cannot accommodate the report associated with a latter event, the UE transmits a second report associated with a latter event on another requested UL resource.

Preferably in certain embodiments, for mode-B, one-to-one mapping between a resource in step-1 and a resource in step-2 are assumed or configured or indicated or expected.

Preferably in certain embodiments, the UE could be configured with either mode-A or mode-B per serving cell group or over two serving cell groups, and/or for a same cell group, the UE applies or is configured with a same mode for transmitting the UEI report, and/or for a different cell group, the UE applies or is configured with a respective mode for transmitting the UEI report.

Preferably in certain embodiments, configuration of either mode-A or mode-B is configured based on a parameter in a configuration of a primary cell or PUCCH SCell.

Preferably in certain embodiments, the UE could be configured with a first serving cell, a second serving cell, wherein both the first serving cell and the second serving cell are associated with a first cell group.

Preferably in certain embodiments, the UE could be configured with a third serving cell, a fourth serving cell, wherein both the third serving cell and the fourth serving cell are associated with a second cell group.

Preferably in certain embodiments, the UE could be configured with a first set of resources per cell group, and/or the first set of resources are configured with the first cell group and an another first set of resources are configured with the second cell group.

Preferably in certain embodiments, the UE could be configured with a second set of resources per cell group, and/or the second set of resources are configured with the first cell group and an another second set of resources are configured with the second cell group.

Preferably in certain embodiments, the third serving cell and/or the first serving cell corresponds to a primary cell in a respective cell group.

Preferably in certain embodiments, the UE maintains (up to) one triggered event per serving cell.

Preferably in certain embodiments, the UE maintains (up to) one triggered MIMO event and one triggered LTM event per serving cell.

Preferably in certain embodiments, for the first serving cell or the third serving cell, the UE maintains (up to) one triggered MIMO event and one triggered LTM event.

Preferably in certain embodiments, for the second serving cell or the fourth serving cell, the UE maintains (up to) one triggered MIMO event.

Preferably in certain embodiments, for the first serving cell, the UE could be configured with a first plurality of MIMO events and a second plurality of LTM events.

Preferably in certain embodiments, for the second serving cell, the UE could be configured with a third plurality of MIMO events.

Preferably in certain embodiments, based on a serving cell being as a primary cell or not, the UE expects to be configured with a hybrid of MIMO and LTM events associated with the serving cell.

Preferably in certain embodiments, the LTM event could be configured for a secondary serving cell (e.g., the second serving cell or the fourth serving cell), and/or one or more candidate beams associated with the candidate cell could be configured with per LTM event (associated with the secondary serving cell).

Preferably in certain embodiments, the first set of resources and/or the second set of resources are configured in a periodic manner.

Preferably in certain embodiments, the first set of resources and/or the second set of resources are configured for step-1 in mode-A, step-1 in mode-B, or step-2 in mode-B.

Preferably in certain embodiments, for mode-A, the UE receives a DCI scheduling PUSCH resource for transmitting a report (associated with the one event), wherein a cell where the UE receives DCI and a cell where the UE transmits the report could be the same or a different cell.

Referring back to FIGS. 3 and 4, in one or more embodiments from the perspective of a UE in a wireless communication system, the device 300 includes a program code 312 stored in memory 310 of the transmitter. The CPU 308 could execute program code 312 to: (i) maintain or receiving a configuration associated with one or more UE triggered events, wherein the one or more UE triggered events comprise a first event and a second event; (ii) trigger one event (of the one or more UE triggered events) in response to a condition of the one event is fulfilled; (iii) receive a first configuration (or a first parameter) for configuring a first set of resources for a first (UE triggered) report, a first request, and/or a first pre-notification, associated with the first event; (iv) preferably in certain embodiments, receive a second configuration (or a second parameter) for configuring a second set of resources for a second (UE triggered) report, a second request, and/or a second pre-notification, associated with the second event, or the first configuration (or the first parameter) also configures a second set of resources for a second (UE triggered) report, a second request, and/or a second pre-notification, associated with the second event; and (v) based on the one event corresponding to the first event or the second event, the UE transmits a report/request/PN on a corresponding resource. Moreover, the CPU 308 can execute the program code 312 to perform all of the described actions, steps, and methods described above, below, or otherwise herein.

Referring to FIG. 12, with this and other concepts, systems, and methods of the present invention, a method 1030 for a UE in a wireless communication system comprises being configured with (or receiving configuration for configuring) a plurality of report configurations comprising a first report configuration associated with an event and a second report configuration not associated with any (or the) event (step 1032), and being configured with (or receiving configuration for configuring) one or more trigger states associated with one or more report configurations, wherein the UE does not expect that any trigger state of the one or more trigger states is associated with the first report configuration associated with the event and the second report configuration not associated with any (or the) event (step 1034).

In various embodiments, the event corresponds to a comparison between a quality of a current beam of a Serving Cell and a quality of a candidate beam of the Serving Cell, or the event corresponds to a MIMO event.

In various embodiments, the first report configuration or the event is associated with UE-initiated beam reporting.

In various embodiments, the first report configuration corresponds to a first CSI-ReportConfig and the second report configuration corresponds to a second CSI-Report-Config.

In various embodiments, the UE is configured with a third report configuration corresponding to an LTM-CSI-Report-Config, and the UE does not expect that any trigger state of the one or more trigger states is associated with the first report configuration and the third report configuration or associated with the second report configuration and the third report configuration.

In various embodiments, for two overlapping PUSCHs, where one PUSCH is for transmitting a third report associated with the third report configuration and another PUSCH is for transmitting a fourth report associated with the second report configuration, the UE prioritizes the third report over the fourth report.

In various embodiments, the UE triggers a first UE-initiated beam reporting associated with the first report configuration and determines to transmit a first request for the first UE-initiated beam reporting, and the UE triggers a second UE-initiated beam reporting associated with a fourth report configuration and determines to transmit a second request for the second UE-initiated beam reporting, wherein the fourth report configuration is configured with a second event, and the UE transmits the first request if a first PUCCH resource for the first request is overlapped with a second PUCCH resource for the second request in time domain, wherein the first request associated with the first UE-initiated beam reporting has a higher priority than the second request associated with the second UE-initiated beam reporting, wherein the second event is based on a comparison between a quality of a current beam of a Serving Cell and a quality of a candidate beam of a candidate Cell, or the second event corresponds to a LTM event, and the UE transmits a first beam report associated with the first UE-initiated beam reporting.

In various embodiments, the UE does not transmit the second request if the first PUCCH resource for the first request is overlapped with the second PUCCH resource for the second request in time domain.

In various embodiments, the UE generates the first beam report in response to the triggered first UE-initiated beam reporting, and the UE generates a second beam report in response to the triggered second UE-initiated beam reporting.

In various embodiments, after transmitting the first request, the UE attempts to monitor a PDCCH with a CSI request field indicating a trigger state associated with the first report configuration.

In various embodiments, the first beam report is transmitted via a UCI on a PUSCH scheduled by a PDCCH, or the first beam report is transmitted via a UCI on a type-1 CG PUSCH, and/or the second beam report is transmitted via a MAC CE on a second PUSCH scheduled by a second PDCCH.

In various embodiments, if or when the UE does not transmit the second beam report due to the UE prioritizing the first request over the second request, the UE does not cancel the triggered second UE-initiated beam reporting.

In various embodiments, the first request corresponds to a PN or a request for UE-initiated beam report, and the second request corresponds to an SR.

Referring back to FIGS. 3 and 4, in one or more embodiments from the perspective of a UE in a wireless communication system, the device 300 includes a program code 312 stored in memory 310 of the transmitter. The CPU 308 could execute program code 312 to: (i) being configured with a plurality of report configurations comprising a first report configuration associated with an event and a second report configuration not associated with any (or the) event; and (ii) being configured with one or more trigger states associated with one or more report configuration, wherein the UE does not expect that any trigger state of the one or more trigger states is associated with the first report configuration associated with the event and the second report configuration not associated with any (or the) event. Moreover, the CPU 308 can execute the program code 312 to perform all of the described actions, steps, and methods described above, below, or otherwise herein.

Referring to FIG. 13, with this and other concepts, systems, and methods of the present invention, a method 1040 for a Network Node in a wireless communication system comprises configuring a UE with a plurality of report configurations comprising a first report configuration associated with an event and a second report configuration not associated with any (or the) event (step 1042), and configuring the UE with one or more trigger states associated with one or more report configurations, wherein the network node is not allowed to configure the one or more trigger states such that any trigger state of the one or more trigger states is associated with the first report configuration associated with the event and the second report configuration not associated with any (or the) event (step 1044).

In various embodiments, the event corresponds to a comparison between a quality of a current beam of a Serving Cell and a quality of a candidate beam of the Serving Cell.

In various embodiments, the first report configuration corresponds to a first Channel State Information CSI-ReportConfig and the second report configuration corresponds to a second CSI-ReportConfig.

In various embodiments, the network node configures the UE with a third report configuration corresponding to an LTM-CSI-ReportConfig, and the network node is not allowed to configure the one or more trigger states such that a trigger state of the one or more trigger states is associated with the first report configuration and the third report configuration or associated with the second report configuration and the third report configuration.

Referring back to FIGS. 3 and 4, in one or more embodiments from the perspective of a Network Node in a wireless communication system, the device 300 includes a program code 312 stored in memory 310 of the transmitter. The CPU

308 could execute program code 312 to: (i) configure a UE with a plurality of report configurations comprising a first report configuration associated with an event and a second report configuration not associated with any (or the) event; and (ii) configure the UE with one or more trigger states associated with one or more report configurations, wherein the network node is not allowed to configure the one or more trigger states such that any trigger state of the one or more trigger states is associated with the first report configuration associated with the event and the second report configuration not associated with any (or the) event. Moreover, the CPU 308 can execute the program code 312 to perform all of the described actions, steps, and methods described above, below, or otherwise herein.

Any combination of the above or herein concepts or teachings can be jointly combined, in whole or in part, or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/ processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of a User Equipment (UE), comprising:

being configured with a plurality of report configurations comprising a first report configuration associated with an event, a second report configuration not associated with any event, and a fourth report configuration associated with a second event, wherein the second event is based on a comparison between a quality of a current beam of a Serving Cell and a quality of a candidate beam of a candidate Cell, or the second event corresponds to a Layer 1/Layer 2 Triggered Mobility (LTM) event;

being configured with one or more trigger states associated with one or more report configurations, wherein the UE does not expect that any trigger state of the one or more trigger states is associated with the first report configuration associated with the event and the second report configuration not associated with any event;

triggering to transmit a first request for a first report associated with the first report configuration;

triggering to transmit a second request for a second report associated with the fourth report configuration;

transmitting the first request if a first Physical Uplink Control Channel (PUCCH) resource for the first request is overlapped with a second PUCCH resource for the second request in time domain, wherein the first request associated with the first report configuration has a higher priority than the second request associated with the fourth report configuration; and transmitting the first report associated with the first report configuration.

2. The method of claim 1, wherein the event corresponds to a comparison between a quality of a current beam of a Serving Cell and a quality of a candidate beam of the Serving Cell, or the event corresponds to a Multiple-Input Multiple-Output (MIMO) event.

3. The method of claim 1, wherein the first report configuration or the event is associated with UE-initiated beam reporting.

4. The method of claim 1, wherein the first report configuration corresponds to a first Channel State Information (CSI)-ReportConfig and the second report configuration corresponds to a second CSI-ReportConfig.

5. The method of claim 1, wherein the UE receives a third report configuration corresponding to an LTM-CSI-Report-Config, and the UE does not expect that any trigger state of the one or more trigger states is associated with the first report configuration and the third report configuration or associated with the second report configuration and the third report configuration and/or for two overlapping Physical Uplink Shared Channels (PUSCHs), wherein one PUSCH is for transmitting a third report associated with the third report configuration and another PUSCH is for transmitting a fourth report associated with the second report configuration, and the UE prioritizes the third report over the fourth report.

6. The method of claim 1, wherein the UE does not transmit the second request if the first PUCCH resource for the first request is overlapped with the second PUCCH resource for the second request in time domain.

7. The method of claim 1, wherein the UE generates the first report in response to condition of the event being met, and the UE generates the second report in response to condition of the second event being met.

8. The method of claim 1, wherein after transmitting the first request, the UE attempts to monitor a Physical Downlink Control Channel (PDCCH) with a CSI request field indicating a trigger state associated with the first report configuration.

9. The method of claim 1, wherein the first report is transmitted via an Uplink Control Information (UCI) on a third PUSCH scheduled by a PDCCH, or the first report is transmitted via a UCI on a type-1 Configured Grant (CG) PUSCH, and/or the second report is transmitted via a Medium Access Control (MAC) Control Element (CE) on a fourth PUSCH scheduled by a second PDCCH.

10. The method of claim 1, wherein the first request corresponds to a Pre-Notification (PN) or a request for UE-initiated beam report, and the second request corresponds to a Scheduling Request (SR).

11. A User Equipment (UE), comprising:

a memory; and a processor operatively coupled with the memory, wherein the processor is configured to execute a program code to:

be configured with a plurality of report configurations comprising a first report configuration associated with an event, a second report configuration not associated with any event, and a fourth report configuration associated with a second event, wherein the second event is based on a comparison between a quality of a current beam of a Serving Cell and a quality of a candidate beam of a candidate Cell, or the second event corresponds to a Layer 1/Layer 2 Triggered Mobility (LTM) event;

be configured with one or more trigger states associated with one or more report configuration, wherein the UE does not expect that any trigger state of the one or more trigger states is associated with the first report configuration associated with the event and the second report configuration not associated with any event;

triggering to transmit a first request for a first report associated with the first report configuration;

triggering to transmit a second request for a second report associated with the fourth report configuration;

transmitting the first request if a first Physical Uplink Control Channel (PUCCH) resource for the first request is overlapped with a second PUCCH resource for the second request in time domain, wherein the first request associated with the first report configuration has a higher priority than the second request associated with the fourth report configuration; and transmitting the first report associated with the first report configuration.

12. The UE of claim 11, wherein the event corresponds to a comparison between a quality of a current beam of a Serving Cell and a quality of a candidate beam of the Serving Cell, or the event corresponds to a Multiple-Input Multiple-Output (MIMO) event or is associated with UE-initiated beam reporting.

13. The UE of claim 11, wherein the UE receives a third report configuration corresponding to an LTM-Channel State Information (CSI)-ReportConfig, and the UE does not expect that any trigger state of the one or more trigger states is associated with the first report configuration and the third report configuration or associated with the second report configuration and the third report configuration and/or for two overlapping Physical Uplink Shared Channels (PUSCHs), where one PUSCH is for transmitting a third report associated with the third report configuration and another PUSCH is for transmitting a fourth report associated with the second report configuration, and the UE prioritizes the third report over the fourth report.

14. The UE of claim 11, wherein the UE does not transmit the second request if the first PUCCH resource for the first request is overlapped with the second PUCCH resource for the second request in time domain.

15. The UE of claim 11, wherein the first report is transmitted via an Uplink Control Information (UCI) on a third PUSCH scheduled by a PDCCH, or the first report is transmitted via a UCI on a type-1 Configured Grant (CG) PUSCH, and/or the second report is transmitted via a Medium Access Control (MAC) Control Element (CE) on a fourth PUSCH scheduled by a second PDCCH.

16. The UE of claim 11, wherein the first request corresponds to a Pre-Notification (PN) or a request for UE-initiated beam report, and the second request corresponds to a Scheduling Request (SR).

17. A method of a User Equipment (UE), comprising:

being configured with a plurality of report configurations comprising a first report configuration associated with an event, and a second report configuration not associated with any event;

being configured with one or more trigger states in a list, wherein each trigger state is associated with one or more report configurations of the plurality of report configurations; and not expecting that any trigger state of the one or more trigger states is associated with the first report configuration associated with the event and the second report configuration not associated with any event.

18. The method of claim 17, wherein the event corresponds to a comparison between a quality of a current beam of a Serving Cell and a quality of a candidate beam of the Serving Cell, or the event corresponds to a Multiple-Input Multiple-Output (MIMO) event.

19. The method of claim 17, wherein the first report configuration or the event is associated with UE-initiated beam reporting.

20. The method of claim 17, wherein the first report configuration corresponds to a first Channel State Information (CSI)-ReportConfig and the second report configuration corresponds to a second CSI-ReportConfig.

* * * * *